(12) United States Patent
Yoneyama

(10) Patent No.: US 6,982,836 B2
(45) Date of Patent: Jan. 3, 2006

(54) ZOOM LENS SYSTEM

(75) Inventor: Shuji Yoneyama, Gyeongsangnam-do (KR)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/126,235

(22) Filed: May 11, 2005

(65) Prior Publication Data

US 2005/0254138 A1 Nov. 17, 2005

(30) Foreign Application Priority Data

May 12, 2004 (JP) .............................. 2004-142893

(51) Int. Cl.
*G02B 15/14* (2006.01)
(52) U.S. Cl. ..................... 359/687; 359/683; 359/684; 359/685; 359/715; 359/740; 359/774
(58) Field of Classification Search ........ 359/683–685, 359/687, 715, 740, 774
See application file for complete search history.

(56) References Cited

U.S. PATENT DOCUMENTS

| | | | | |
|---|---|---|---|---|
| 4,776,680 A | * | 10/1988 | Tanaka ........................ 359/684 |
| 5,134,524 A | * | 7/1992 | Hamano et al. ............. 359/687 |
| 5,530,592 A | | 6/1996 | Tochigi | |
| 5,568,321 A | * | 10/1996 | Ogawa et al. ............... 359/676 |
| 5,583,699 A | * | 12/1996 | Nakayama ................... 359/687 |
| 5,748,383 A | * | 5/1998 | Ohtake ......................... 359/683 |
| 5,754,346 A | * | 5/1998 | Nakayama et al. .......... 359/687 |
| 5,784,205 A | * | 7/1998 | Nakayama et al. .......... 359/687 |
| 6,084,722 A | | 7/2000 | Horiuchi | |
| 6,124,983 A | * | 9/2000 | Yahagi et al. ................ 359/687 |
| 6,128,140 A | * | 10/2000 | Yoneyama ..................... 359/687 |
| 6,229,962 B1 | * | 5/2001 | Imamura ....................... 396/79 |
| 6,449,433 B2 | * | 9/2002 | Hagimori et al. ............. 396/72 |
| 6,473,231 B2 | * | 10/2002 | Hamano et al. ............. 359/557 |
| 6,606,194 B2 | * | 8/2003 | Hamano et al. ............. 359/557 |
| 6,674,580 B2 | * | 1/2004 | Horiuchi ...................... 359/687 |
| 6,754,009 B2 | * | 6/2004 | Horiuchi ...................... 359/687 |
| 6,788,464 B2 | * | 9/2004 | Misaka ........................ 359/557 |
| 2003/0197950 A1 | * | 10/2003 | Eguchi ........................ 359/687 |
| 2004/0056969 A1 | * | 3/2004 | Hamano et al. ......... 348/240.3 |

FOREIGN PATENT DOCUMENTS

| | | |
|---|---|---|
| JP | 2901144 | 3/1999 |
| JP | 2000-075204 | 3/2000 |
| JP | 2000-171712 | 6/2000 |
| JP | 3097395 | 8/2000 |

OTHER PUBLICATIONS

English language Abstract of JP 2000-075204.

* cited by examiner

*Primary Examiner*—Evelyn A. Lester
(74) *Attorney, Agent, or Firm*—Greenblum & Bernstein, P.L.C.

(57) ABSTRACT

A zoom lens system includes a positive first lens group, a negative second lens group, a positive third lens group, and a positive fourth lens group. Upon zooming, the second lens group moves from the object side to the image side, and the fourth lens group moves in order to compensate the move of the image plane. The fourth lens group includes sub-lens groups, wherein a first sub-lens group satisfies specific conditions. The first sub-lens group has an aspherical surface on at least the object-side surface thereof. The aspherical surface is formed so that the higher a height from the optical axis in a radial direction becomes the weaker the refractive power is, compared with a paraxial spherical surface.

11 Claims, 56 Drawing Sheets

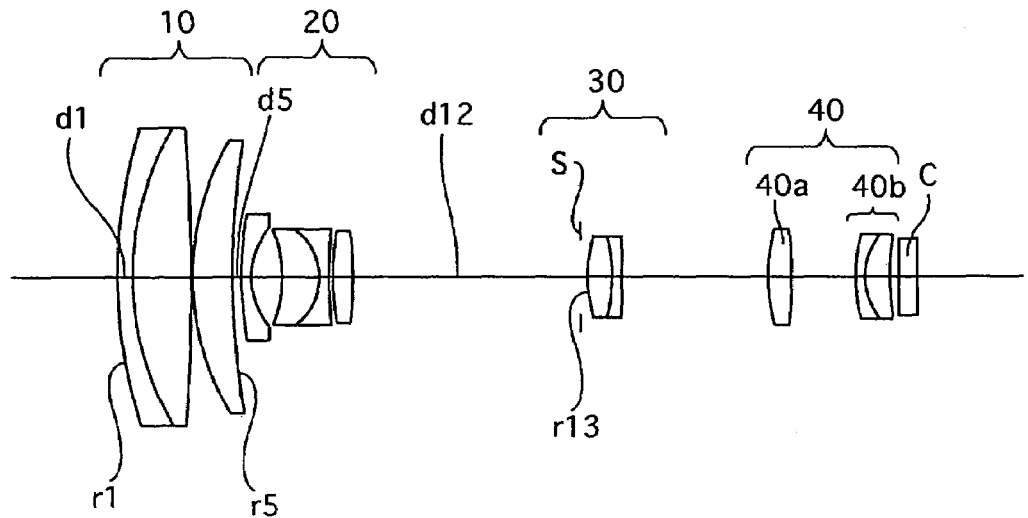
Fig. 1
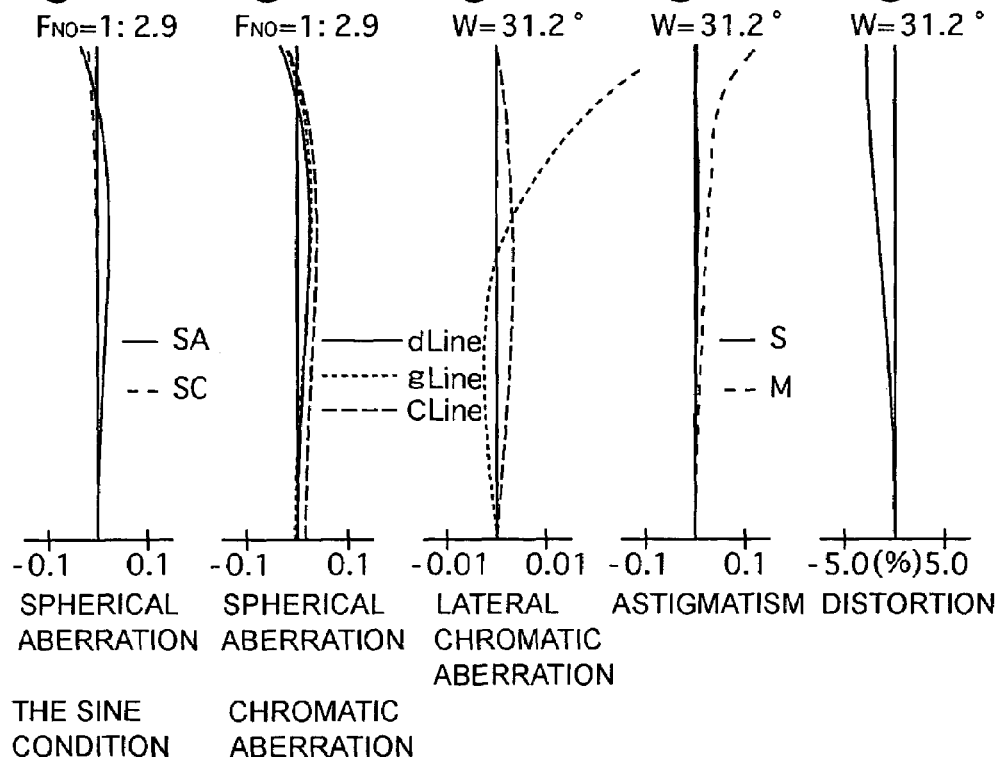

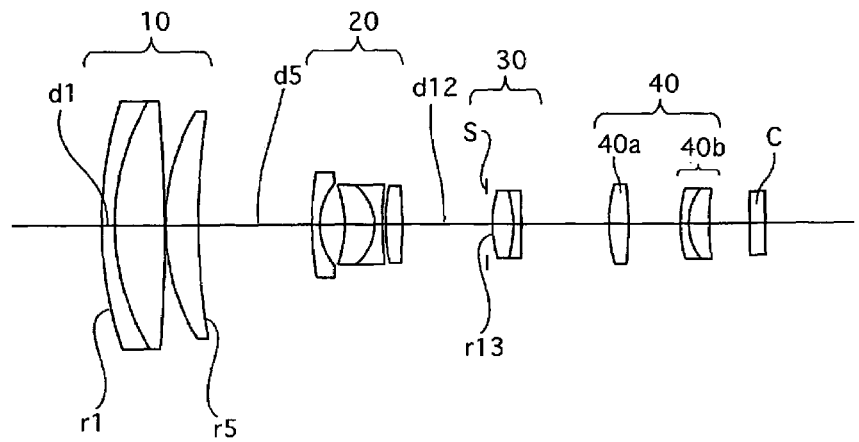
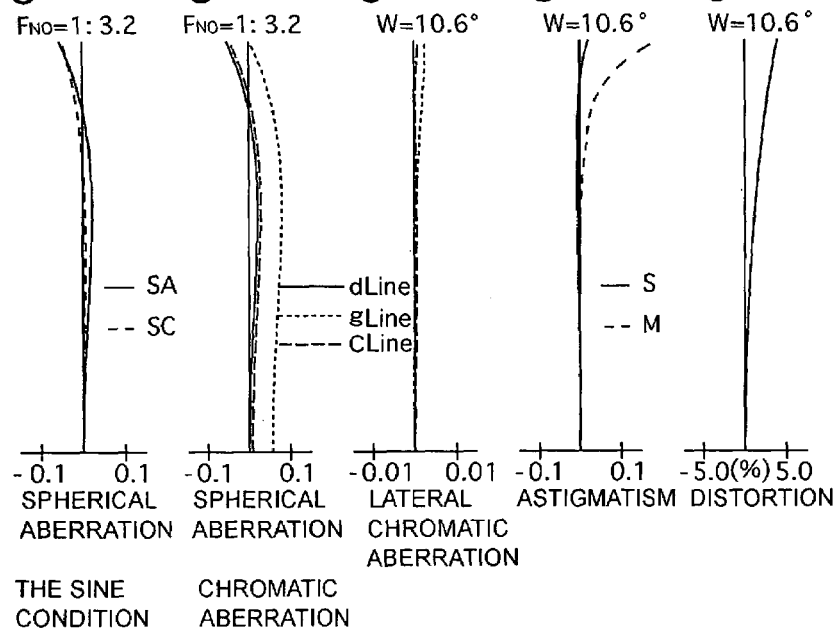

Fig. 5
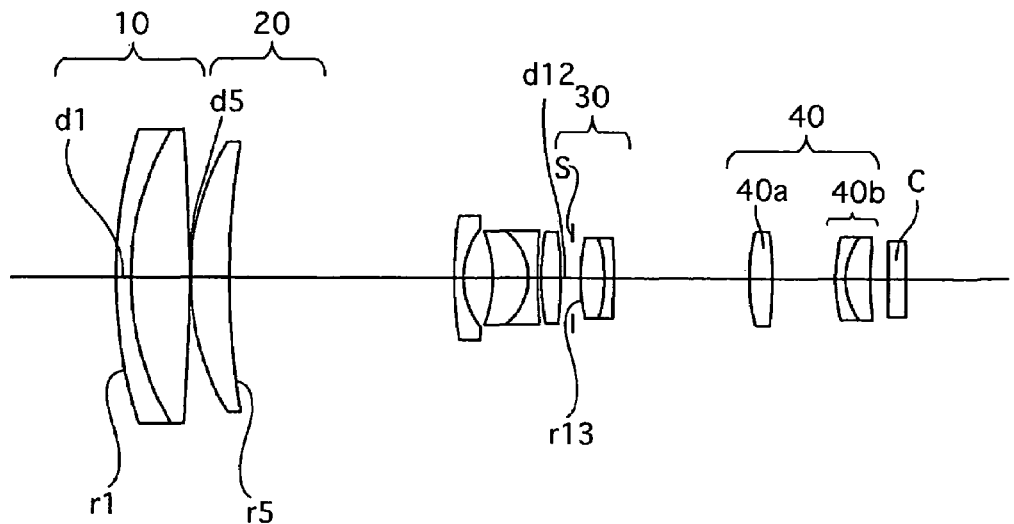
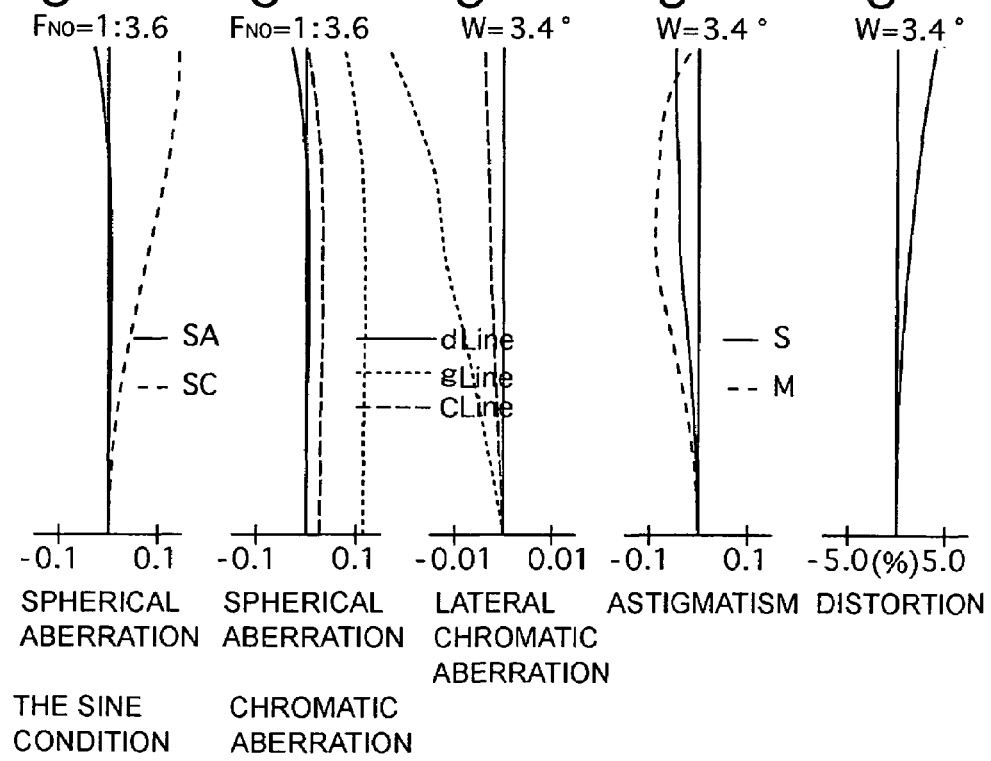
Fig. 6A  Fig. 6B  Fig. 6C  Fig. 6D  Fig. 6E

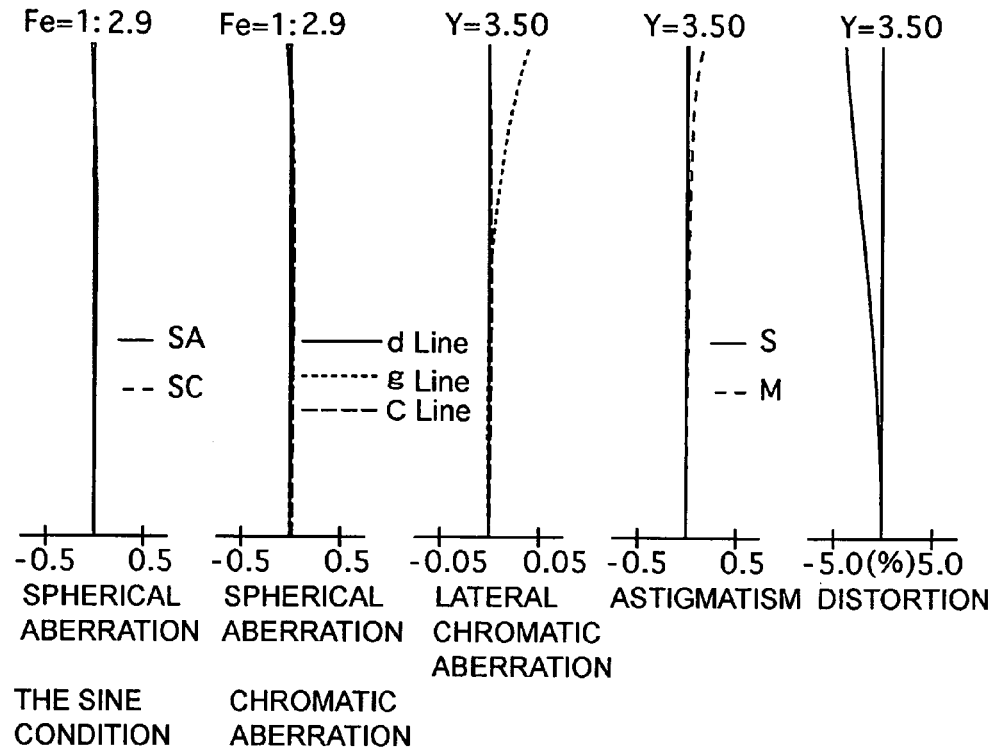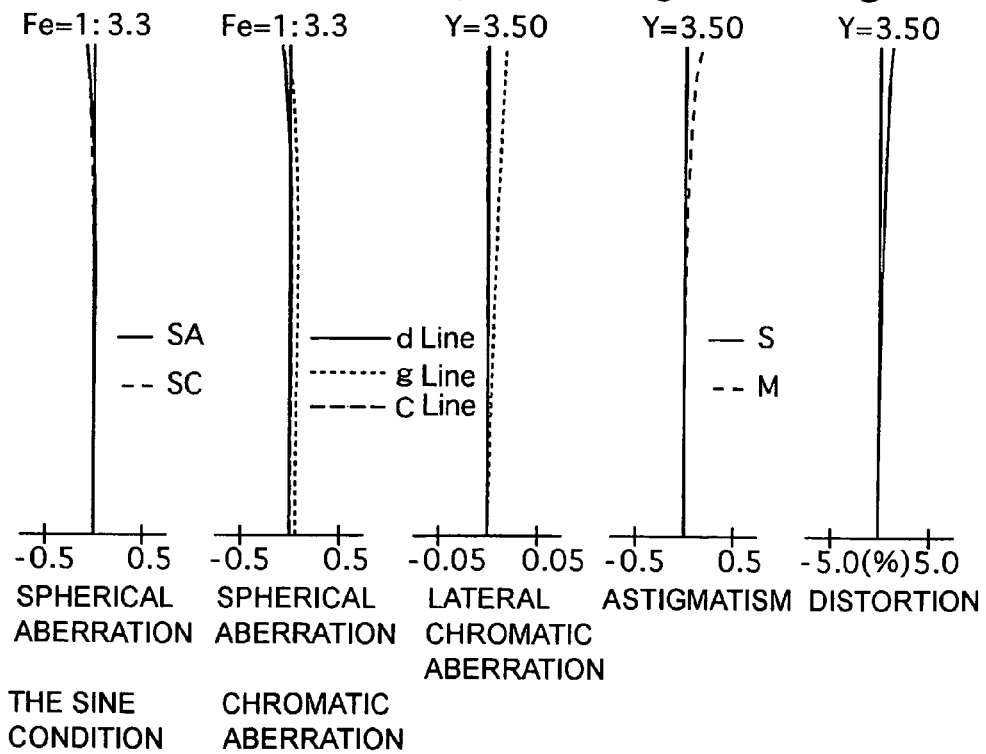

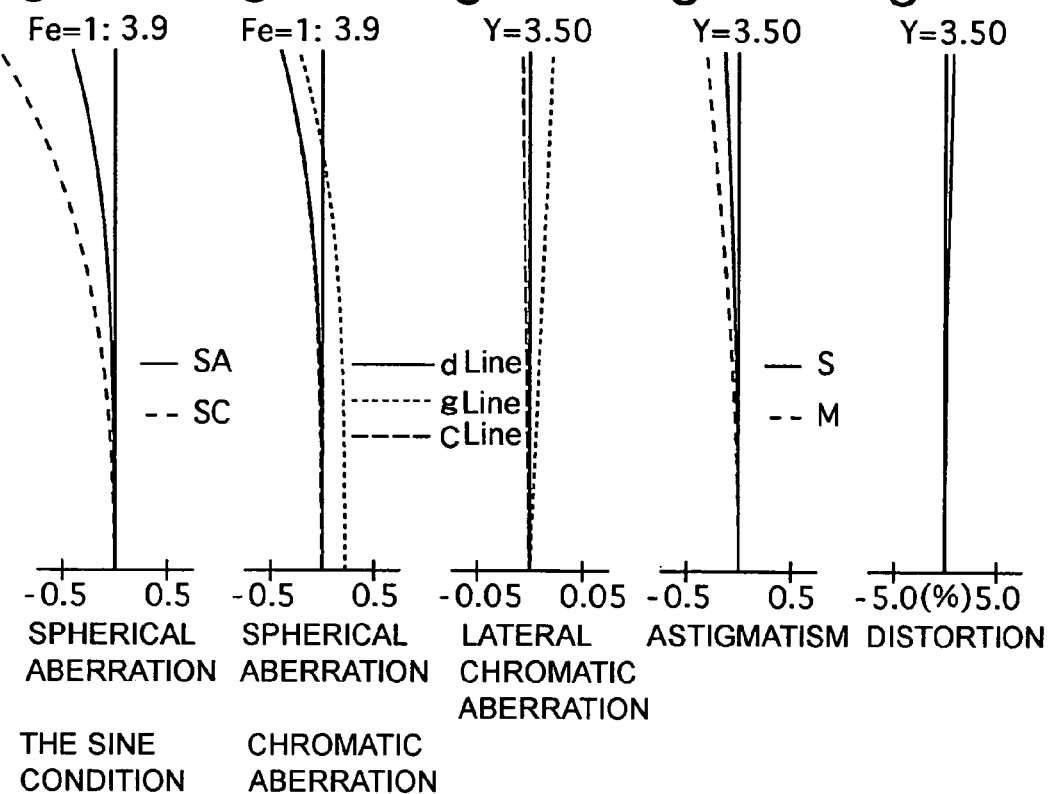

Fig. 10
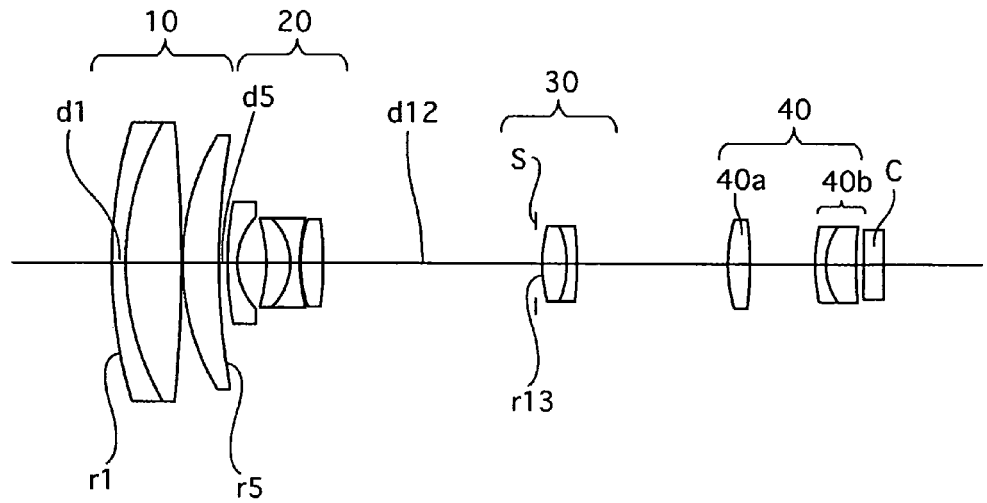
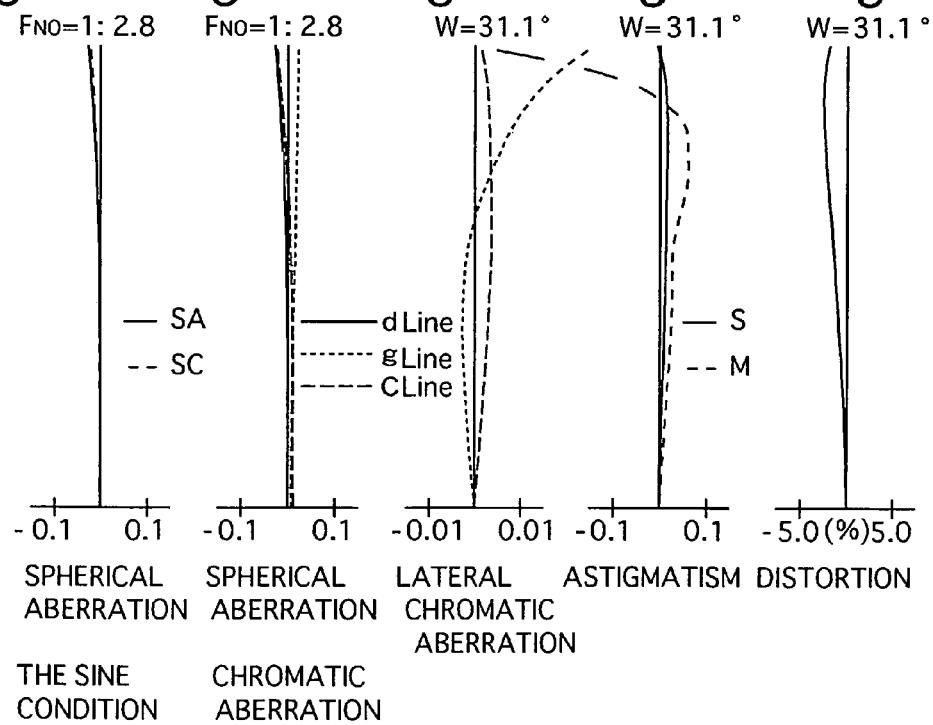
Fig.11A  Fig.11B  Fig.11C  Fig.11D  Fig.11E

Fig. 14
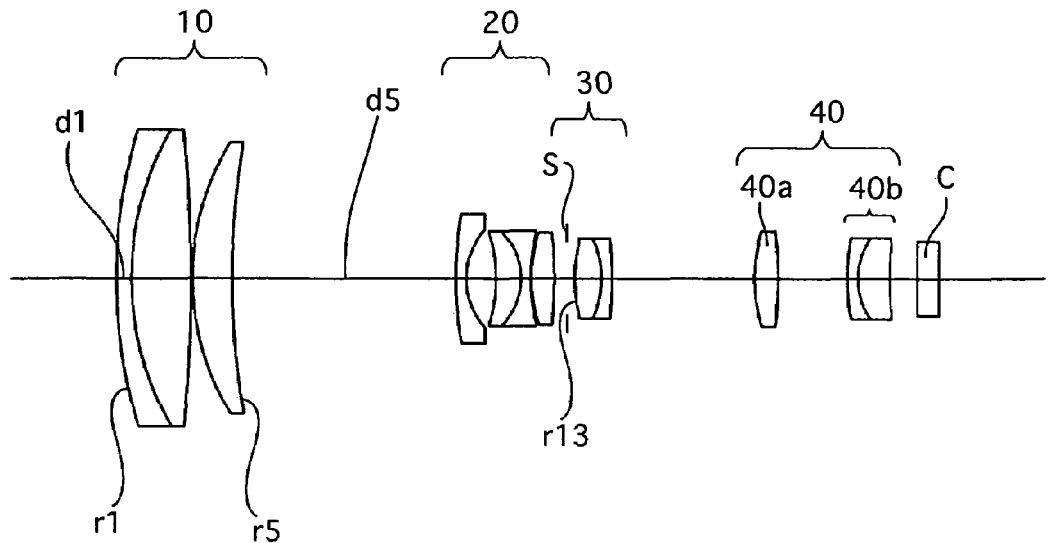
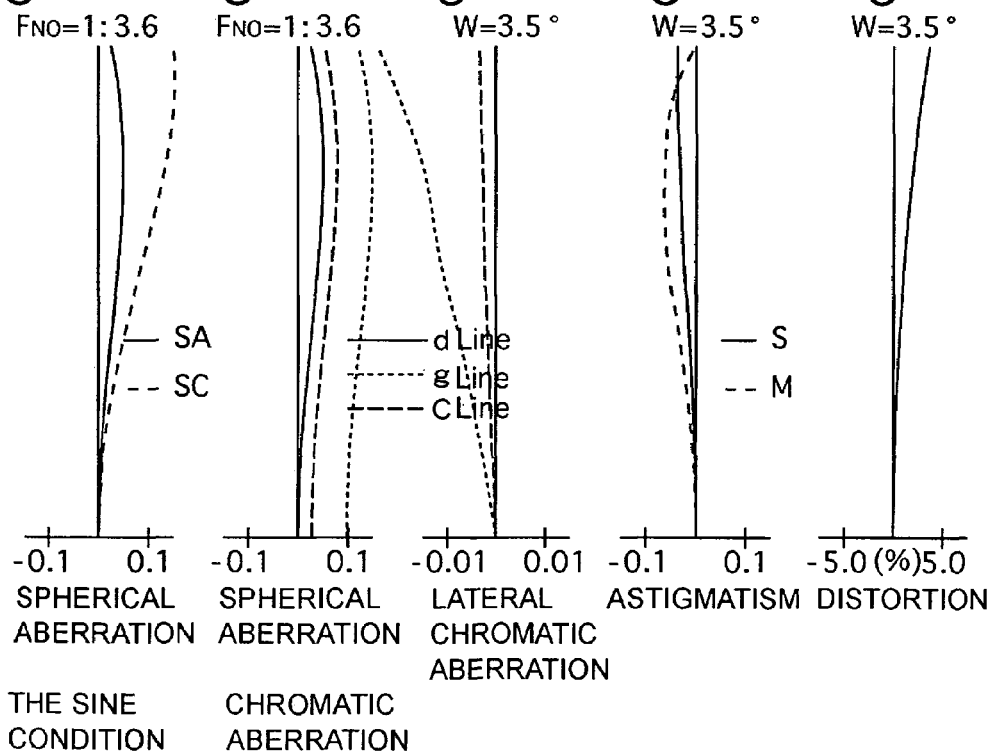
Fig.15A Fig.15B Fig.15C Fig.15D Fig.15E

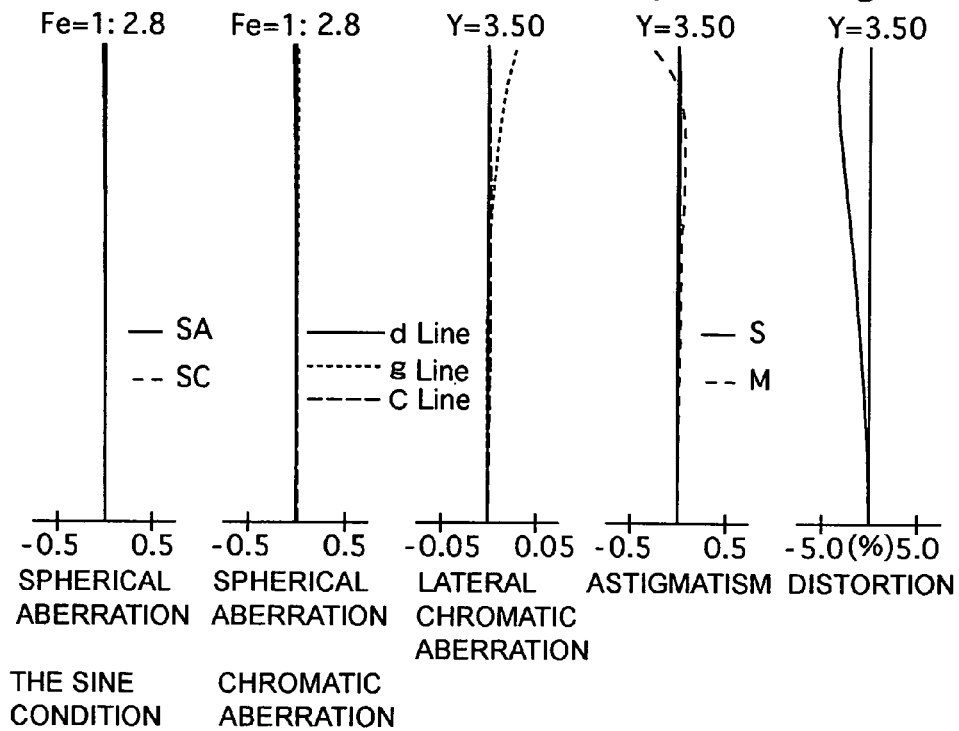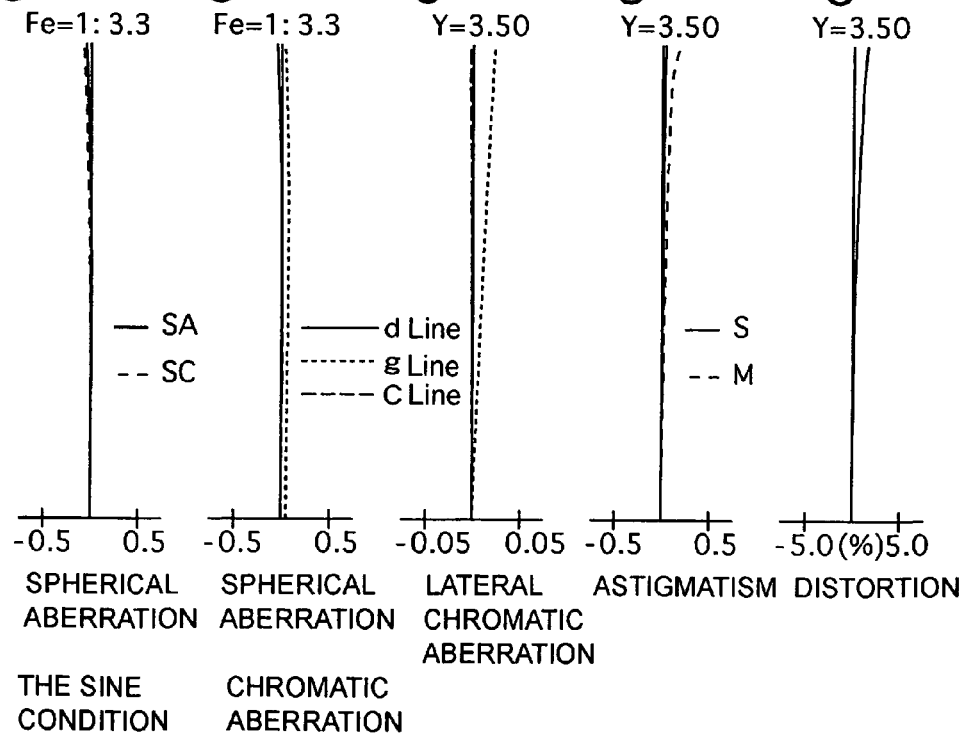

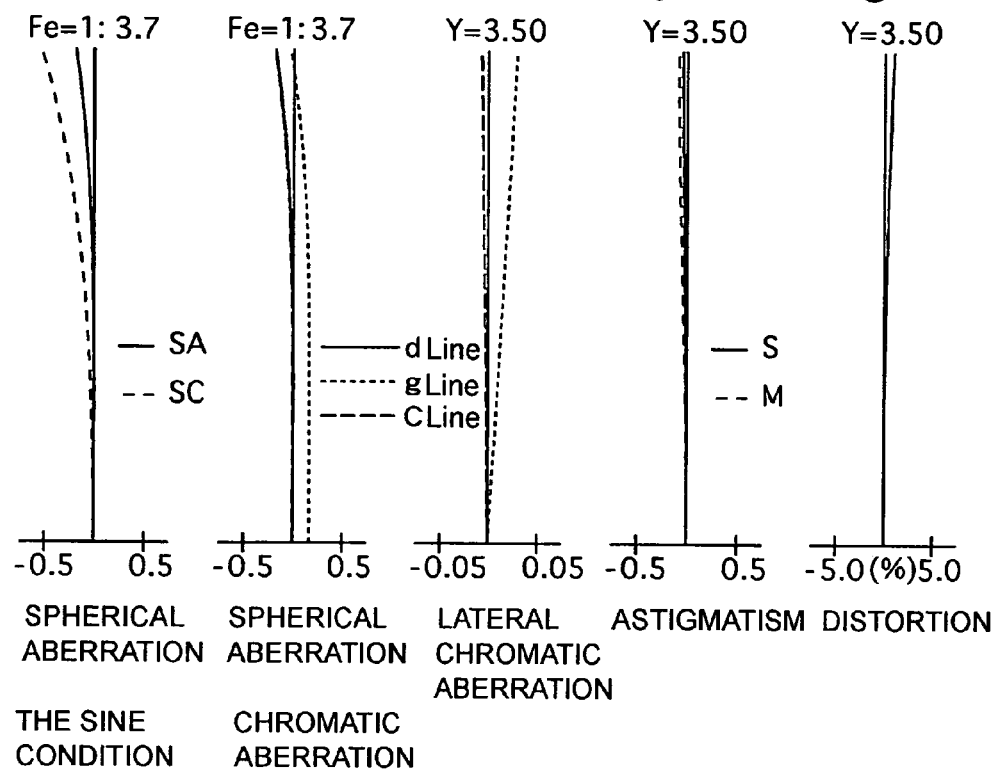

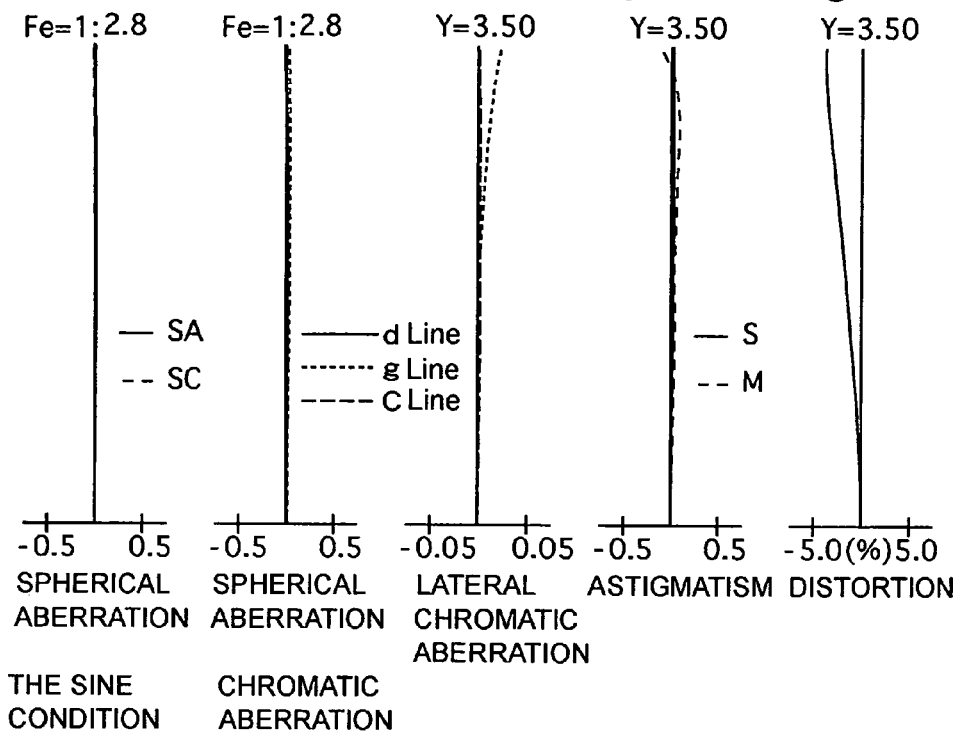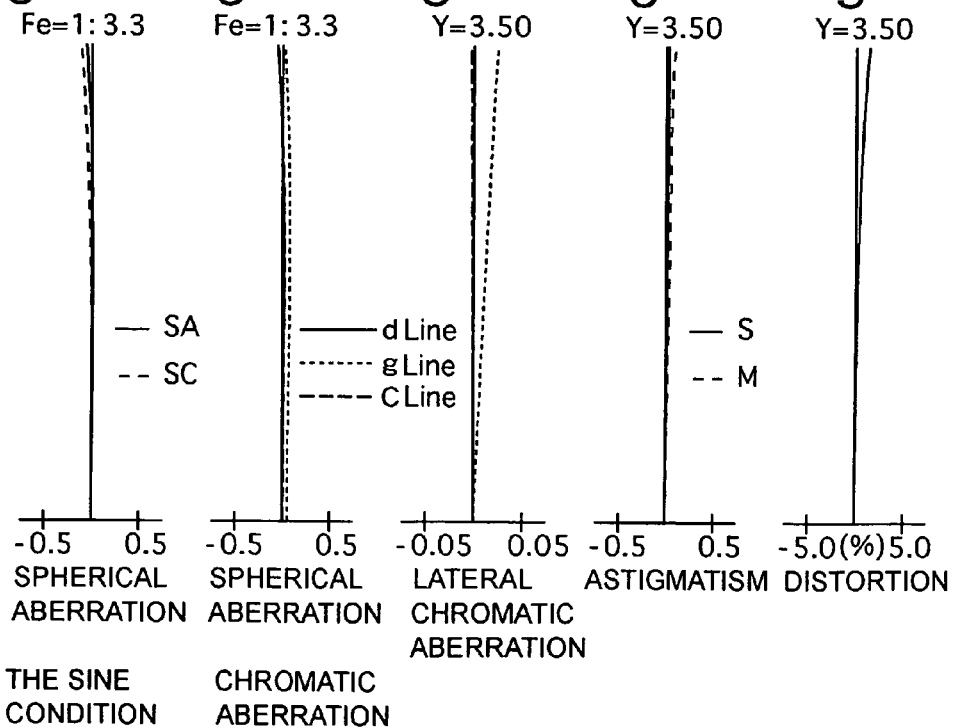

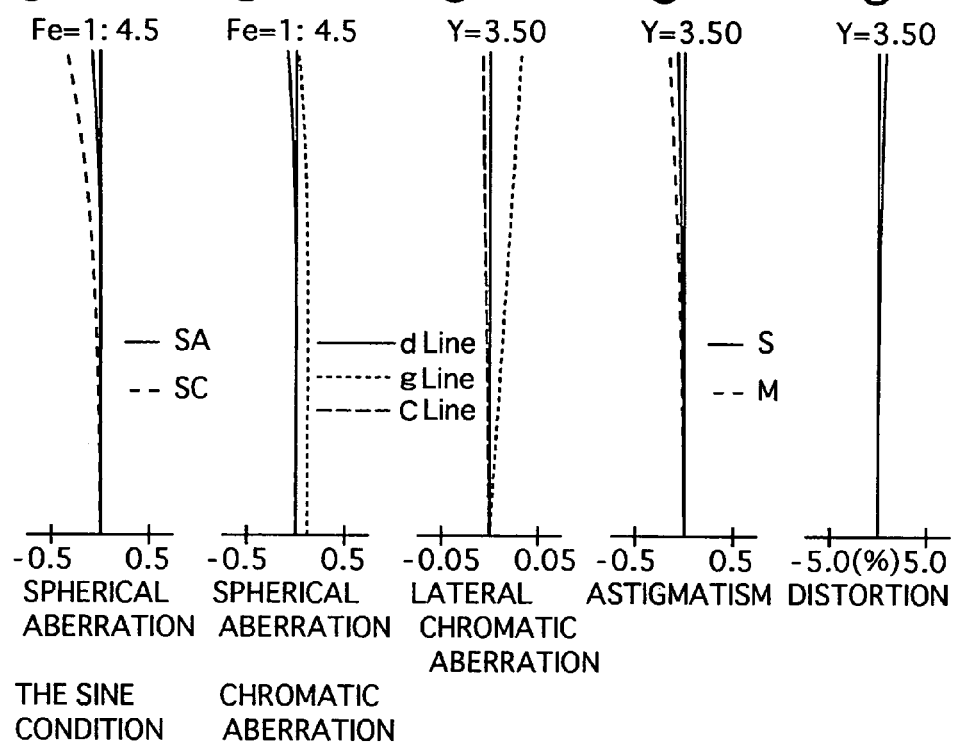

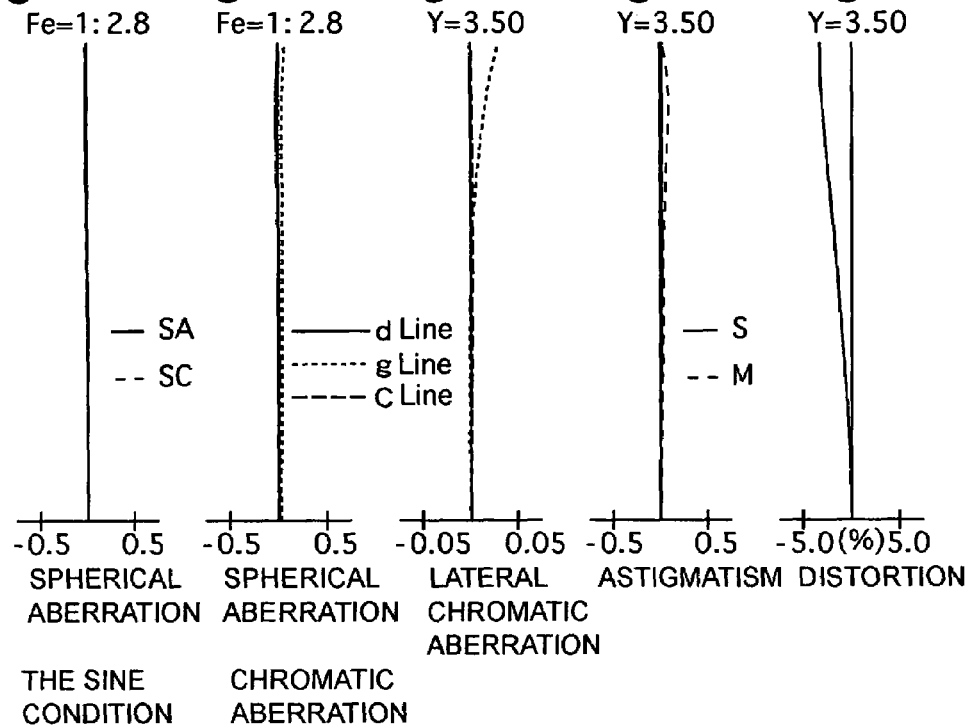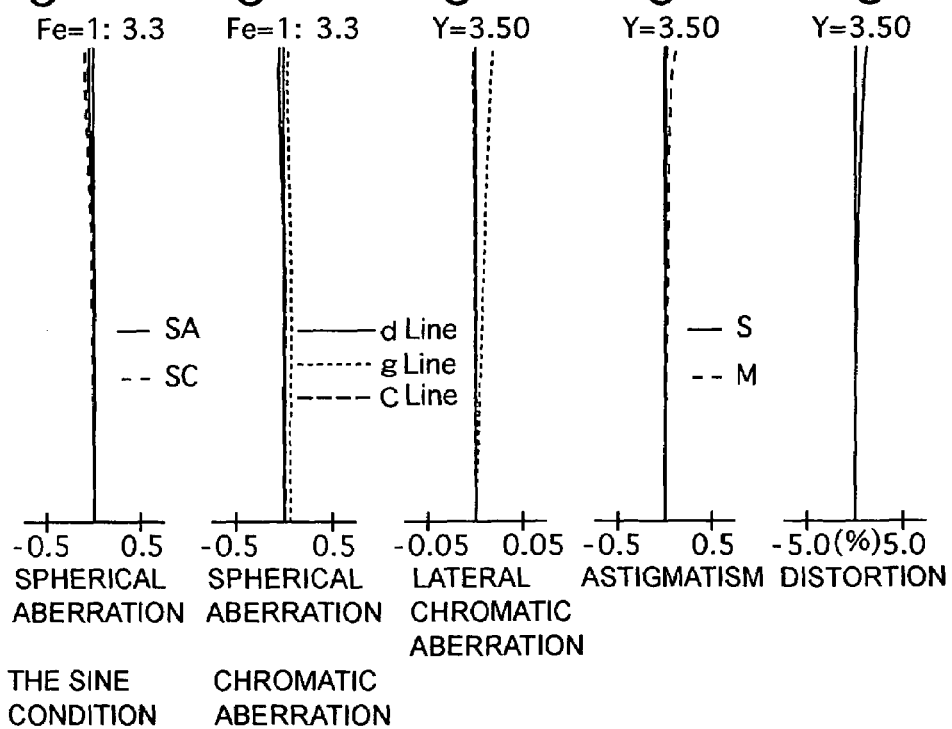

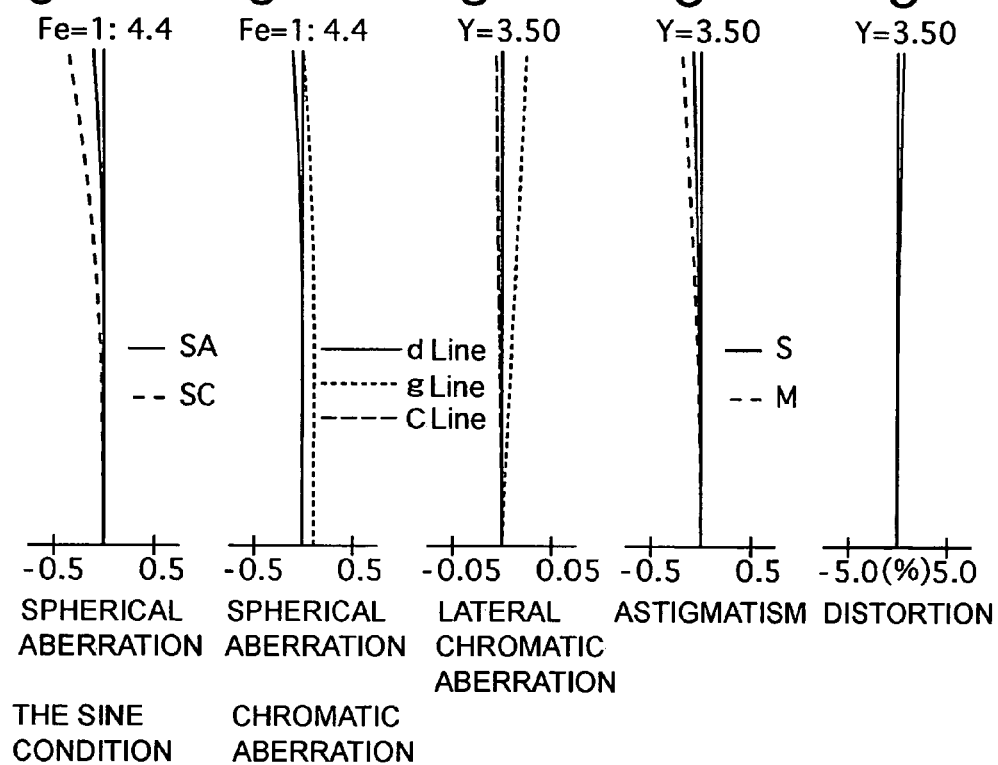

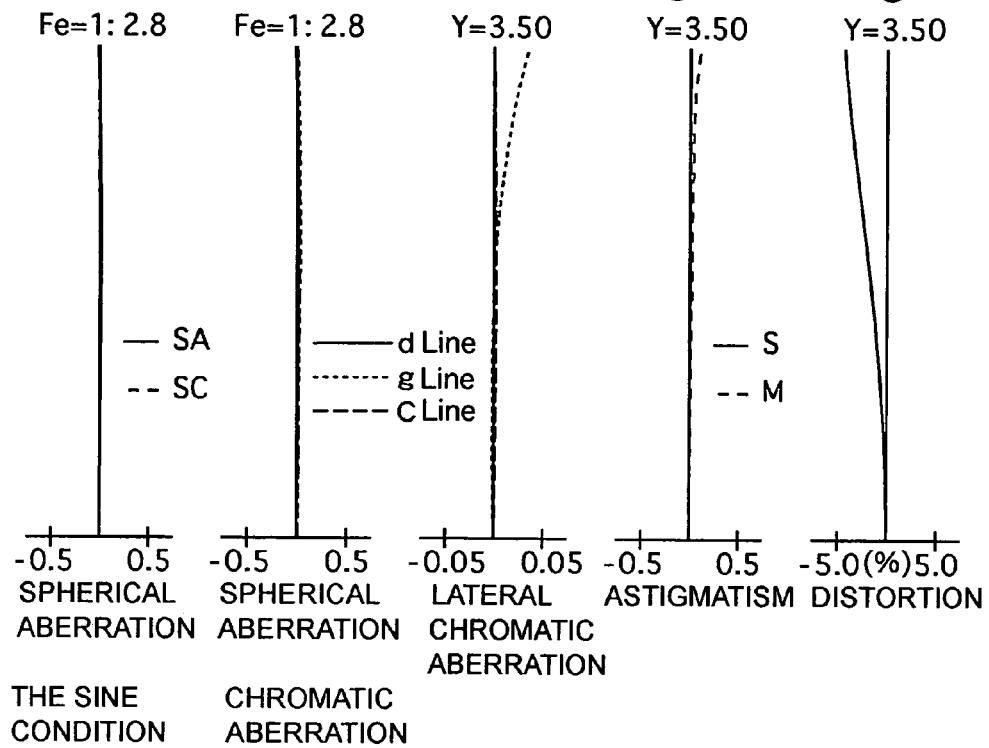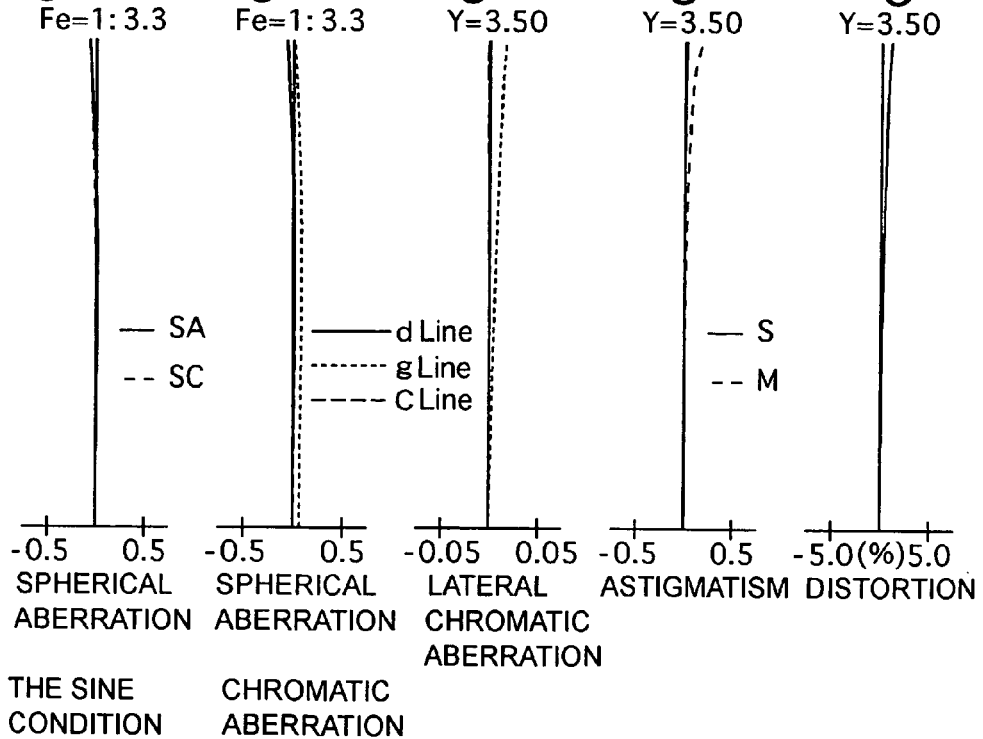

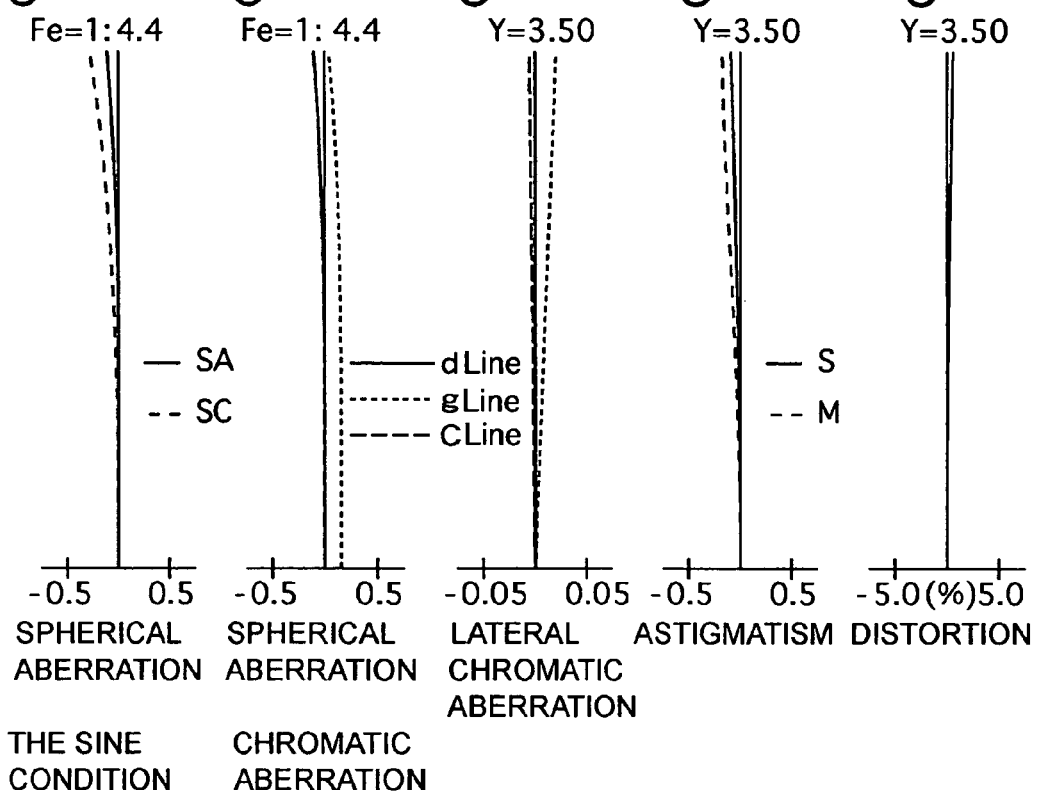

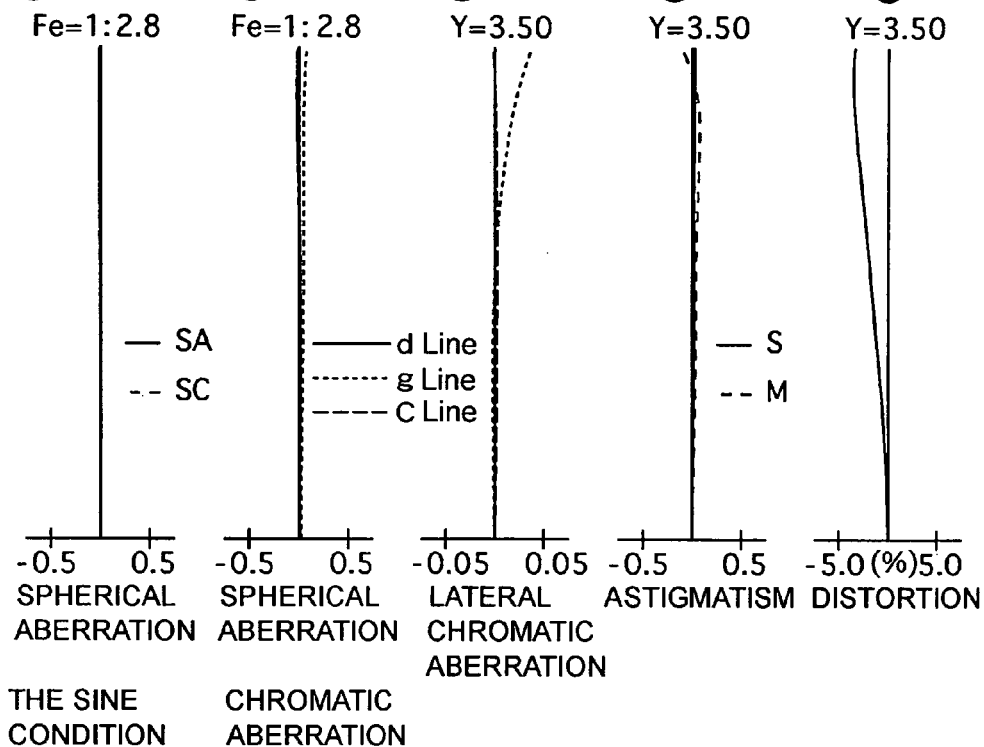
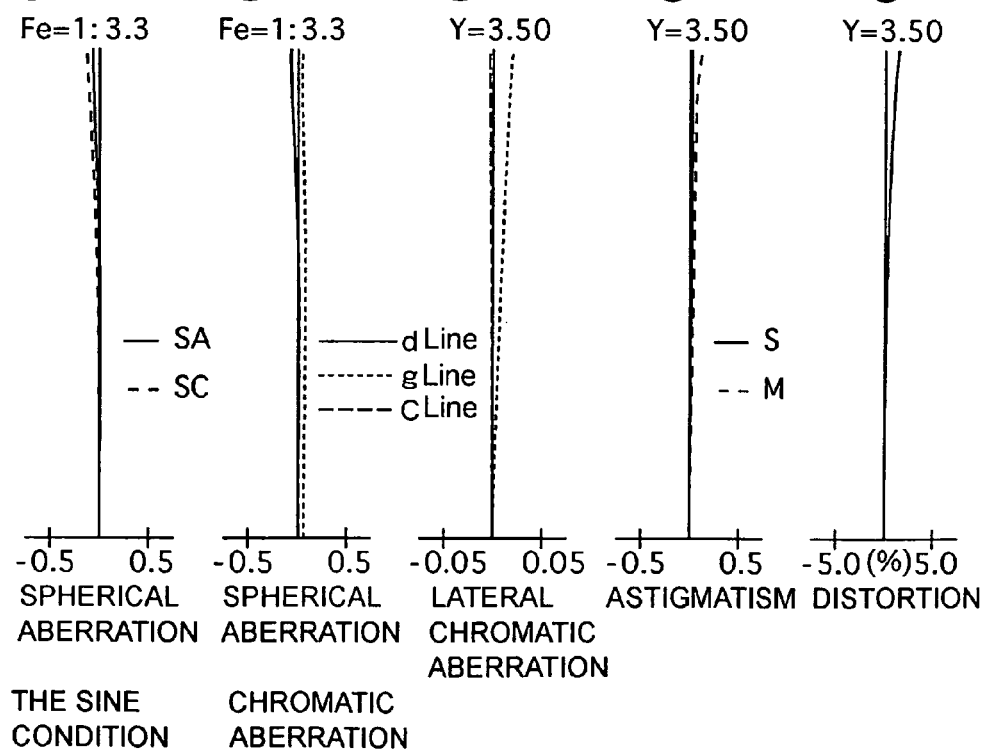

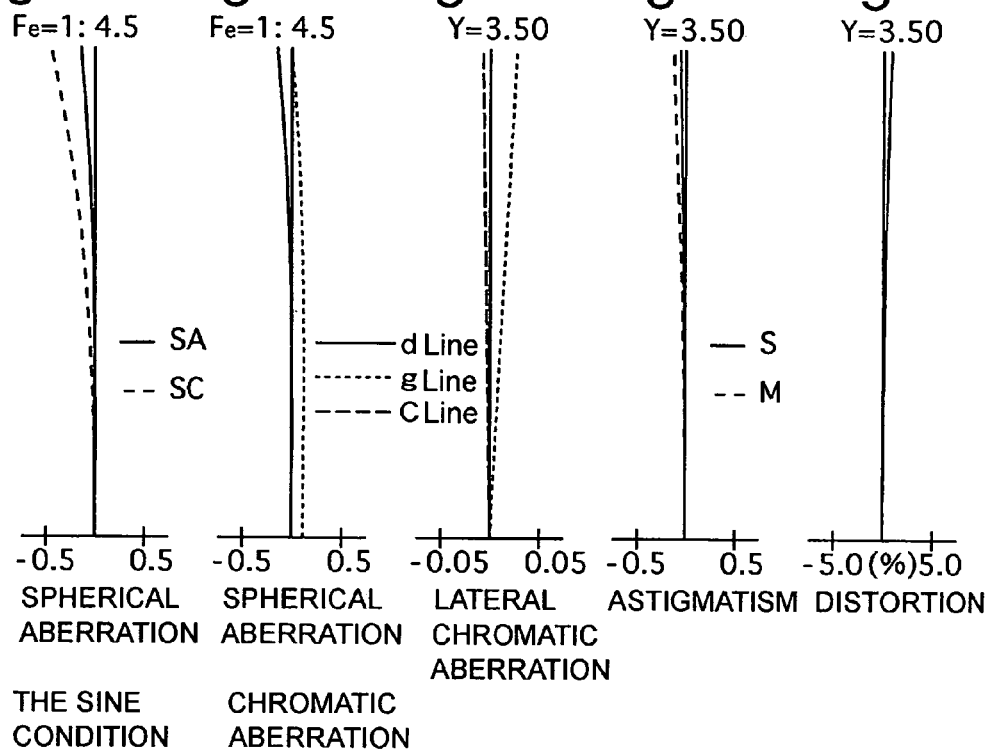

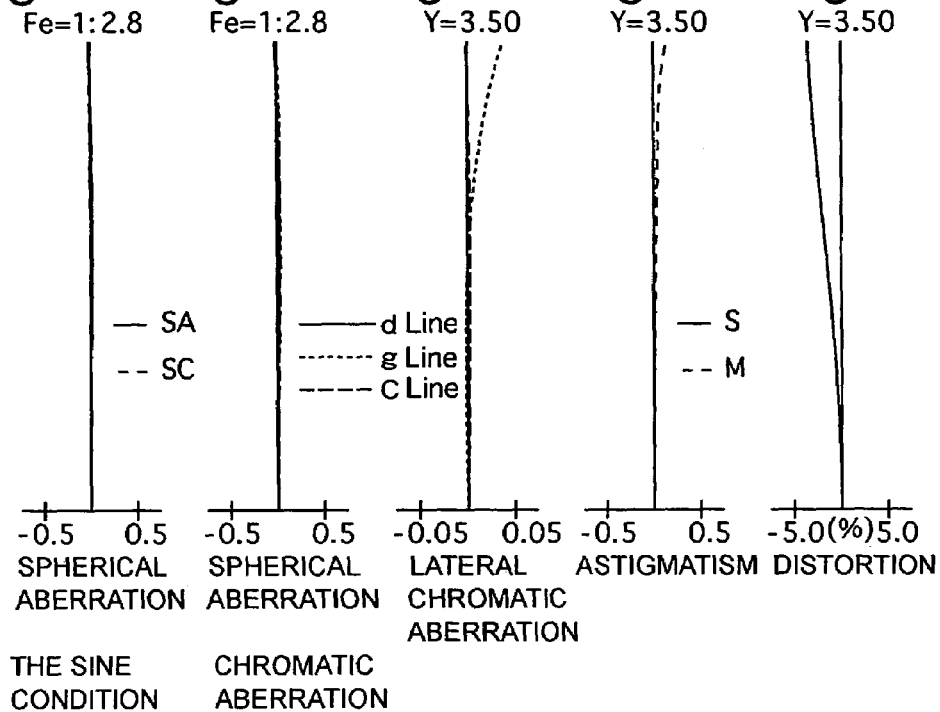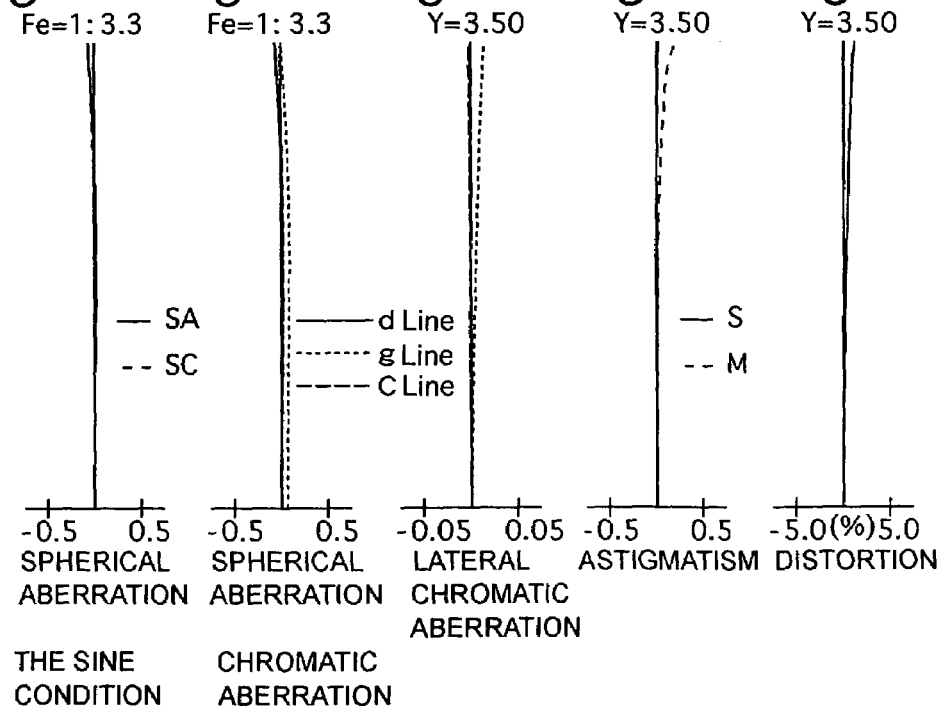

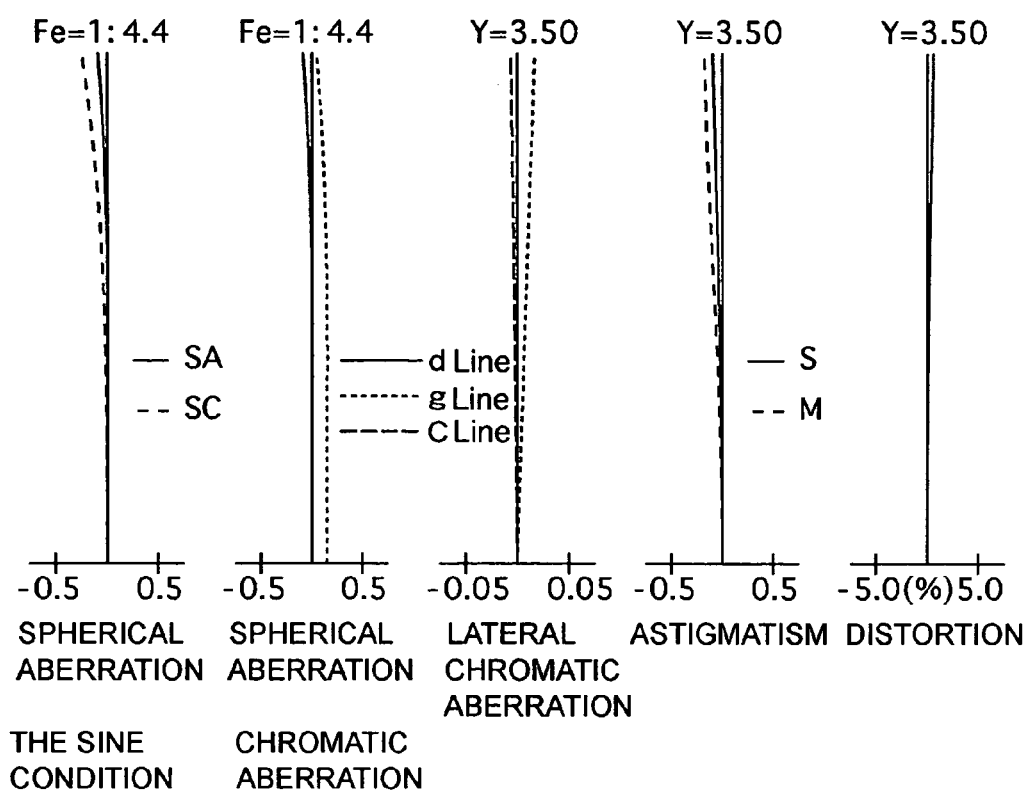

Fig. 66
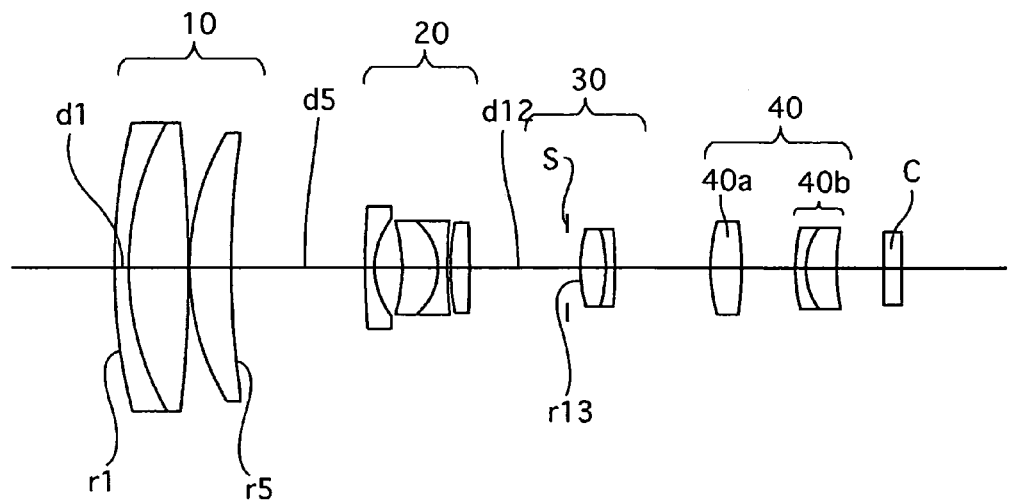
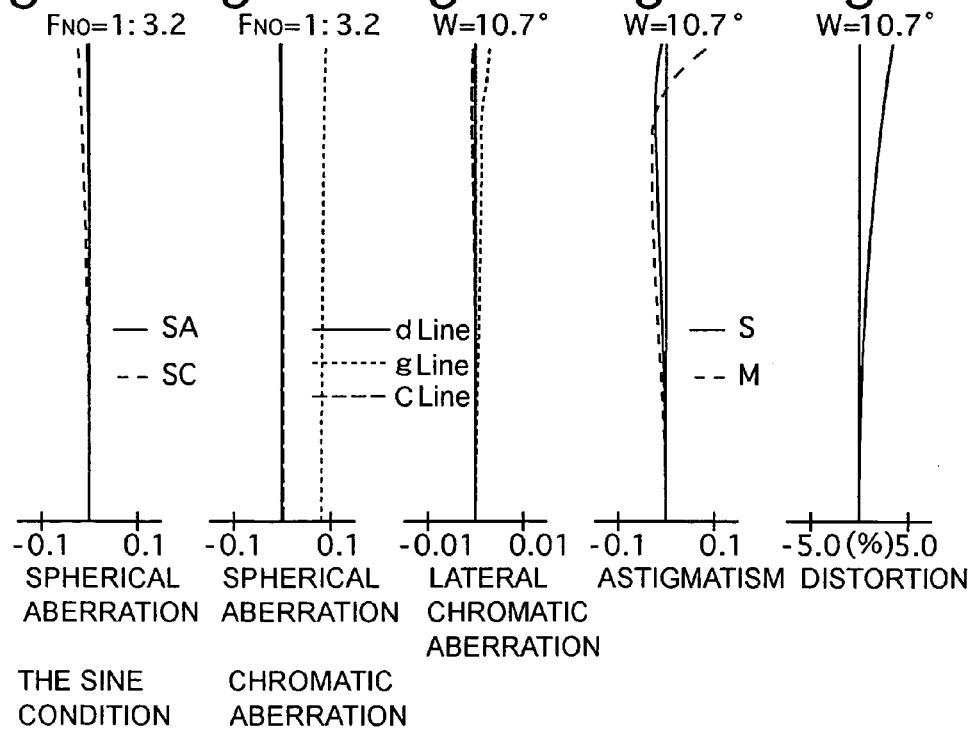
Fig.67A Fig.67B Fig.67C Fig.67D Fig.67E

Fig. 68
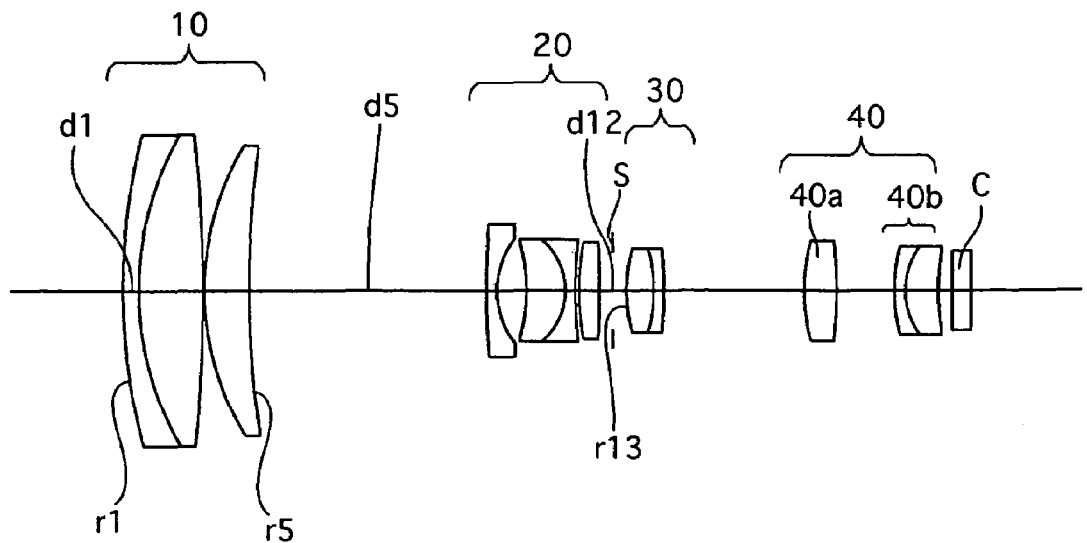
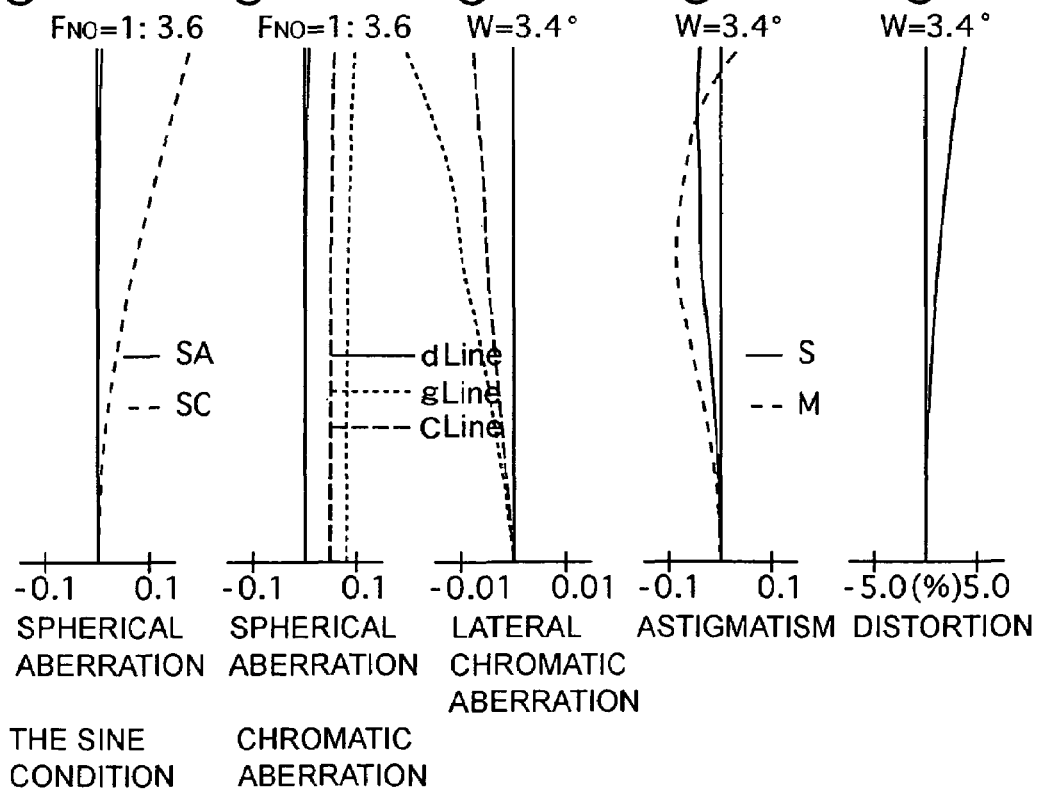

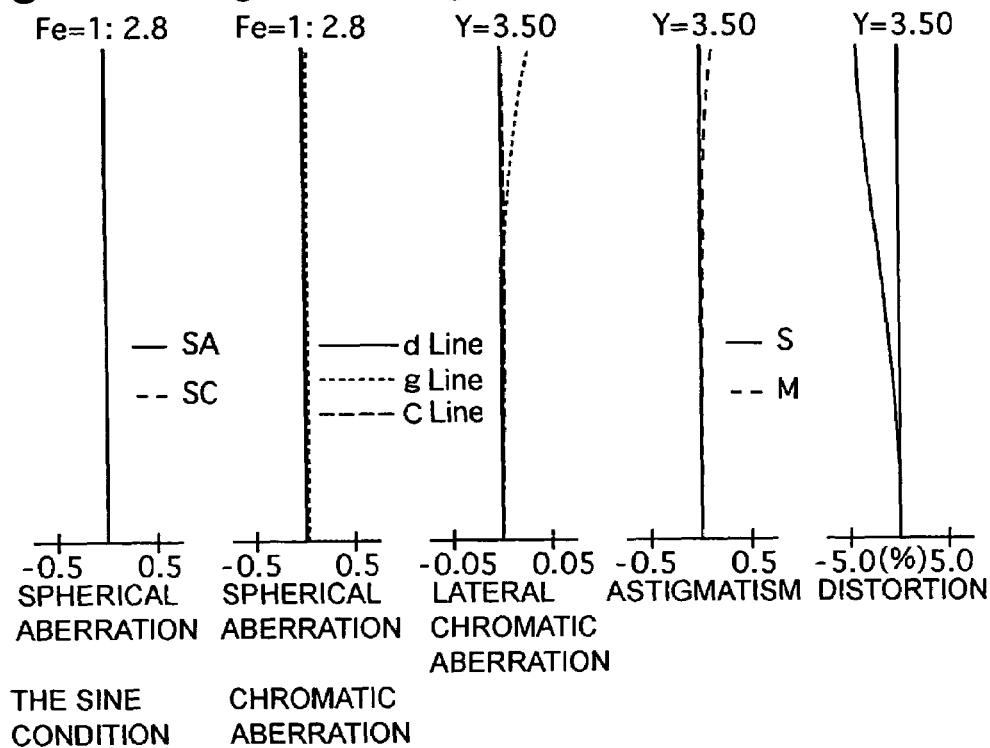
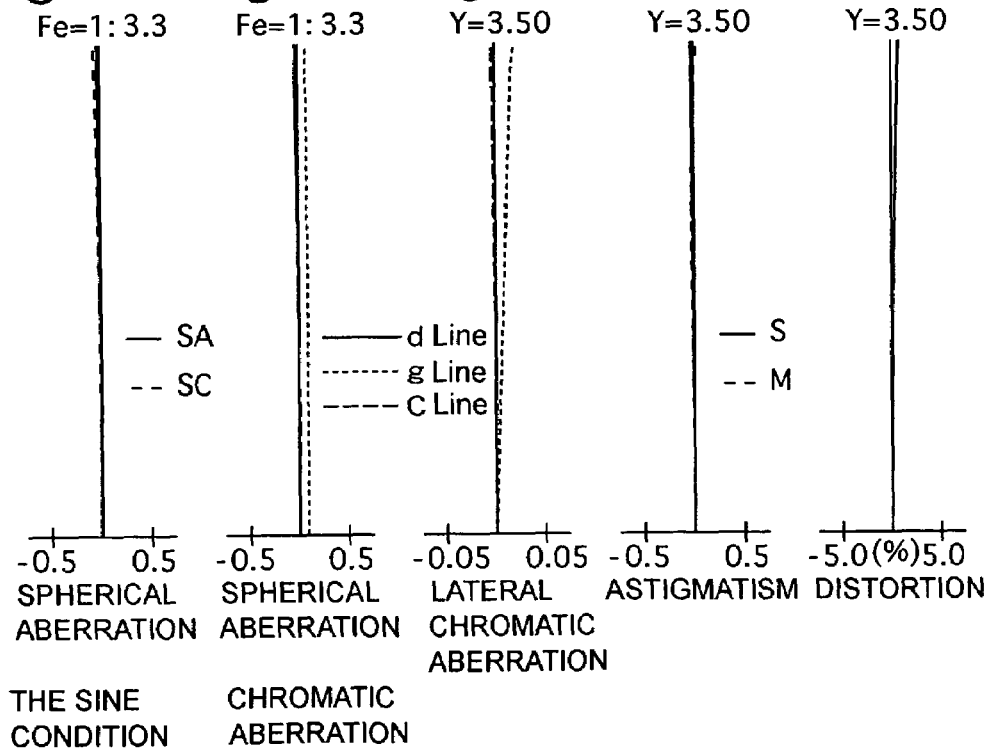

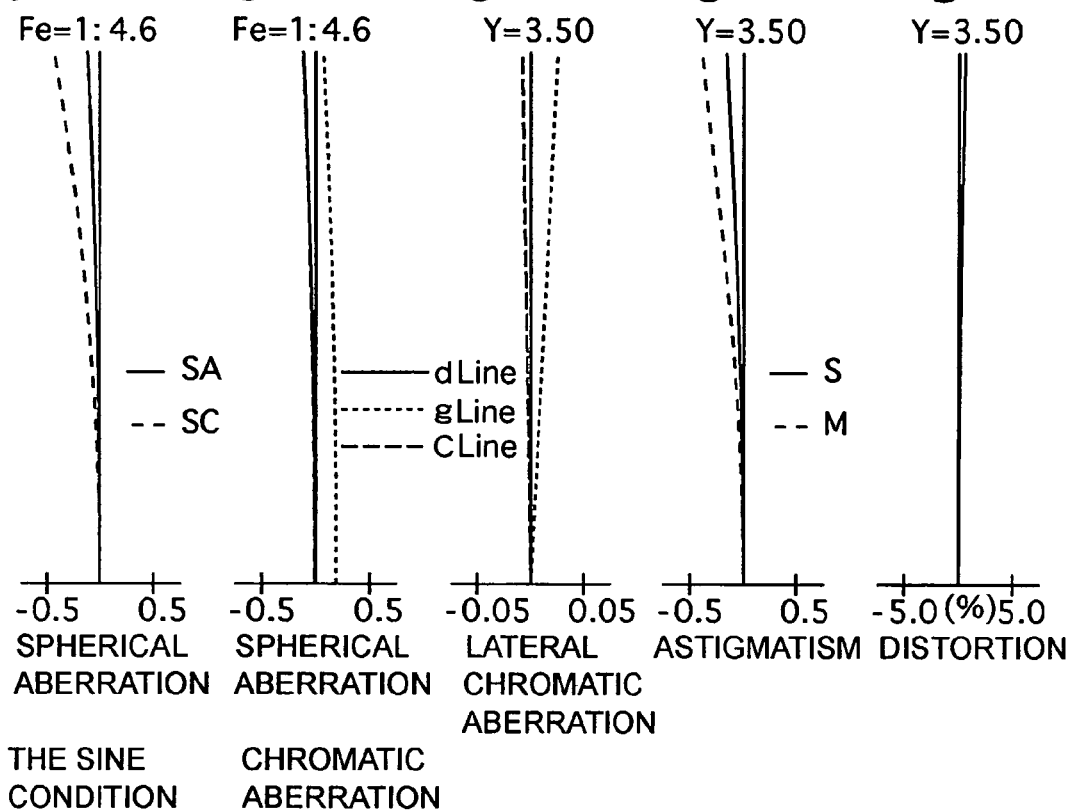

Fig. 73
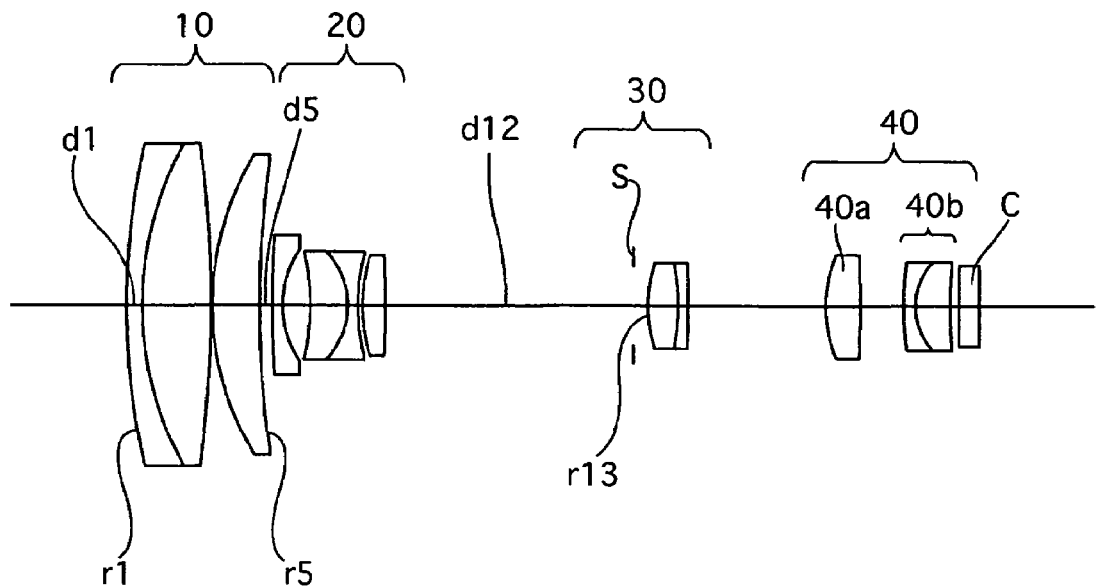
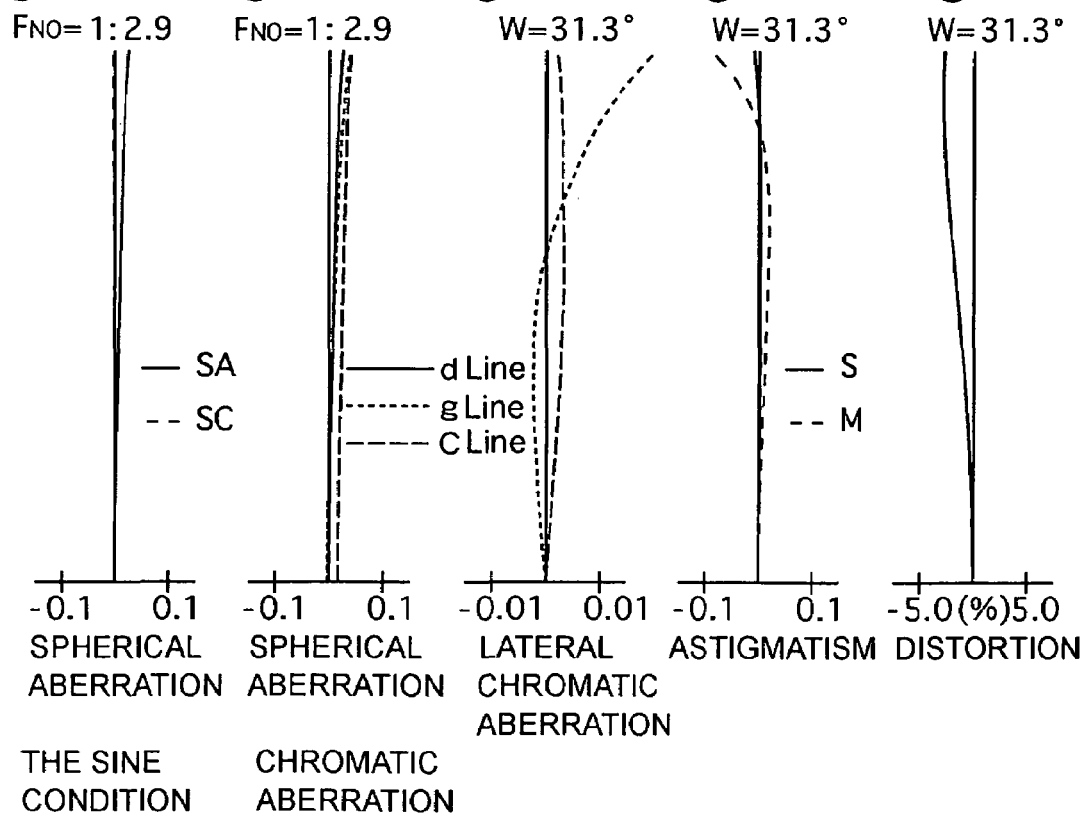
Fig.74A Fig.74B Fig.74C Fig.74D Fig.74E

Fig. 75
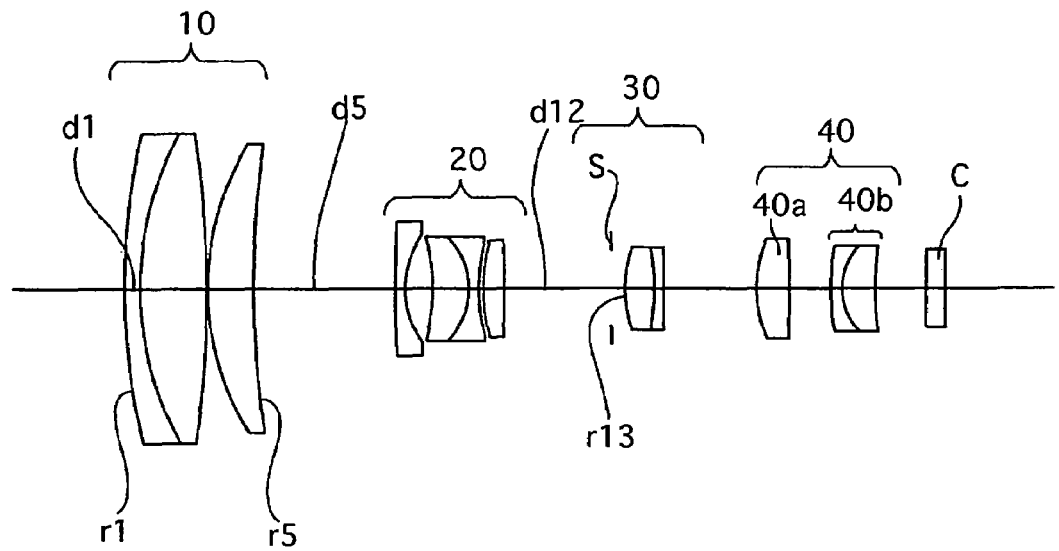
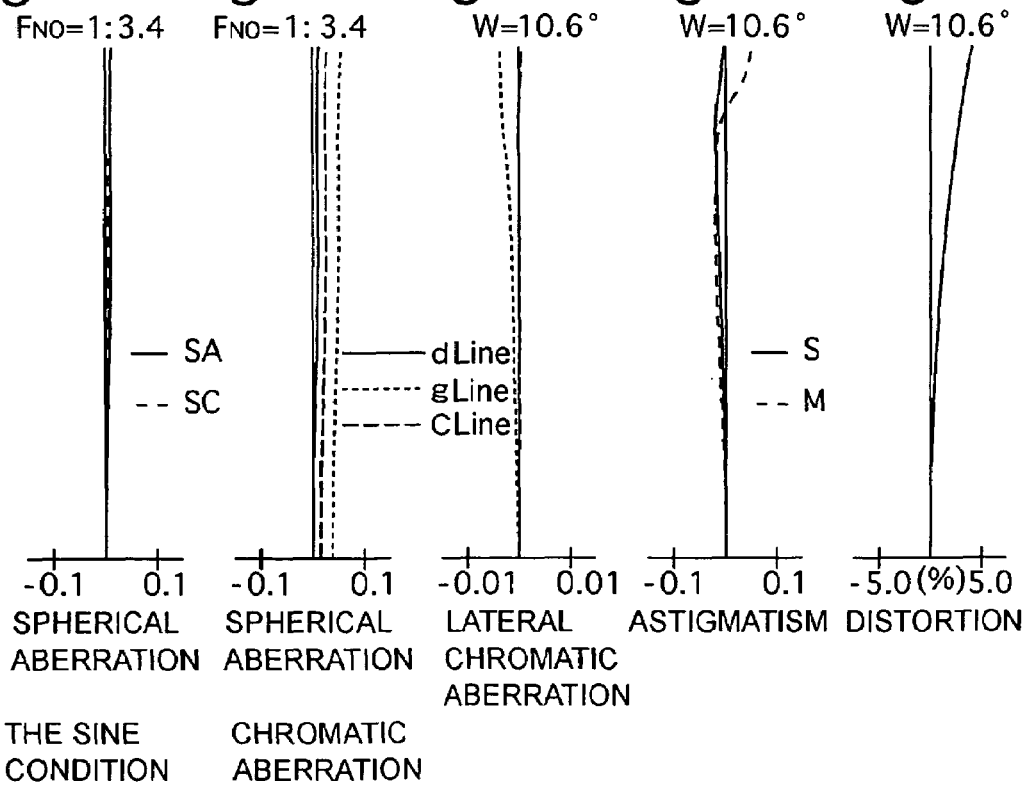
Fig.76A  Fig.76B  Fig.76C  Fig.76D  Fig.76E

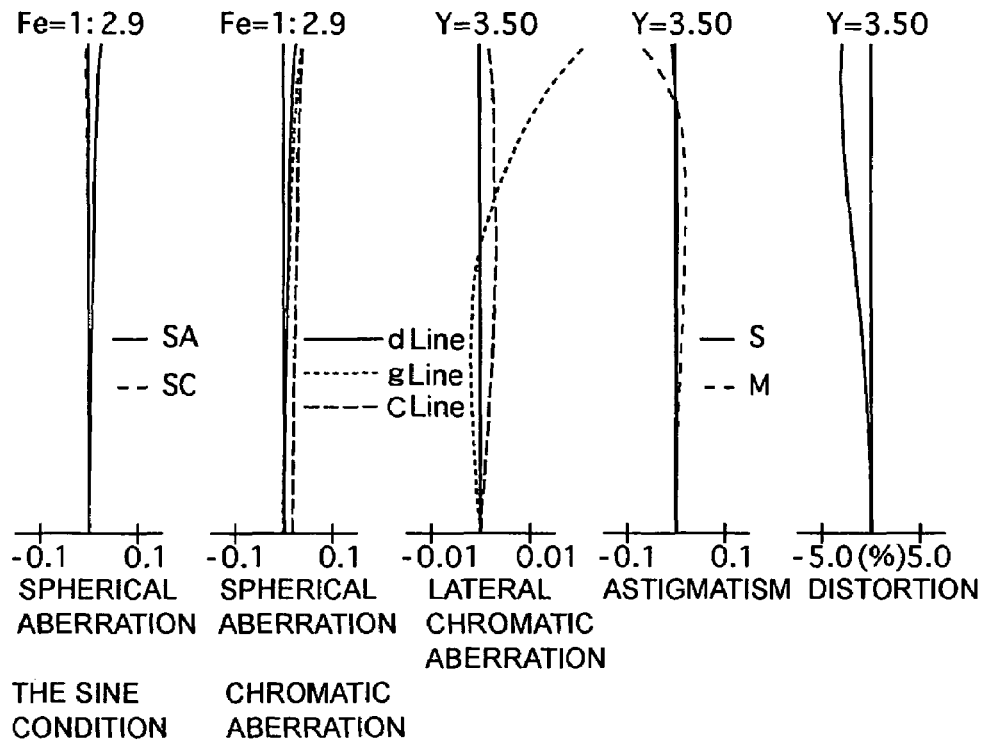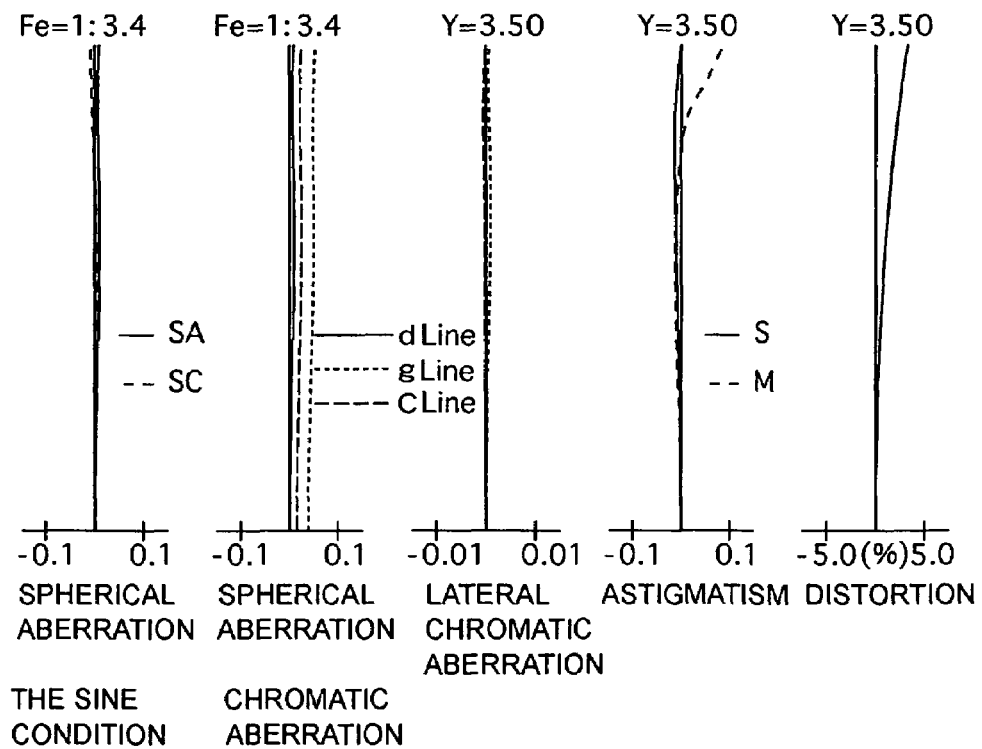

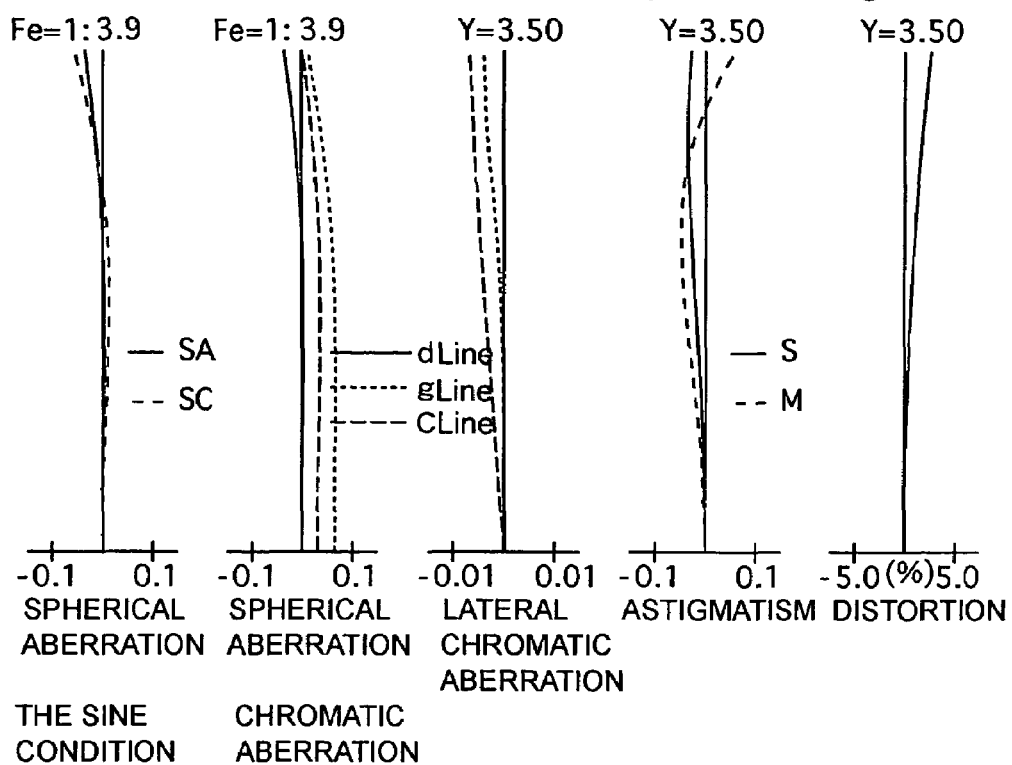

Fig. 82
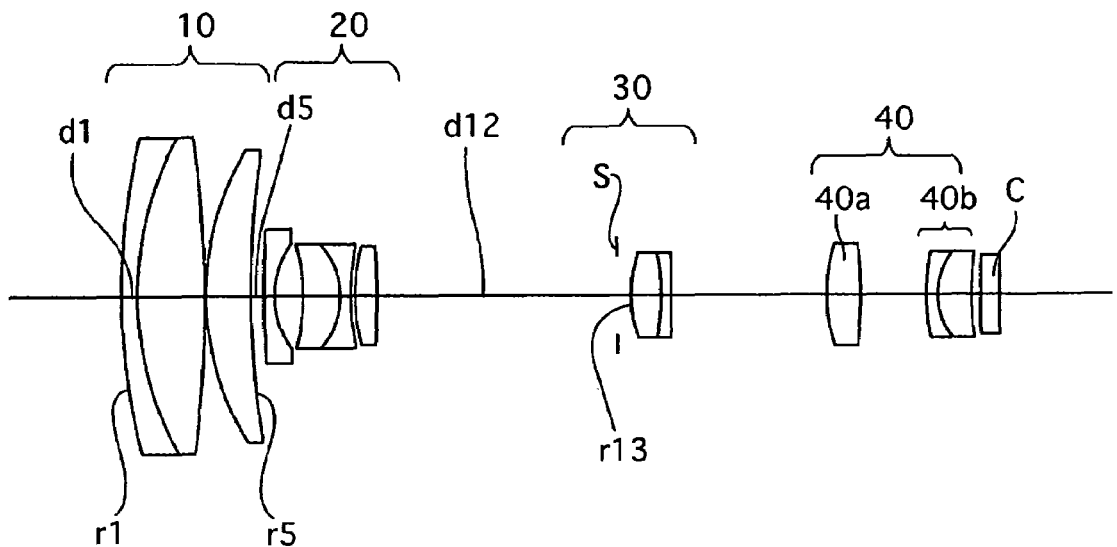
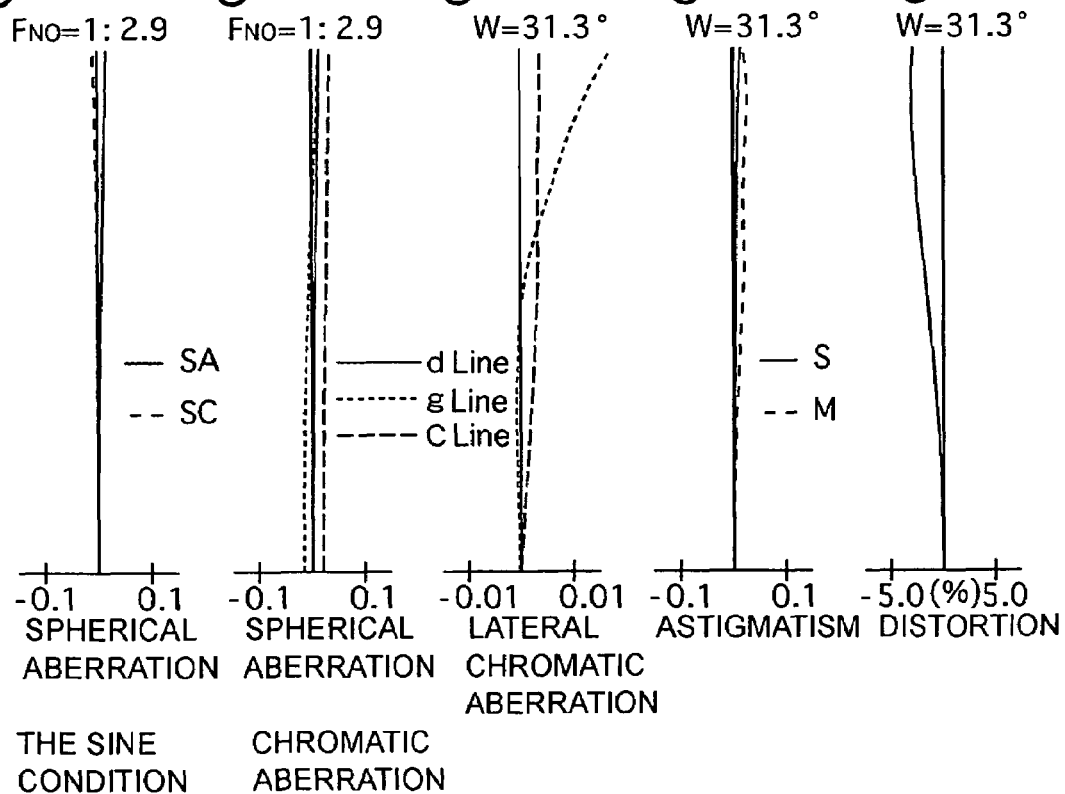
Fig.83A  Fig.83B  Fig.83C  Fig.83D  Fig.83E

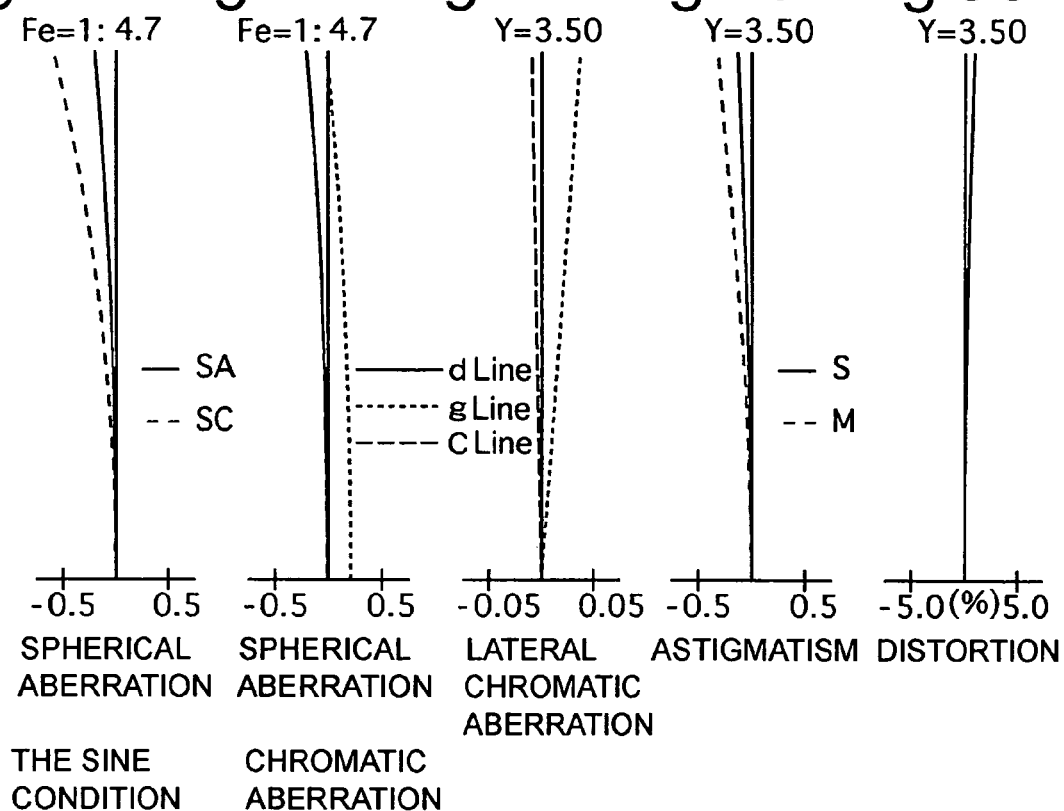

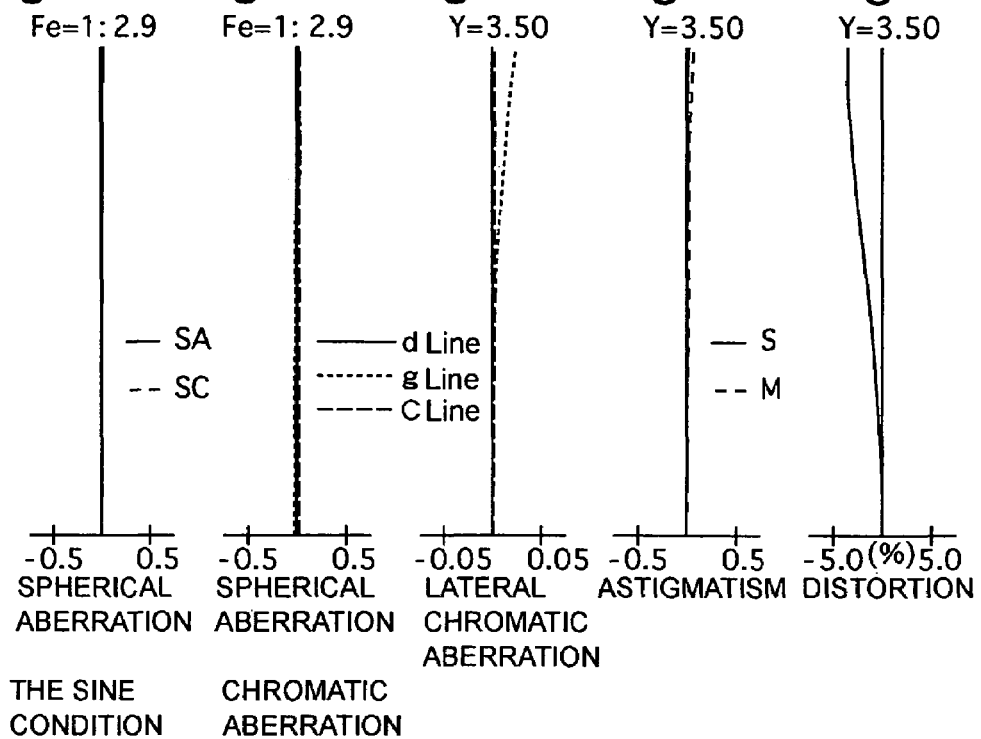
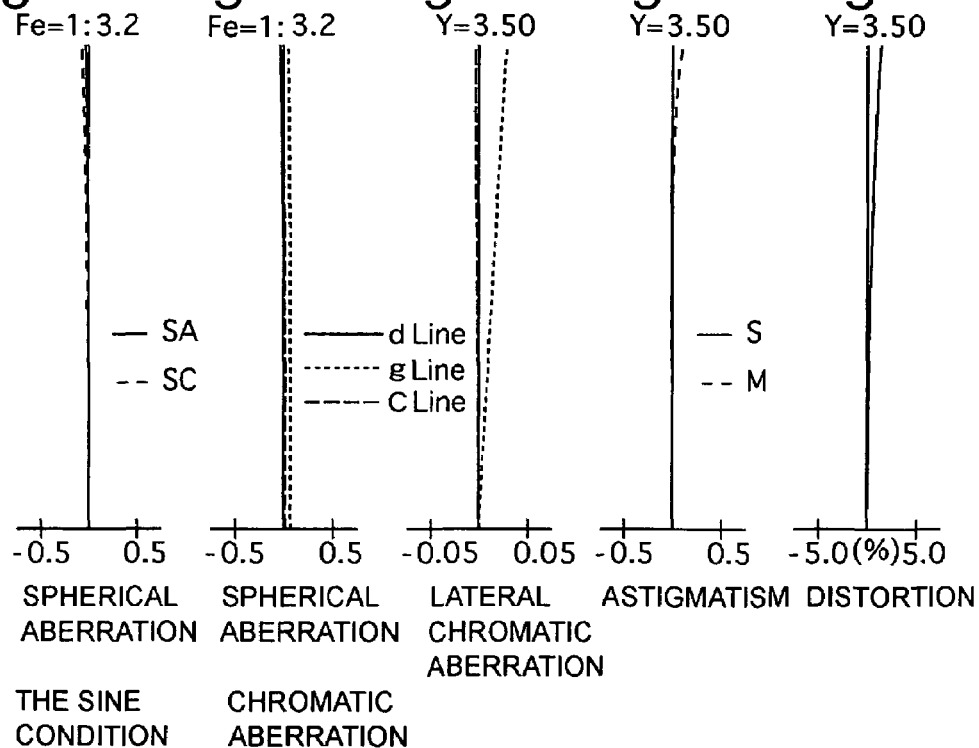

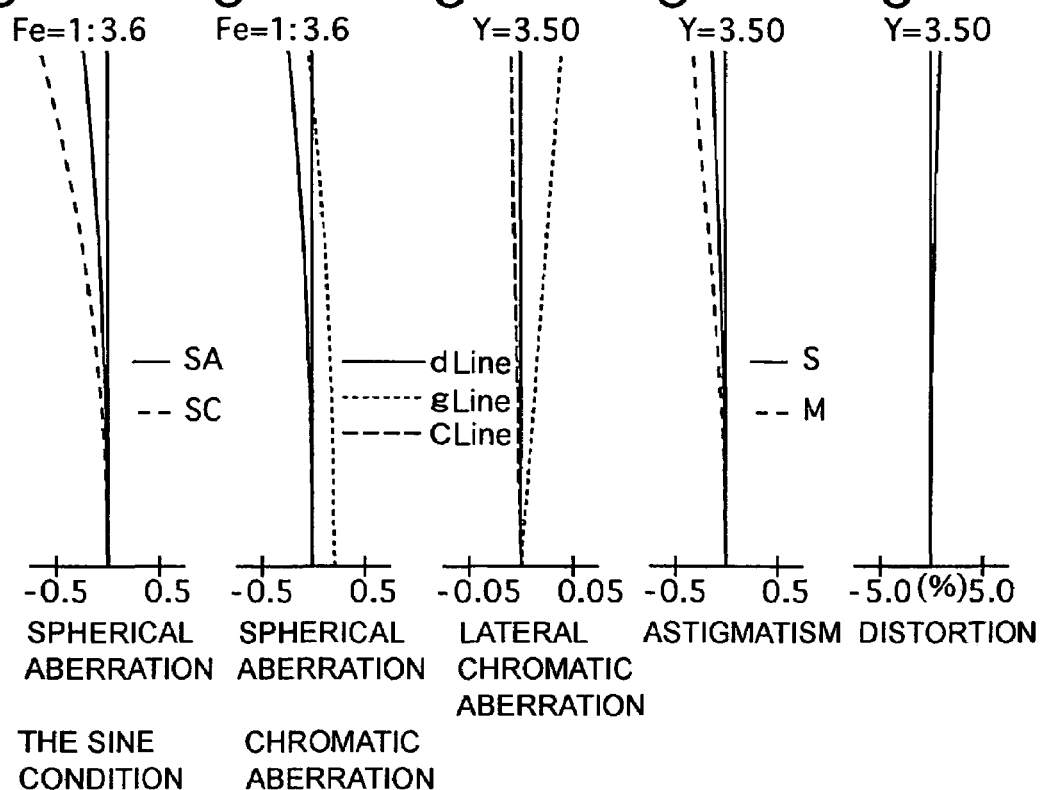

ZOOM LENS SYSTEM

BACKGROUND OF THE INVENTION

1. Field of the Invention

The present invention relates to a small zoom lens system which is used in a video camera and a digital camera, etc., and has a zoom ratio of about 10:1, and in particular, relates to such a small zoom lens system of a four-lens-group arrangement, i.e., a lens group having a positive refractive power (hereinafter a positive lens group), a lens group having a negative refractive power (hereinafter, a negative lens group), another positive lens group, and the other positive lens group, in this order from the object.

2. Description of the Prior Art

In a zoom lens system of the four-lens-group arrangement, i.e., a positive lens group, a negative lens group, another positive lens group, and the other positive lens group, in this order from the object, a rear-focusing system, in which the fourth (final) lens group (i.e., the most image-side lens group) is arranged to be a focusing lens group, has commonly been employed. However, in such a rear-focusing type zoom lens system, if the shortest photographic distance is made further shorter, the traveling distance of the focusing lens group becomes longer, so that it takes longer time to perform a focusing operation. Moreover, in the rear-focusing type zoom lens system, it has been known that filed curvature largely and undesirably occurs therein.

In addition to the above, an inner-focusing type zoom lens system in which the second lens group is arranged to be a focusing lens group has been known in the art. However, the second lens group is in general used as a zooming lens group, so that the lateral magnification of the second lens group largely varies when the second lens group is being moved for zooming. Accordingly, during the movement of the second lens group, it is often the case where the lateral magnification the second lens group becomes 1.0. If this occurs, focusing cannot be performed thereat.

If an attempt is made to avoid the lateral magnification of 1.0 (life size) during a focusing operation, the zooming range has to be designed with respect to a less-than life size magnification (reducing magnification) only, or with respect to a more-than life size (enlarging magnification) only, respectively. However, such an arrangement limits the degree of freedom on optical design.

Furthermore, in order to miniaturize the zoom lens system, the lens arrangements of the third and fourth lens groups which are arranged to form an image by collecting a diverging light rays emitted from the second lens group becomes increasingly important.

SUMMARY OF THE INVENTION

The present invention provides a miniaturized zoom lens system of four-lens-group arrangement, i.e., a positive lens group, a negative lens group, another positive lens group, and the other positive lens group, in this order from the object; and the zoom lens system has a zoom ratio of 10:1. In particular, the present invention has been devised to present a new arrangement of the zoom lens system by considering the arrangement of the positive fourth lens group.

According to an aspect of the present invention, there is provided a zoom lens system including a positive first lens group, a negative second lens group, a positive third lens group, and a positive fourth lens group, in this order from the object.

Upon zooming from the short focal length extremity to the long focal length extremity, the negative second lens group is arranged to move from the object side to the image side, and the positive fourth lens group is arranged to move in order to compensate the move of the image plane which occurs upon zooming.

The positive fourth lens group includes a first sub-lens group constituted by a positive lens element, and a second sub-lens group constituted by cemented lens elements having a negative lens element and a positive lens element, in this order from the object.

The first sub-lens group has an aspherical surface on at least the object-side surface thereof. The aspherical surface is arranged to have a feature that the higher a height from the optical axis in a radial direction becomes the weaker the refractive power is, compared with a paraxial spherical surface; and the first sub-lens group satisfies the following conditions:

$$-0.55 < f4a/f4b < -0.07 \quad (1)$$

$$0.15 < d4ab/f4 < 0.50 \quad (2)$$

wherein f4$a$ designates the focal length of the first sub-lens group of the positive fourth lens group;

f4$b$ designates the focal length of the second sub-lens group of the positive fourth lens group;

d4$ab$ designates the distance between the first sub-lens group and the second sub-lens group of the positive fourth lens group; and f4 designates the focal length of the positive fourth lens group.

The positive first lens group can include cemented lens elements having a negative lens element and a positive lens element, and a positive meniscus lens element having the convex surface facing toward the object, in this order from the object.

The negative second lens group can include a negative lens element having a deep concave surface on the image-side thereof, cemented lens elements having a positive lens element having a concave surface on the object-side thereof and a negative lens element having a concave surface on the object-side thereof, and a positive lens element, in this order from the object.

The positive third lens group includes cemented lens elements having a positive lens element and a negative lens element.

The zoom lens system preferably satisfies the following condition:

$$0.07 < f3/f4 < 2.50 \quad (3)$$

wherein f3 designates the focal length of the positive third lens group; and f4 designates the focal length of the positive fourth lens group.

The zoom lens system preferably satisfies the following condition:

$$-0.85 < fw/f2 < -0.7 \quad (4)$$

wherein fw designates the focal length of the entire zoom lens system at the short focal length extremity; and f2 designates the focal length of the negative second lens group.

The zoom lens system preferably can satisfy the following conditions:

$$v_{12} > 70 \tag{5}$$

$$1.9 < v_{11}/f_{11} + (v_{12}+v_{13})/2/f_{12\text{-}13} < 2.9 \tag{6}$$

wherein $v_{12}$ designates the Abbe number of a second lens element from the most object-side lens element of the positive first lens group;

$v_{11}$ designates the Abbe number of the most object-side lens element of the positive first lens group;

$v_{11}$ designates the focal length of the most object-side lens element of the positive first lens group;

$v_{13}$ designates the Abbe number of a third lens element from the most object-side lens element of the positive first lens group; and $f_{12\text{-}13}$ designates the combined focal length of the second and third lens elements from the most object-side lens element of the positive first lens group.

In the case where the positive third lens group is constituted by the cemented lens elements having the positive lens element and the negative lens element, a non-cemented surface of the positive lens element is preferably provided with an aspherical surface. The aspherical surface is arranged to have a feature that the higher a height from the optical axis in a radial direction becomes the weaker the refractive power is, compared with a paraxial spherical surface.

The positive third lens group preferably satisfies the following conditions:

$$v3p > 80 \tag{7}$$

$$3.8 < v_{3p}/f_{3p} + v_{3n}/f_{3n} < 6.0 \tag{8}$$

wherein $v_{3p}$ designates the Abbe number of the positive lens element of the positive third lens group;

$f_{3p}$ designates the focal length of the positive lens element of the positive third lens group;

$v_{3n}$ designates the Abbe number of the negative lens element of the positive third lens group; and $f_{3n}$ designates the focal length of the negative lens element of the positive third lens group.

According to another (second) aspect of the present invention, there is provided a zoom lens system including a positive first lens group, a negative second lens group, a positive third lens group, and a positive fourth lens group, in this order from the object.

Upon zooming from the short focal length extremity to the long focal length extremity, the negative second lens group is arranged to move from the object side to the image side, and the positive fourth lens group is arranged to move in order to compensate the move of the image plane which occurs upon zooming.

The lateral magnification of the negative second lens group becomes 1.0 upon zooming, and the positive fourth lens group is used as a focusing lens group throughout all the zooming ranges of the zoom lens system. Furthermore, the negative second lens group is used as another focusing lens group with respect to at least a portion of the zooming ranges.

In the case of the second aspect of the present invention, the following two options (i) and (ii) are possible with respect to the traveling distances of the negative second lens group and the positive fourth lens group upon focusing:

(i) The ratio of the traveling distance of the positive fourth lens group to that of the negative second lens group is made constant over the all zooming ranges; or (ii) The ratio of the traveling distance of the negative second lens group to that of the positive fourth lens group is made variable in accordance with the change in the focal length upon zooming from the short focal length extremity to the long focal length extremity.

In the case of (i), the negative second lens group and the positive fourth lens group preferably satisfy the following condition:

$$0 < dX4/dX2 < 6 \tag{9}$$

wherein dX4 designates the traveling distance of the positive fourth lens group when focusing is being performed; and dX2 designates the traveling distance of the negative second lens group when focusing is being performed.

Note that control of focusing becomes easier if the value of dX4/dX2 is set to be an integer.

On the other hand, in the case of (ii), the negative second lens group and the positive fourth lens group preferably satisfy the following condition:

$$0 \leq dX2/dX4 \leq 1 \tag{10}$$

wherein dX4 designates the traveling distance of the positive fourth lens group when focusing is being performed; and dX2 designates the traveling distance of the negative second lens group when focusing is being performed.

Note that from the short focal length extremity to the long focal length extremity, the value of dX2/dX4 can be determined to vary from 0 to 1, and thereafter to vary in a stepwise manner to become less than 1 (e.g., ½, ⅓).

The present disclosure relates to subject matter contained in Japanese Patent Application No. 2004-142893 (filed on May 12, 2004) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the zoom lens system, at the short focal length extremity, according to a first embodiment of the present invention, when an object at infinity is in an in-focus state;

FIGS. 2A, 2B, 2C, 2D and 2E show aberrations occurred in the lens arrangement of FIG. 1;

FIG. 3 is a lens arrangement of the zoom lens system, at an intermediate focal length, according to the first embodiment of the present invention, when an object at infinity is in an in-focus state;

FIGS. 4A, 4B, 4C, 4D and 4E show aberrations occurred in the lens arrangement of FIG. 3;

FIG. 5 is a lens arrangement of the zoom lens system, at the long focal length extremity, according to the first embodiment of the present invention, when an object at infinity is in an in-focus state;

FIGS. 6A, 6B, 6C, 6D and 6E show aberrations occurred in the lens arrangement of FIG. 5;

FIGS. 7A, 7B, 7C, 7D and 7E show aberrations occurred in the zoom lens system of the first embodiment at the short focal length extremity, when an object at a finite photographic distance is in an in-focus state;

FIGS. 8A, 8B, 8C, 8D and 8E show aberrations occurred in the zoom lens system of the first embodiment at an intermediate focal length, when an object at a finite photographic distance is in an in-focus state;

FIGS. 9A, 9B, 9C, 9D and 9E show aberrations occurred in the zoom lens system of the first embodiment at the long focal length extremity, when an object at a finite photographic distance is in an in-focus state;

FIG. 10 is a lens arrangement of the zoom lens system, at the short focal length extremity, according to a second embodiment of the present invention, when an object at infinity is in an in-focus state;

FIGS. 11A, 11B, 11C, 11D and 11E show aberrations occurred in the lens arrangement of FIG. 10;

FIG. 14 is a lens arrangement of the zoom lens system, at the long focal length extremity, according to the second embodiment of the present invention, when an object at infinity is in an in-focus state;

FIGS. 15A, 15B, 15C, 15D and 15E show aberrations occurred in the lens arrangement of FIG. 14;

FIGS. 16A, 16B, 16C, 16D and 16E show aberrations occurred in the zoom lens system of the second embodiment at the short focal length extremity, when an object at a finite photographic distance is in an in-focus state;

FIGS. 17A, 17B, 17C, 17D and 17E show aberrations occurred in the zoom lens system of the second embodiment at an intermediate focal length, when an object at a finite photographic distance is in an in-focus state;

FIGS. 18A, 18B, 18C, 18D and 18E show aberrations occurred in the zoom lens system of the second embodiment at the long focal length extremity, when an object at a finite photographic distance is in an in-focus state;

FIGS. 25A, 25B, 25C, 25D and 25E show aberrations occurred in the zoom lens system of the third embodiment at the short focal length extremity, when an object at a finite photographic distance is in an in-focus state;

FIGS. 26A, 26B, 26C, 26D and 26E show aberrations occurred in the zoom lens system of the third embodiment at an intermediate focal length, when an object at a finite photographic distance is in an in-focus state;

FIGS. 27A, 27B, 27C, 27D and 27E show aberrations occurred in the zoom lens system of the third embodiment at the long focal length extremity, when an object at a finite photographic distance is in an in-focus state;

FIGS. 34A, 34B, 34C, 34D and 34E show aberrations occurred in the zoom lens system of the fourth embodiment at the short focal length extremity, when an object at a finite photographic distance is in an in-focus state;

FIGS. 35A, 35B, 35C, 35D and 35E show aberrations occurred in the zoom lens system of the fourth embodiment at an intermediate focal length, when an object at a finite photographic distance is in an in-focus state;

FIGS. 36A, 36B, 36C, 36D and 36E show aberrations occurred in the zoom lens system of the fourth embodiment at the long focal length extremity, when an object at a finite photographic distance is in an in-focus state;

FIGS. 43A, 43B, 43C, 43D and 43E show aberrations occurred in the zoom lens system of the fifth embodiment at the short focal length extremity, when an object at a finite photographic distance is in an in-focus state;

FIGS. 44A, 44B, 44C, 44D and 44E show aberrations occurred in the zoom lens system of the fifth embodiment at an intermediate focal length, when an object at a finite photographic distance is in an in-focus state;

FIGS. 45A, 45B, 45C, 45D and 45E show aberrations occurred in the zoom lens system of the fifth embodiment at the long focal length extremity, when an object at a finite photographic distance is in an in-focus state;

FIGS. 52A, 52B, 52C, 52D and 52E show aberrations occurred in the zoom lens system of the sixth embodiment at the short focal length extremity, when an object at a finite photographic distance is in an in-focus state;

FIGS. 53A, 53B, 53C, 53D and 53E show aberrations occurred in the zoom lens system of the sixth embodiment at an intermediate focal length, when an object at a finite photographic distance is in an in-focus state;

FIGS. 54A, 54B, 54C, 54D and 54E show aberrations occurred in the zoom lens system of the sixth embodiment at the long focal length extremity, when an object at a finite photographic distance is in an in-focus state;

FIGS. 61A, 61B, 61C, 61D and 61E show aberrations occurred in the zoom lens system of the seventh embodiment at the short focal length extremity, when an object at a finite photographic distance is in an in-focus state;

FIGS. 62A, 62B, 62C, 62D and 62E show aberrations occurred in the zoom lens system of the seventh embodiment at an intermediate focal length, when an object at a finite photographic distance is in an in-focus state;

FIGS. 63A, 63B, 63C, 63D and 63E show aberrations occurred in the zoom lens system of the seventh embodiment at the long focal length extremity, when an object at a finite photographic distance is in an in-focus state;

FIG. 66 is a lens arrangement of the zoom lens system, at an intermediate focal length, according to the eighth embodiment of the present invention, when an object at infinity is in an in-focus state;

FIGS. 67A, 67B, 67C, 67D and 67E show aberrations occurred in the lens arrangement of FIG. 66;

FIG. 68 is a lens arrangement of the zoom lens system, at the long focal length extremity, according to the eighth embodiment of the present invention, when an object at infinity is in an in-focus state;

FIGS. 69A, 69B, 69C, 69D and 69E show aberrations occurred in the lens arrangement of FIG. 68;

FIGS. 70A, 70B, 70C, 70D and 70E show aberrations occurred in the zoom lens system of the eighth embodiment at the short focal length extremity, when an object at a finite photographic distance is in an in-focus state;

FIGS. 71A, 71B, 71C, 71D and 71E show aberrations occurred in the zoom lens system of the eighth embodiment at an intermediate focal length, when an object at a finite photographic distance is in an in-focus state;

FIGS. 72A, 72B, 72C, 72D and 72E show aberrations occurred in the zoom lens system of the eighth embodiment at the long focal length extremity, when an object at a finite photographic distance is in an in-focus state;

FIG. 73 is a lens arrangement of the zoom lens system, at the short focal length extremity, according to a ninth embodiment of the present invention, when an object at infinity is in an in-focus state;

FIGS. 74A, 74B, 74C, 74D and 74E show aberrations occurred in the lens arrangement of FIG. 73;

FIG. 75 is a lens arrangement of the zoom lens system, at an intermediate focal length, according to the ninth embodiment of the present invention, when an object at infinity is in an in-focus state;

FIGS. 76A, 76B, 76C, 76D and 76E show aberrations occurred in the lens arrangement of FIG. 75;

FIGS. 79A, 79B, 79C, 79D and 79E show aberrations occurred in the zoom lens system of the ninth embodiment at the short focal length extremity, when an object at a finite photographic distance is in an in-focus state;

FIGS. 80A, 80B, 80C, 80D and 80E show aberrations occurred in the zoom lens system of the ninth embodiment at an intermediate focal length, when an object at a finite photographic distance is in an in-focus state;

FIGS. 81A, 81B, 81C, 81D and 81E show aberrations occurred in the zoom lens system of the ninth embodiment at the long focal length extremity, when an object at a finite photographic distance is in an in-focus state;

FIG. 82 is a lens arrangement of the zoom lens system, at the short focal length extremity, according to a tenth embodiment of the present invention, when an object at infinity is in an in-focus state;

FIGS. 83A, 83B, 83C, 83D and 83E show aberrations occurred in the lens arrangement of FIG. 82;

FIGS. 90A, 90B, 90C, 90D and 90E show aberrations occurred in the zoom lens system of the tenth embodiment at the long focal length extremity, when an object at a finite photographic distance is in an in-focus state;

FIGS. 97A, 97B, 97C, 97D and 97E show aberrations occurred in the zoom lens system of the eleventh embodiment at the short focal length extremity, when an object at a finite photographic distance is in an in-focus state;

FIGS. 98A, 98B, 98C, 98D and 98E show aberrations occurred in the zoom lens system of the eleventh embodiment at an intermediate focal length, when an object at a finite photographic distance is in an in-focus state;

FIGS. 99A, 99B, 99C, 99D and 99E show aberrations occurred in the zoom lens system of the eleventh embodiment at the long focal length extremity, when an object at a finite photographic distance is in an in-focus state;

DESCRIPTION OF THE PREFERRED EMBODIMENTS

Figure 100:
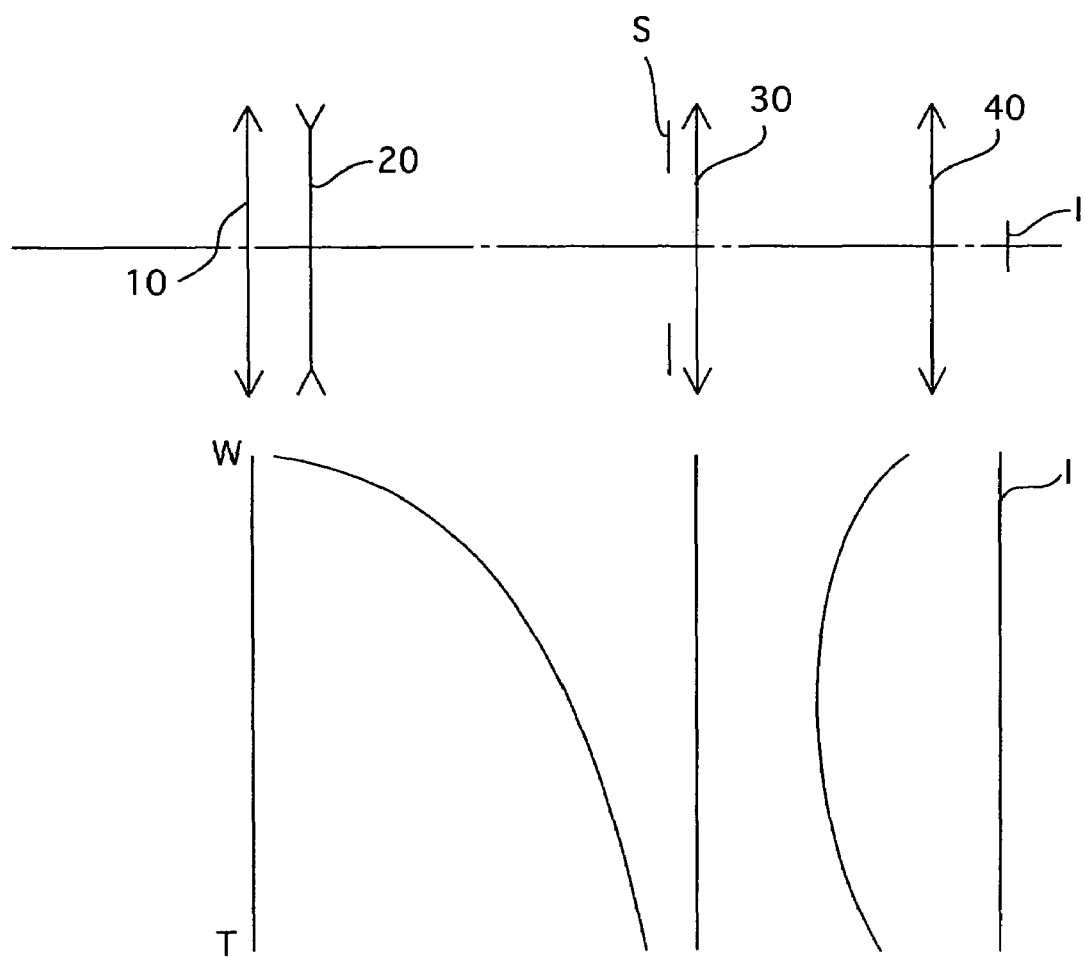
FIG. 100 shows lens-group moving paths of the zoom lens system according to the present invention.

The zoom lens system of the present invention, as shown in FIG. 100, includes a positive first lens group 10, a negative second lens group 20, a diaphragm S, a positive third lens group 30, and a positive fourth lens group 40, in this order from the object. A symbol 'I' in FIG. 100 designates the image plane.

Upon zooming from the short focal length extremity to the long focal length extremity, the positive first lens group 10 and the positive third lens group 30 are arranged not to move (remain stationary), and the negative second lens group 20 is arranged to move toward the image.

The positive fourth lens group 40 is arranged to move along the optical axis direction in order to compensate the move of the image plane upon zooming. The diaphragm S is provided on the object side of the positive third lens group 30.

Focusing can theoretically be carried out by any one of or any combination of the positive first lens group 10, the negative second lens group 20, the positive third lens group 30 and the positive fourth lens group 40. In the illustrated embodiments, the negative second lens group 20 and the positive fourth lens group 40 constitute a focusing lens group.

Note that a lens system in which no focal point movement occurs regardless of the object distance is generally referred to as a zoom lens system, whereas a lens system in which focal point movement occurs is referred to as a vari-focal lens system. In the illustrated embodiments, a vari-focal lens system is simply referred to as a zoom lens system.

The positive fourth lens group 40, as shown in the lens arrangement of each embodiment, includes a first sub-lens group 40a constituted by a positive lens element, and a second sub-lens group 40b constituted by cemented lens elements having a negative lens element and a positive lens element, in this order from the object.

The first sub-lens group 40a has an aspherical surface on at least the object-side surface thereof. The aspherical surface is arranged to have a feature that the higher a height from the optical axis in a radial direction becomes, the weaker the refractive power is, compared with a paraxial spherical surface.

Various types of zoom lens systems of the four-lens-group arrangement, i.e., a positive lens group, a negative lens group, another positive lens group, and the other positive lens group, in this order from the object, have been known in the art. Moreover, throughout such various types of zoom lens systems in general, the first lens group commonly includes cemented lens elements having a negative lens element and a positive lens element, and a positive meniscus lens element; and the second lens group commonly includes three lens elements, i.e., a negative lens element, the other negative lens element, and a positive lens element, in this order from the object. On the other hand, for the purpose of increasing of the variations of zoom lens systems, other lens groups are constituted by, e.g., cemented lens elements, etc. Here, note that a lens group which is most influential to the size of the lens system is the negative second lens group which is mainly used in zooming. The traveling distance of the negative second lens group becomes longer according to an increase of the zoom ratio.

Accordingly, in order to further miniaturize the zoom lens system, the lens arrangement of the positive third lens group 30 and that of the positive fourth lens group 40 become increasingly important. This is because the positive third lens group 30 and the positive fourth lens group 40 are arranged to form an image by collecting a diverging light rays emitted from the negative second lens group 20.

In the illustrated embodiments, the positive fourth lens group 40 is constituted by the first sub-lens group 40a which has the aspherical surface, and the second sub-lens group 40b including the cemented lens elements having the negative lens element and the positive lens element; and the positive fourth lens group 40 satisfies condition (1).

Condition (1) specifies the ratio of the focal length of the first sub-lens group 40a to that of the second sub-lens group 40b. By satisfying this condition, further miniaturization of the zoom lens system can be attained.

If f4a/f4b exceeds the lower limit of condition (1), the focal length f4a of the first sub-lens group 40a relatively increases, so that the size of the positive fourth lens group 40 inevitably becomes larger. Consequently, it is disadvantageous in regard to miniaturization of the entire zoom lens system.

If f4a/f4b exceeds the upper limit of condition (1), the focal length f4a of the first sub-lens group 40a relatively decreases, so that it is advantageous in regard to miniaturization of both the positive fourth lens group 40 and the entire zoom lens system. On the other hand, the focal length f4b of the second sub-lens group 40b becomes longer, i.e., the negative refractive power thereof becomes weaker, in order to suitably maintain the refractive power of the positive fourth lens group 40. As a result, spherical aberrations and coma cannot be adequately maintained.

Alternatively, if the absolute value of the focal length f4b increases, the size of the positive fourth lens group 40 again increases; and the effect of the correcting of spherical aberration cannot be sufficiently obtained, and consequently, spherical aberration is undercorrected.

Condition (2) specifies the distance between the first sub-lens group 40a and the second sub-lens group 40b of the positive fourth lens group 40. Condition (2) and Condition (1) are provided for attaining miniaturization of the positive fourth lens group 40 and suitably maintaining aberrations therein.

If the distance between the first sub-lens group 40a and the second sub-lens group 40b becomes shorter to the extent that d4ab/f4 exceeds the lower limit of condition (2), the height of light rays incident on the second sub-lens group 40b becomes higher. Consequently, spherical aberration in the positive direction largely occurs. Furthermore, since the second sub-lens group 40b is a negative lens group, the effect of being telephoto arrangement, i.e., the overall length of the lens system is made shorter, compared with the focal length, cannot be sufficiently obtained. Consequently, the size of the entire zoom lens system undesirably increases.

If the distance between the first sub-lens group 40a and the second sub-lens group 40b becomes longer to the extent that d4ab/f4 exceeds the upper limit of condition (2), the effect of reducing the overall length of the zoom lens system can be obtained; however, the height of light rays incident on the second sub-lens group 40b becomes lower. Consequently, the effect of the correction of aberrations cannot be sufficiently obtained, and aberrations cannot be suitably maintained.

For example, the zoom lens system of the present invention preferably includes the four lens groups as follows:

The positive first lens group 10 includes the cemented lens elements having the negative lens element and the positive lens element, and the positive meniscus lens element having the convex positive surface facing toward the object, in this order from the object.

The negative second lens group 20 includes the negative lens element having a deep concave surface on the image-side thereof, the cemented lens elements having the positive lens element having the concave surface on the object-side thereof and the negative lens element having the concave surface on the object-side thereof, and the positive lens element, in this order from the object.

The positive third lens group 30 includes the cemented lens elements having the positive lens element and the negative lens element. Note that the order of the positive lens element and the negative lens element can be optionally determined.

Condition (3) specifies the ratio of the focal length of the positive third lens group 30 to that of the positive fourth lens group 40.

If the refractive power of the positive third lens group 30 becomes stronger to the extent that f3/f4 exceeds the lower limit of condition (3), aberrations largely occur even if an aspherical surface is provided on the positive lens element of the positive third lens group 30. Namely, it becomes impossible to constitute the positive third lens group 30 by the cemented lens elements only.

If f3/f4 exceeds the upper limit of condition (3), the following two cases (i) and (ii) can be considered:
  (i) in the case where the focal length of the positive third lens group 30 becomes relatively longer, chromatic aberration in the positive third lens group 30 becomes larger in proportion to focal length, so that chromatic aberration in the entire zoom lens system cannot be adequately maintained; and
  (ii) in the case where the focal length of the fourth lens group 40 becomes relatively shorter, the refractive power of the positive fourth lens group 40 becomes too strong, so that spherical aberration and coma cannot be adequately maintained.

Condition (4) specifies the refractive power of the negative second lens group 20.

If the negative refractive power of the negative second lens group 20 becomes weaker to the extent that fw/f2 exceeds the upper limit of condition (4), the traveling distance of the negative second lens group 20 upon zooming becomes longer in order to achieve a zoom ratio of approximately 10:1. Consequently, the overall length of the zoom lens system cannot be maintained shorter.

If the negative refractive power of the negative second lens group 20 becomes stronger to the extent that fw/f2 exceeds the lower limit of condition (4), the traveling distance of the negative second lens group 20 upon zooming can be made shorter. However, aberrations largely occur in the negative second lens group 20, so that it becomes difficult to suitably maintain aberrations over the entire zooming range.

Condition (5) specifies the Abbe number of the second lens element (i.e., the positive lens element) from the most object-side lens element of the positive first lens group 10. Condition (6) which will be explained, and condition (5) are both provided for suitably correcting chromatic aberration in the positive first lens group 10.

Note that in a zoom lens system having a high zoom ratio of: approximately 10:1, the focal length at the long focal length extremity is extremely long, so that chromatic aberration tends to largely occur in the zoom lens system. In order to reduce such a chromatic aberration, chromatic aberration occurred in the positive first lens group 10 has to be suitably reduced and maintained. Furthermore, in order to further miniaturize the zoom lens system, the refractive power of the positive first lens group 10 tends to become relatively stronger. Since such a strong refractive power influences spherical aberration which is occurred when the zoom lens system is set to the longer focal lengths, aberrations occurred in the positive first lens group 10 have to be made minimum.

Condition (6) specifies the refractive power and the lens material of each lens element in the positive first lens group 10.

In the case where the lens material of the second lens element from the most object-side lens element of the positive first lens group 10 is selected so that condition (5) is satisfied in order to correct chromatic aberration, it is preferable that the lens material having a relatively high refractive index be selected for the third lens element from the most object-side lens element of the positive first lens group 10. By satisfying condition (6), spherical aberrations can be adequately corrected while chromatic aberration is reduced and suitably maintained.

Conditions (7) and (8) are provided for suitably correcting chromatic aberration occurred in the positive third lens group 30.

Chromatic aberration occurred in the positive third lens group 30 mainly influences lateral chromatic aberration of the entire zoom lens system. Accordingly, in the case where the positive lens element constituting the cemented lens elements in the positive third lens group 30 is made of a lens material having an especially large Abbe number satisfying condition (7), lateral chromatic aberration in the entire zoom lens system can be corrected over the entire zooming range.

If $v3p$ exceeds the lower limit of condition (7), it becomes difficult to satisfy condition (8).

Condition (8) is provided for correcting chromatic aberration occurred in the positive third lens group 30. By forming the positive lens element and the negative lens element so as to satisfy condition (8), and thus by specifying refractive power thereof, it becomes easy to reduce chromatic aberration in the positive third lens group 30.

In the zoom lens system of the present invention, any one of or any combination of the positive first lens group 10, the negative second lens group 20, the positive third lens group 30 and the positive fourth lens group 40 can be theoretically used as a focusing lens group; and in the embodiments of the present invention, the negative second lens group 20 and the positive fourth lens group 40 constitute a focusing lens group.

In a conventional zoom lens system of the four-lens-group arrangement for a video camera, etc., it has often been the case where the fourth lens group, not the first lens group having a relatively large diameter, is arranged to be a focusing lens group for the purpose of attaining an electrical-power saving design on the electrical drive system which drives the focusing lens group.

However, if the fourth lens group is used as the focusing lens group, in the case of a recent zoom lens system which requires a shorter photographic distance, the traveling distance of the fourth lens group becomes relatively longer and the focusing operation becomes comparatively slower. Moreover, if the positive fourth lens group moves over a longer distance, the change in the distance between the third lens group and the fourth lens group varies largely, which causes an increase of field curvature. In order to solve such a disadvantage, a zoom lens system in which the second lens group having a stronger refractive power is arranged to be the focusing lens group has been known in the art. In this inner-focusing type zoom lens system, the traveling distance of the focusing lens group (the second lens group) can be advantageously made shorter, and the change in aberrations can be maintained smaller. However, in an optical design for attaining the zoom ratio of 10:1, it is often the case where the lateral magnification of the second lens group becomes 1.0 during the movement thereof halfway in a zooming range. At the zooming position where the lateral magnification is 1.0, since the longitudinal magnification thereat is also 1.0, the image point of the second lens group does not move even if the second lens group itself is moved. Consequently, it becomes impossible to perform focusing.

In the embodiments of the present invention, in order to solve the above-mentioned disadvantages, focusing is performed by moving both the negative second lens group 20 and the positive fourth lens group 40.

By moving the negative second lens group 20 having a stronger refractive power, the traveling distance of the focusing lens group can be made shorter, a focusing speed can be made faster, and the change in field-curvature can be made smaller, compared with a focusing operation by the positive fourth lens group 40 only. More advantageously, even when the lateral magnification of the negative second lens group 20 becomes 1.0, the positive fourth lens group 40 can continue moving, so that focusing sensitivity still exists, and focusing can be performed.

Condition (9) specifies the ratio of the traveling distance of the positive fourth lens group 40 to that of the negative second lens group 20 in the case where these lens groups are used as a focusing lens group.

If dX4/dX2 exceeds the lower limit of condition (9), the positive fourth lens group 40 is immovable. Accordingly, when the lateral magnification of the negative second lens group 20 becomes 1.0, a zooming range where focusing cannot be carried out undesirably exists.

If dX4/dX2 exceeds the upper limit of condition (9), the traveling distance of the negative second lens group 20 becomes shorter, so that the effect of making the traveling distance of the positive fourth lens group 40 shorter is reduced. Namely, the traveling distance of the positive fourth lens group 40 becomes longer, and it takes longer time to perform focusing; and moreover, the distance between the positive third lens group 30 and the positive fourth lens group 40 increases, so that field curvature occurs as a result.

In the case where the negative second lens group 20 and the positive fourth lens group 40 are arranged to be electrically controlled by a motor, the electrical control with the motor can be made easier if the ratio dX4/dX2 set to an integer. More specifically, it is desirable for the ratio dX4/dX2 to be 1, 2 or 3.

On the other hand, in a recent zoom lens system, digital control for the positions of lens groups are widely employed. Accordingly, in a step zoom lens system in which the focal length (zooming) range is divided into a plurality of steps, there exists a zooming range(s) in which the traveling distance of the focusing lens group per digitally-controlled step becomes extremely short. In such a case, it is desirable to vary the ratio dX4/dX2 according to a zooming range.

More specifically, on the side of the short focal length (zooming) ranges where the traveling distance of the focusing lens group per digitally-controlled step is shorter, and where the traveling distance of the positive fourth lens group 40 is shorter, it is preferable that the traveling distance of the negative second lens group 20 relative to the positive fourth lens group 40 be made shorter, or made substantially stationary (dX2=0).

From intermediate focal length (zooming) ranges toward the long focal length (zooming) ranges where the traveling distance of the negative second lens group 20 becomes longer, it is preferable that the traveling distance of the negative second lens group 20 relative to the positive fourth lens group 40 be made longer.

Condition (10) specifies the ratio of the traveling distance of the negative second lens group 20 to that of the positive fourth lens group 40 in the case where these lens groups are used as a focusing lens group, and where the ratio (dX2/dX4) is varied according to the focal length change upon zooming from the short focal length extremity to the long focal length extremity.

Note that it is not practical to consider a case where dX2/dX4 exceeds the lower limit of condition (10).

If dX2/dX4 exceeds the upper limit of condition (10), the traveling distance of the negative second lens group 20 becomes too long with respect to that of the positive fourth lens group 40. The extremely long traveling distance of the negative second lens group 20 is a typical disadvantages of the prior art where focusing is performed by the second lens group only.

Within the range of condition (10), on the side of the short focal length (zooming) range, focusing is preferably performed by the positive fourth lens group 40 only (dX2/dX4=0) while the negative second lens group 20 is made stationary.

In the intermediate focal length (zooming) range, focusing is preferably performed by integrally moving the negative second lens group 20 and the positive fourth lens group 40(dX2/dX4=1).

On the side of the long focal length (zooming) range where focusing sensitivity of the negative second lens group 20 becomes higher, focusing is preferably performed in a manner that the traveling distance of the negative second lens group 20 is made shorter relative to the positive fourth lens group 40 (dX2/dX4<1.0).

In this case, if the ratio dX2/dX4 is set to ½ or ⅓, it is easy to electrically control the movement of the negative second lens group 20 and the positive fourth lens group 40.

Specific numerical data of the embodiments will be described hereinafter.

In the diagrams of spherical aberration and the sine condition, SA designates spherical aberration, SC designates the sine condition, FNO. Designates the f-number in the case where an object at infinity is in an in-focus state, and Fe designates the effective f-number in the case where an object at a finite photographic distance is in an in-focus state.

In the diagrams of chromatic aberration (axial chromatic aberration) represented by spherical aberration, the solid line and the two types of dotted lines respectively indicate spherical aberrations with respect to the d, g and C lines; and FNO. Designates the f-number in the case where an object at infinity is in an in-focus state, and Fe designates the effective f-number in the case where an object at a finite photographic distance is in an in-focus state.

In the diagrams of lateral chromatic aberration, W designates the half angle-of-view (°) in the case where an object at infinity is in an in-focus state; Y designates the image height in the case where an object at a finite photographic distance is in an in-focus state; and, the two types of dotted lines respectively indicate magnification with respect to the g and C lines; however, the d line as the base line coincides with the ordinate.

In the diagrams of astigmatism, W designates the half angle-of-view (°) in the case where an object at infinity is in an in-focus state; Y designates the image height in the case where an object at a finite photographic distance is in an in-focus state; S designates the sagittal image; and M designates the meridional image.

In the diagrams of distortion, W designates the half angle-of-view (°) in the case where an object at infinity is in an in-focus state; and, Y designates the image height in the case where an object at a finite photographic distance is in an in-focus state.

The tables 1A through 11A show the case where an object at infinity is in an in-focus state; and in these tables 1A through 11A, FNO. designates the f-number, m designates the lateral magnification; f designates the focal length of the entire zoom lens system, fB designates the back focal distance, W designates the half angle-of-view (°), r designates the radius of curvature, d designates the lens-element thickness or distance between lens elements, $N_d$ designates the refractive index of the d-line, and ν designates the Abbe number.

The tables 1B through 11B shows the case where an object at the finite photographic distance is in an in-focus state; and these tables 1B through 11B only show the numerical data which have been varied with respect to those of the table 1A.

In these tables 1B through 11B, Fe designates the effective f-number, m designates the lateral magnification; f designates the focal length of the entire zoom lens system, fB designates the back focal distance, and d designates the lens-element thickness or distance between lens elements.

The finite distance is not a constant value, and is indirectly expressed by the lateral magnification 'm'.

Embodiment 1

FIG. 1 is the lens arrangement of the zoom lens system, at the short focal length extremity, according to the first embodiment of the present invention, when an object at infinity is in an in-focus state. FIGS. 2A through 2E show aberrations occurred in the lens arrangement of FIG. 1.

FIG. 3 is the lens arrangement of the zoom lens system, at an intermediate focal length, according to the first embodiment of the present invention, when an object at infinity is in an in-focus state. FIGS. 4A through 4E show aberrations occurred in the lens arrangement of FIG. 3.

FIG. 5 is the lens arrangement of the zoom lens system, at the long focal length extremity, according to the first embodiment of the present invention, when an object at infinity is in an in-focus state. FIGS. 6A through 6E show aberrations occurred in the lens arrangement of FIG. 5.

FIGS. 7A through 7E show aberrations occurred in the zoom lens system of the first embodiment at the short focal length extremity, when an object at a finite photographic distance is in an in-focus state.

FIGS. 8A through 8E show aberrations occurred in the zoom lens system of the first embodiment at an intermediate focal length, when an object at a finite photographic distance is in an in-focus state.

FIG. 9A through 9E show aberrations occurred in the zoom lens system of the first embodiment at the long focal length extremity, when an object at a finite photographic distance is in an in-focus state.

Tables 1A and 1B show the numerical values of the first embodiment.

The positive first lens group 10 includes the cemented lens elements having the negative lens element and the positive lens element, and the positive meniscus lens element having the convex positive surface facing toward on the object, in this order from the object.

The negative second lens group 20 includes the negative lens element having the deep concave surface on the image-side thereof, the cemented lens elements having the positive lens element having the concave surface on the object-side thereof and the negative lens element having the concave surface on the object-side thereof, and the positive lens element, in this order from the object.

The positive third lens group 30 includes the cemented lens elements having the positive lens element and the negative lens element, in this order from the object.

The positive fourth lens group 40 includes the first sub-lens group 40a constituted by the positive lens element, and the second sub-lens group 40b constituted by the cemented lens elements having the negative lens element and the positive lens element, in this order from the object.

A cover glass (plane-parallel plate) C (surface Nos. 21 and 22) is provided in front of an image pickup device behind the positive fourth lens group 40.

Focusing is performed by moving the negative second lens group 20 and the positive fourth lens group 40 at a constant ratio of the traveling distances thereof.

The diaphragm S is provided 0.70 on the object side (in front of surface No. 13) of the positive third lens group 30.

TABLE 1A

FNO. = 1:2.9–3.2–3.6
f = 5.94–18.00–56.60
W = 31.2°–10.6°–3.4°
m = 0.000–0.000–0.000
fB = 5.67–5.67–5.67

| Surf. No. | r | d | Nd | ν |
|---|---|---|---|---|
| 1 | 46.829 | 1.40 | 1.84666 | 23.8 |
| 2 | 27.662 | 5.57 | 1.49700 | 81.6 |
| 3 | −174.104 | 0.10 | | |
| 4 | 25.347 | 3.72 | 1.72916 | 54.7 |
| 5 | 79.191 | 0.83–12.82–21.03 | | |
| 6 | 34.822 | 0.90 | 1.88300 | 40.8 |
| 7 | 7.429 | 2.81 | | |
| 8 | −12.854 | 3.39 | 1.84666 | 23.8 |
| 9 | −5.730 | 0.90 | 1.88300 | 40.8 |
| 10 | 45.452 | 0.34 | | |
| 11 | 23.938 | 1.87 | 1.64769 | 33.8 |
| 12 | −41.572 | 22.10–10.10–1.90 | | |
| 13* | 13.500 | 2.31 | 1.49700 | 81.6 |
| 14 | −14.030 | 0.90 | 1.61293 | 37.0 |
| 15 | −106.309 | 13.68–9.87–12.78 | | |
| 16* | 15.792 | 2.22 | 1.58913 | 61.2 |
| 17 | −38.529 | 5.88 | | |
| 18 | 15.674 | 0.90 | 1.84666 | 23.8 |
| 19 | 6.512 | 2.32 | 1.51742 | 52.4 |
| 20 | 27.209 | 0.80–4.61–1.70 | | |
| 21 | ∞ | 1.70 | 1.51633 | 64.1 |
| 22 | ∞ | — | | |

| NO | K | A4 | A6 | A8 | |
|---|---|---|---|---|---|
| 13 | $-0.10000 \times 10^1$ | $-0.10975 \times 10^{-4}$ | $0.74001 \times 10^{-6}$ | | |
| 16 | $-0.10000 \times 10^1$ | $-0.58875 \times 10^{-4}$ | $0.11028 \times 10^{-6}$ | $-0.57869 \times 10^{-8}$ | |

TABLE 1B

Fe = 1:2.9–3.3–3.9
Y = 3.50–3.50–3.50
m = −0.025—0.064—0.150
fB = 5.67–5.67–5.67

| Surf. No. | d |
|---|---|
| 5 | 0.80–12.61–19.20 |
| 12 | 22.13–10.32–3.73 |
| 15 | 13.54–8.82–3.66 |
| 20 | 0.94–5.66–10.82 |

Embodiment 2

FIG. 10 is the lens arrangement of the zoom lens system, at the short focal length extremity, according to the second embodiment of the present invention, when an object at infinity is in an in-focus state. FIGS. 11A through 11E show aberrations occurred in the lens arrangement of FIG. 10.

Figure 12:
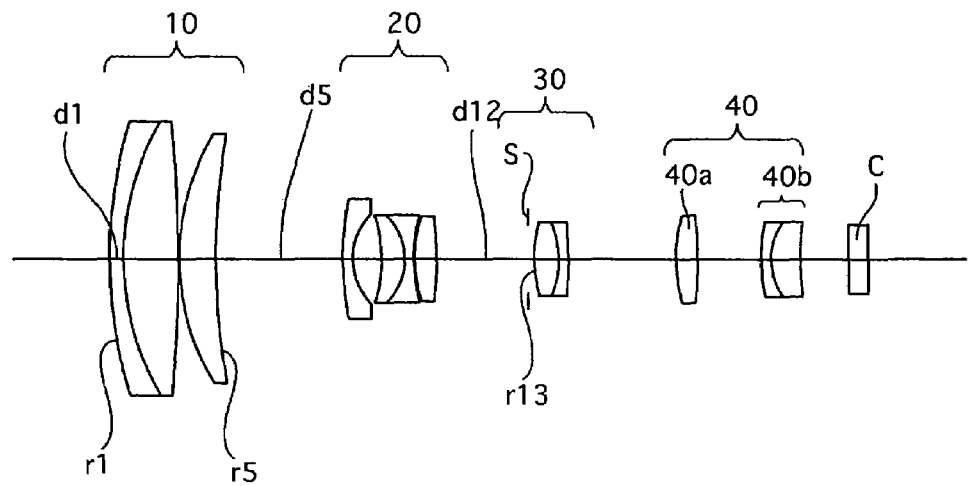
FIG. 12 is a lens arrangement of the zoom lens system, at an intermediate focal length, according to the second embodiment of the present invention, when an object at infinity is in an in-focus state.
Figures 13A, 13B, 13C, 13D, 13E:
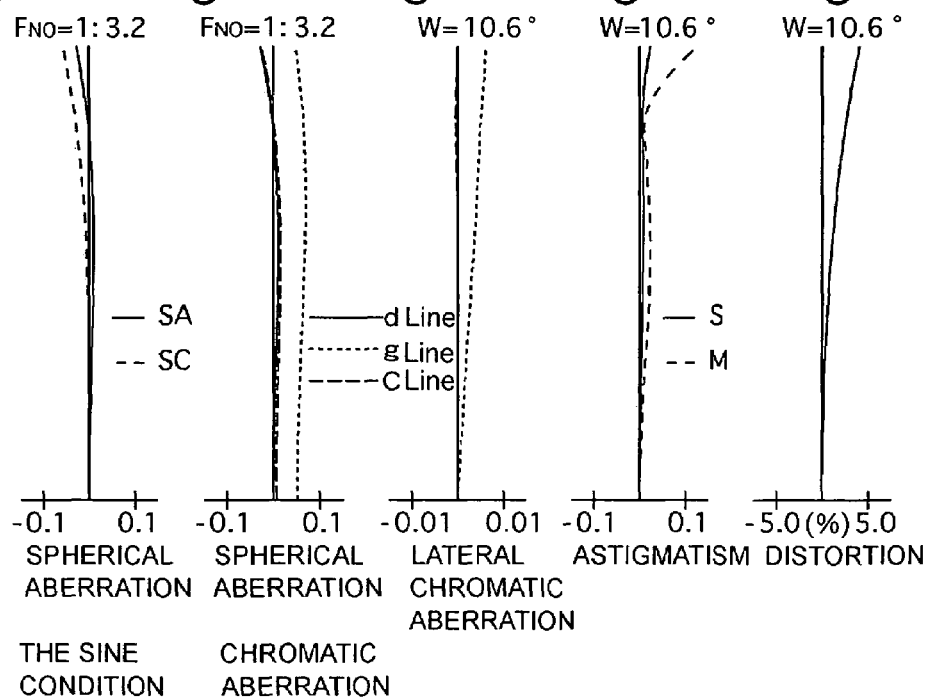
FIGS. 13A, 13B, 13C, 13D and 13E show aberrations occurred in the lens arrangement of FIG. 12.

FIG. 12 is the lens arrangement of the zoom lens system, at an intermediate focal length, according to the second embodiment of the present invention, when an object at infinity is in an in-focus state. FIGS. 13A through 13E show aberrations occurred in the lens arrangement of FIG. 12.

FIG. 14 is the lens arrangement of the zoom lens system, at the long focal length extremity, according to the second embodiment of the present invention, when an object at infinity is in an in-focus state. FIGS. 15A through 15E show aberrations occurred in the lens arrangement of FIG. 14.

FIGS. 16A through 16E show aberrations occurred in the zoom lens system of the second embodiment at the short focal length extremity, when an object at a finite photographic distance is in an in-focus state.

FIGS. 17A through 17E show aberrations occurred in the zoom lens system of the second embodiment at an intermediate focal length, when an object at a finite photographic distance is in an in-focus state.

FIGS. 18A through 18E show aberrations occurred in the zoom lens system of the second embodiment at the long focal length extremity, when an object at a finite photographic distance is in an in-focus state.

Tables 2A and 2B show the numerical values of the second embodiment.

The basic lens arrangement of the second embodiment, and the way of focusing thereof are the same as the first embodiment.

The diaphragm S is provided 0.70 on the object side (in front of surface No. 13) of the positive third lens group 30.

TABLE 2A

FNO. = 1:2.8–3.2–3.6
f = 5.90–18.00–56.00
W = 31.1°–10.6°–3.5°
m = 0.000–0.000–0.000
fB = 2.94–2.94–2.94

| Surf. No. | r | d | Nd | ν |
|---|---|---|---|---|
| 1 | 49.280 | 1.40 | 1.84666 | 23.8 |
| 2 | 28.156 | 5.60 | 1.49700 | 81.6 |
| 3 | −144.830 | 0.10 | | |
| 4 | 24.886 | 3.70 | 1.72916 | 54.7 |
| 5 | 74.471 | 0.81–12.75–20.86 | | |
| 6* | 31.213 | 1.00 | 1.85020 | 40.8 |
| 7* | 6.813 | 2.87 | | |
| 8 | −14.908 | 2.37 | 1.80518 | 25.4 |
| 9 | −6.290 | 0.90 | 1.88300 | 40.8 |
| 10 | 17.130 | 0.10 | | |
| 11 | 13.902 | 2.19 | 1.76182 | 26.5 |
| 12 | −41.864 | 21.95–10.02–1.90 | | |
| 13 | 14.423 | 2.50 | 1.49700 | 81.6 |
| 14 | −9.484 | 1.00 | 1.60342 | 38.0 |
| 15 | −40.103 | 15.05–10.94–13.20 | | |
| 16* | 14.758 | 2.21 | 1.58913 | 61.2 |
| 17 | −39.788 | 6.50 | | |
| 18 | 19.151 | 1.00 | 1.84666 | 23.8 |
| 19 | 6.530 | 3.00 | 1.51742 | 52.4 |
| 20 | 31.321 | 0.80–4.91–2.65 | | |
| 21 | ∞ | 2.00 | 1.51633 | 64.1 |
| 22 | ∞ | — | | |

| No. | K | A4 | A6 | A8 | A10 |
|---|---|---|---|---|---|
| 6 | $-0.10000 \times 10^1$ | $-0.35695 \times 10^{-4}$ | $0.22601 \times 10^{-5}$ | $-0.97278 \times 10^{-7}$ | $0.13092 \times 10^{-8}$ |

| No. | K | A4 | A6 | A8 |
|---|---|---|---|---|
| 13 | $-0.10000 \times 10^1$ | $0.13713 \times 10^{-4}$ | $0.24311 \times 10^{-6}$ | |
| 16 | $-0.10000 \times 10^1$ | $-0.62768 \times 10^{-4}$ | $0.16857 \times 10^{-6}$ | $-0.69577 \times 10^{-8}$ |

TABLE 2B

Fe = 1:2.8–3.3–3.7
Y = 3.50–3.50–3.50
m = −0.025—−0.062—−0.117
fB = 2.94–2.94–2.94

| Surf. No. | d |
|---|---|
| 5 | 0.75–12.30–17.32 |
| 12 | 22.02–10.46–5.45 |
| 15 | 14.92–10.04–6.10 |
| 20 | 0.93–5.81–9.75 |

Embodiment 3

Figure 19:
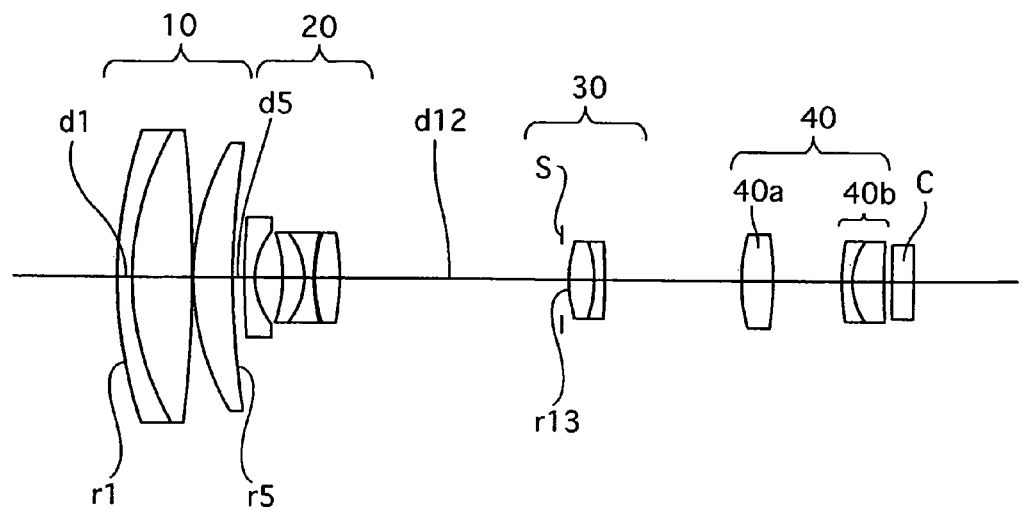
FIG. 19 is a lens arrangement of the zoom lens system, at the short focal length extremity, according to a third embodiment of the present invention, when an object at infinity is in an in-focus state.
Figures 20A, 20B, 20C, 20D, 20E:
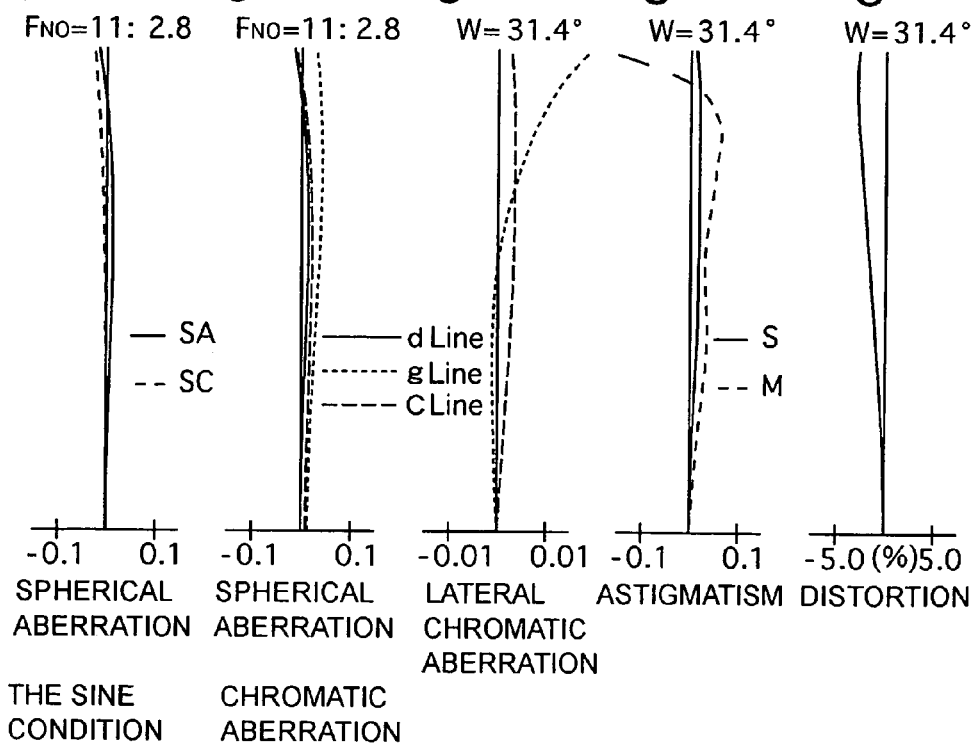
FIGS. 20A, 20B, 20C, 20D and 20E show aberrations occurred in the lens arrangement of FIG. 19.

FIG. 19 is the lens arrangement of the zoom lens system, at the short focal length extremity, according to the third embodiment of the present invention, when an object at infinity is in an in-focus state. FIGS. 20A through 20E show aberrations occurred in the lens arrangement of FIG. 19.

Figure 21:
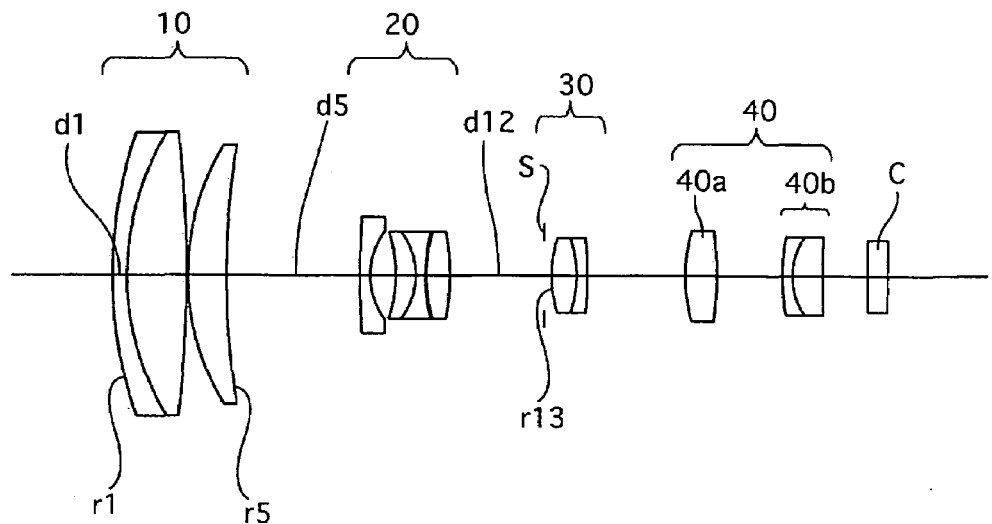
FIG. 21 is a lens arrangement of the zoom lens system, at an intermediate focal length, according to the third embodiment of the present invention, when an object at infinity is in an in-focus state.
Figures 22A, 22B, 22C, 22D, 22E:
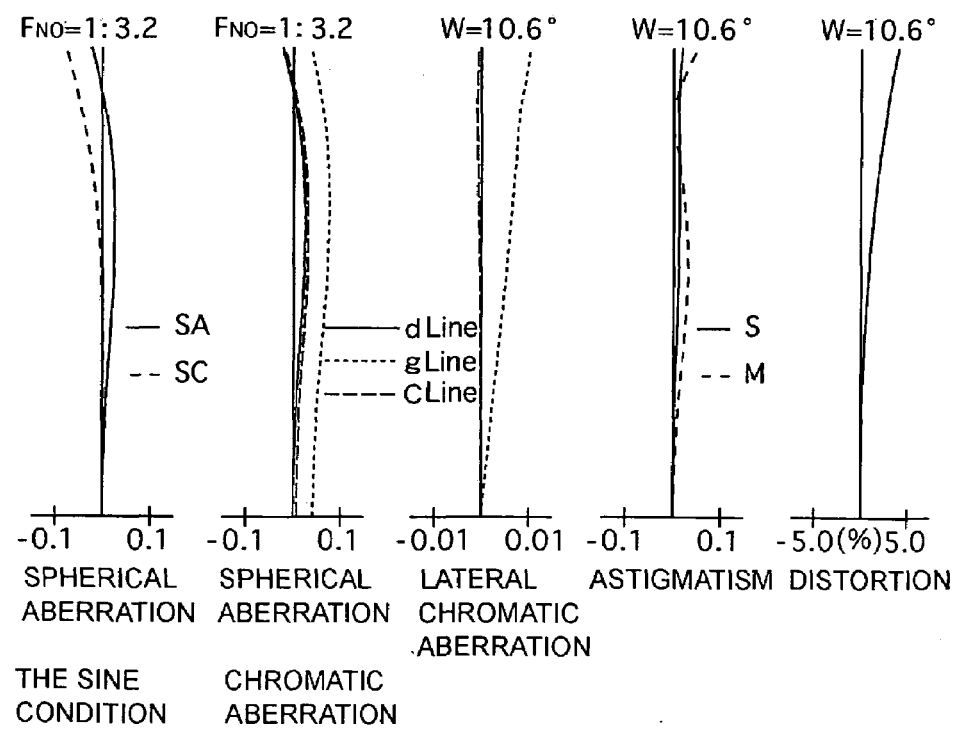
FIGS. 22A, 22B, 22C, 22D and 22E show aberrations occurred in the lens arrangement of FIG. 21.

FIG. 21 is the lens arrangement of the zoom lens system, at an intermediate focal length, according to the third embodiment of the present invention, when an object at infinity is in an in-focus state. FIGS. 22A through 22E show aberrations occurred in the lens arrangement of FIG. 21.

Figure 23:
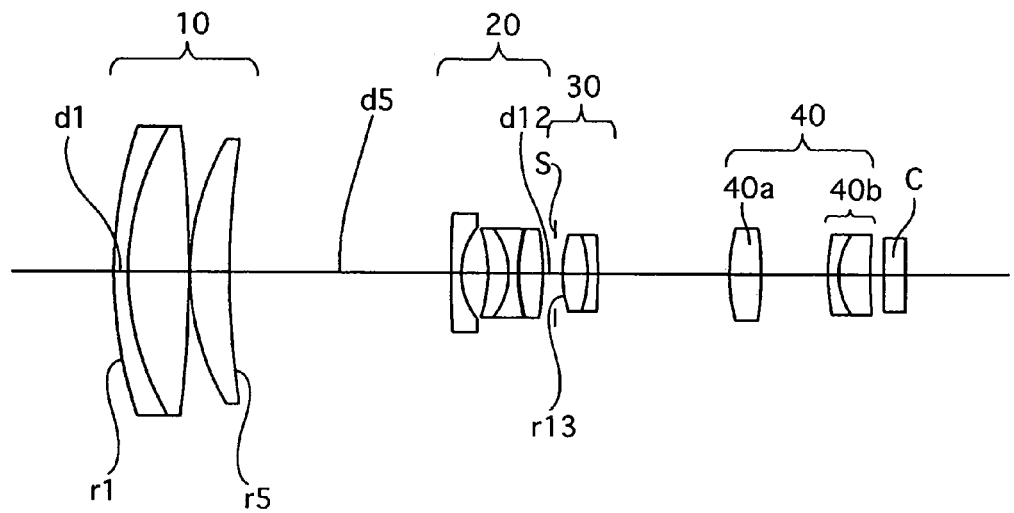
FIG. 23 is a lens arrangement of the zoom lens system, at the long focal length extremity, according to the third embodiment of the present invention, when an object at infinity is in an in-focus state.
Figures 24A, 24B, 24C, 24D, 24E:
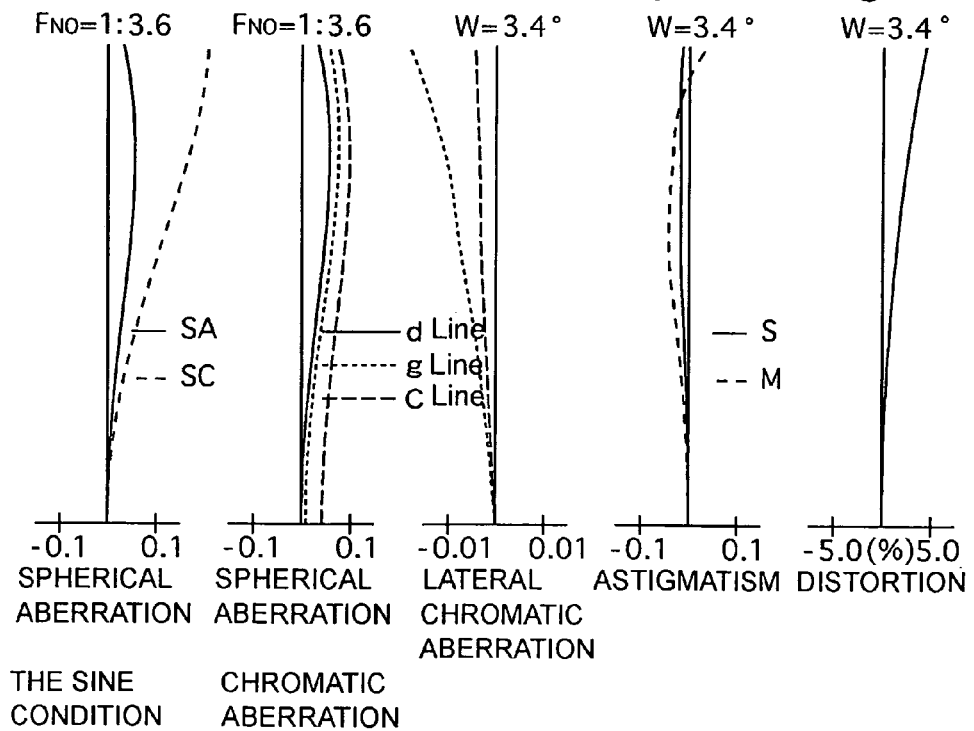
FIGS. 24A, 24B, 24C, 24D and 24E show aberrations occurred in the lens arrangement of FIG. 23.

FIG. 23 is the lens arrangement of the zoom lens system, at the long focal length extremity, according to the third embodiment of the present invention, when an object at infinity is in an in-focus state. FIGS. 24A through 24E show aberrations occurred in the lens arrangement of FIG. 23.

FIGS. 25A through 25E show aberrations occurred in the zoom lens system of the third embodiment at the short focal length extremity, when an object at a finite photographic distance is in an in-focus state.

FIGS. 26A through 26E show aberrations occurred in the zoom lens system of the third embodiment at an intermediate focal length, when an object at a finite photographic distance is in an in-focus state.

FIGS. 27A through 27E show aberrations occurred in the zoom lens system of the third embodiment at the long focal length extremity, when an object at a finite photographic distance is in an in-focus state.

Tables 3A and 3B show the numerical values of the third embodiment.

The basic lens arrangement of the third embodiment, and the way of focusing thereof are the same as the first embodiment.

The diaphragm S is provided 0.70 on the object side (in front of surface No. 13) of the positive third lens group 30.

TABLE 3A

FNO. = 1:2.8–3.2–3.6
f = 5.90–18.00–56.00
W = 31.4°–10.6°–3.4°
m = 0.000–0.000–0.000
fB = 3.91–3.91–3.91

| Surf. No. | r | d | Nd | ν |
|---|---|---|---|---|
| 1 | 44.042 | 1.40 | 1.84666 | 23.8 |
| 2 | 27.472 | 5.82 | 1.43875 | 95.0 |
| 3 | −120.611 | 0.10 | | |
| 4 | 25.064 | 3.78 | 1.72916 | 54.7 |
| 5 | 81.239 | 1.13–13.06–21.18 | | |
| 6* | 100.057 | 1.00 | 1.85020 | 40.8 |
| 7 | 7.220 | 2.59 | | |
| 8 | −13.466 | 2.01 | 1.80518 | 25.4 |
| 9 | −6.943 | 0.90 | 1.88300 | 40.8 |
| 10 | 17.219 | 0.12 | | |
| 11 | 14.736 | 2.32 | 1.76182 | 26.5 |
| 12 | −23.771 | 21.95–10.02–1.90 | | |
| 13* | 11.881 | 2.46 | 1.43426 | 95.0 |
| 14 | −11.599 | 1.00 | 1.60342 | 38.0 |
| 15 | −50.091 | 13.19–9.50–12.62 | | |
| 16* | 15.761 | 3.08 | 1.58913 | 61.2 |
| 17 | −32.685 | 6.44 | | |
| 18 | 21.123 | 1.00 | 1.84666 | 23.8 |
| 19 | 6.908 | 3.00 | 1.51742 | 52.4 |
| 20 | 51.360 | 0.80–4.48–1.36 | | |
| 21 | ∞ | 2.00 | 1.51633 | 64.1 |
| 22 | ∞ | — | | |

| No. | K | A4 | A6 | A8 | A10 |
|---|---|---|---|---|---|
| 6 | −0.10000 × 10$^1$ | −0.19860 × 10$^{-4}$ | 0.35050 × 10$^{-5}$ | −0.14359 × 10$^{-6}$ | 0.18922 × 10$^{-8}$ |
| 13 | −0.10000 × 10$^1$ | 0.21211 × 10$^{-4}$ | 0.43985 × 10$^{-6}$ | | |
| 16 | −0.10000 × 10$^1$ | −0.82687 × 10$^{-4}$ | 0.43301 × 10$^{-6}$ | −0.15115 × 10$^{-7}$ | |

Embodiment 4

Figure 28:
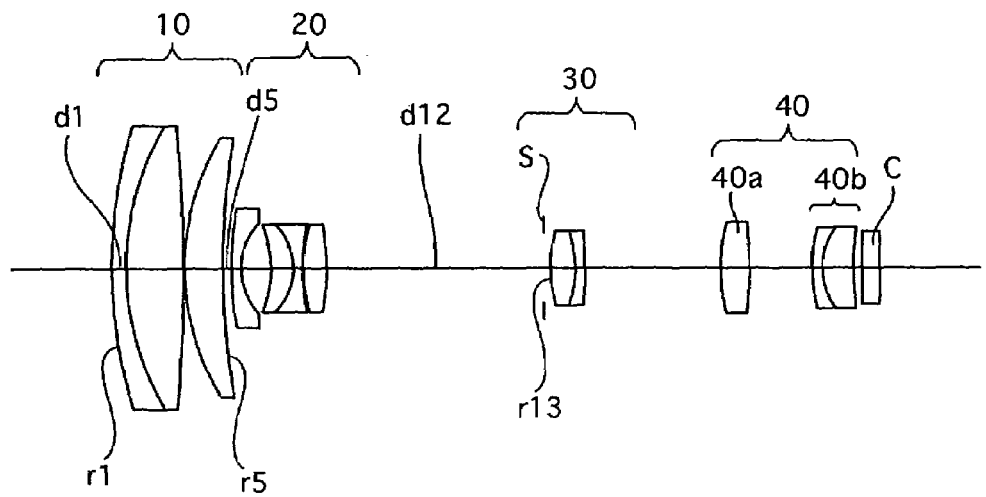
FIG. 28 is a lens arrangement of the zoom lens system, at the short focal length extremity, according to a fourth embodiment of the present invention, when an object at infinity is in an in-focus state.
Figures 29A, 29B, 29C, 29D, 29E:
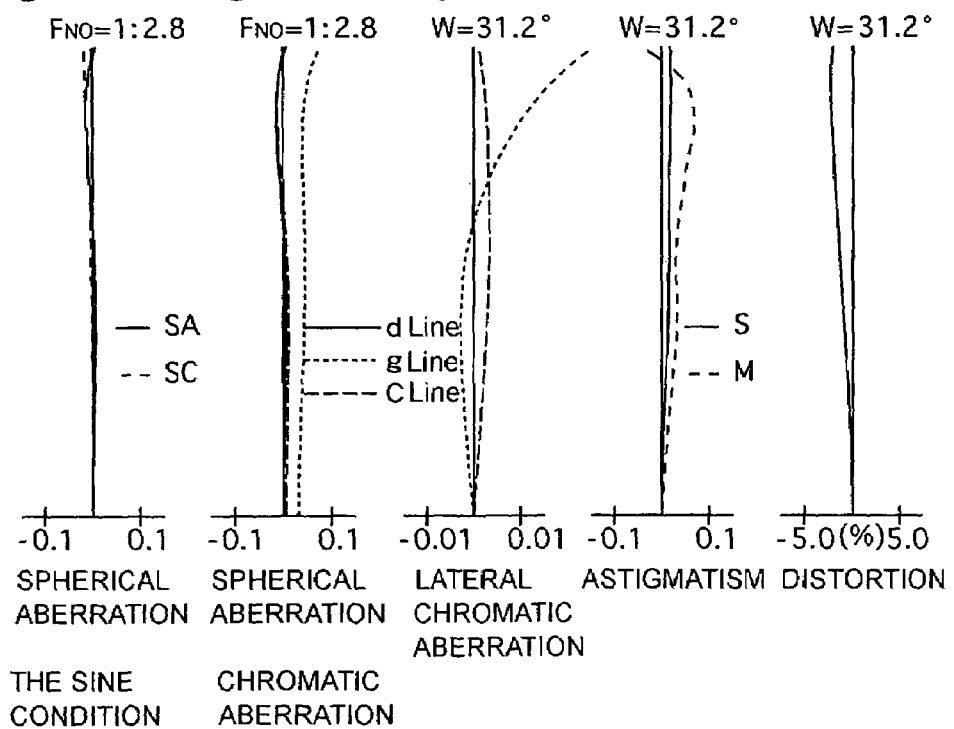
FIGS. 29A, 29B, 29C, 29D and 29E show aberrations occurred in the lens arrangement of FIG. 28.

FIG. 28 is the lens arrangement of the zoom lens system, at the short focal length extremity, according to the fourth embodiment of the present invention, when an object at infinity is in an in-focus state. FIGS. 29A through 29E show aberrations occurred in the lens arrangement of FIG. 28.

Figure 30:
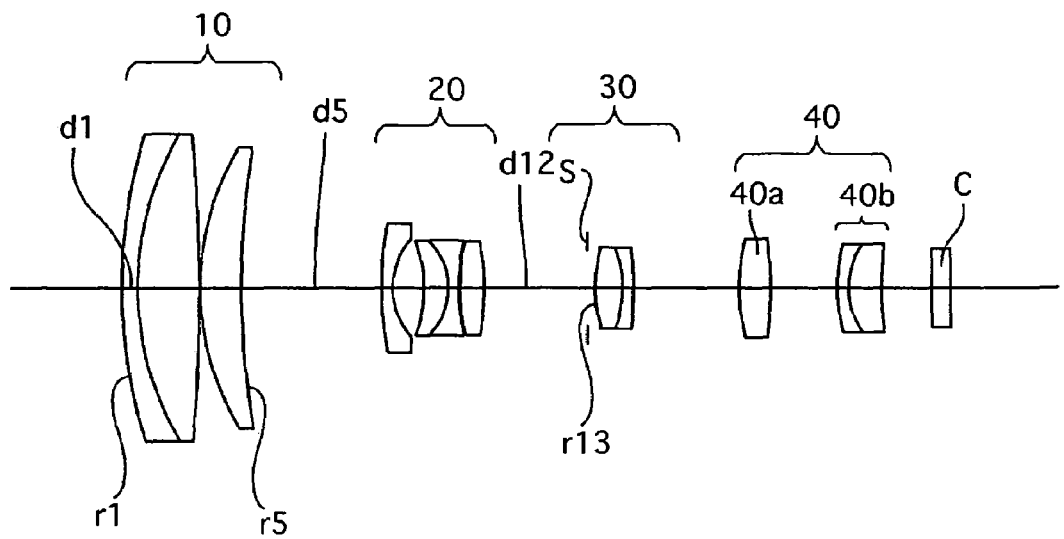
FIG. 30 is a lens arrangement of the zoom lens system, at an intermediate focal length, according to the fourth embodiment of the present invention, when an object at infinity is in an in-focus state.
Figures 31A, 31B, 31C, 31D, 31E:
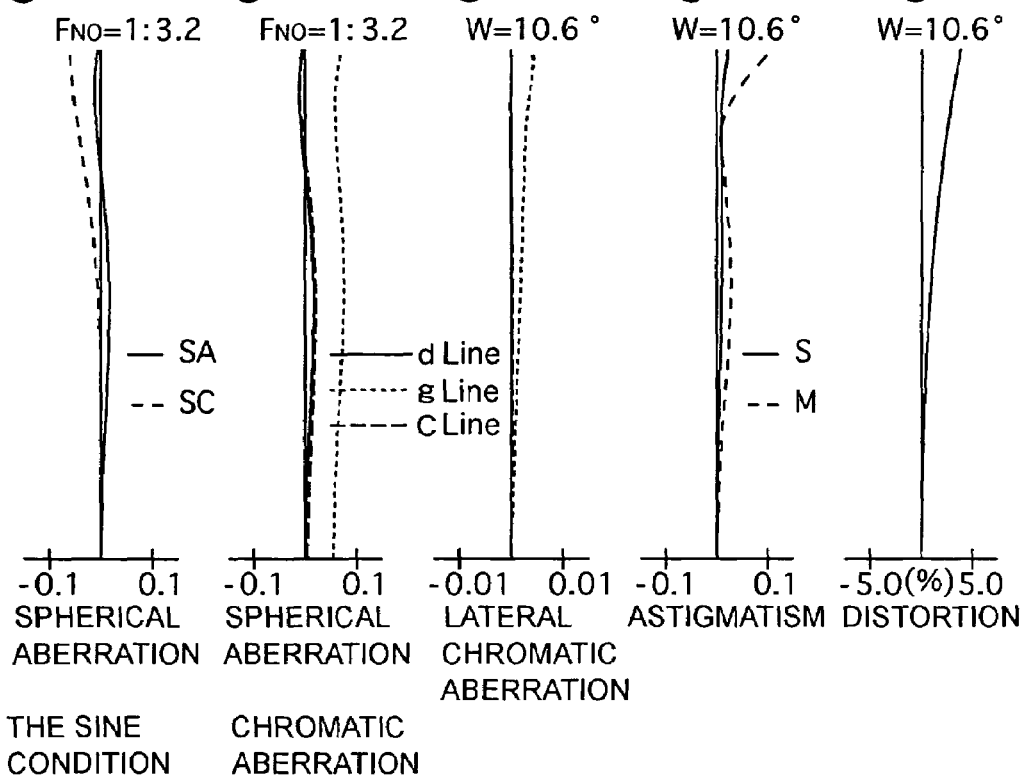
FIGS. 31A, 31B, 31C, 31D and 31E show aberrations occurred in the lens arrangement of FIG. 30.

FIG. 30 is the lens arrangement of the zoom lens system, at an intermediate focal length, according to the fourth embodiment of the present invention, when an object at infinity is in an in-focus state. FIGS. 31A through 31E show aberrations occurred in the lens arrangement of FIG. 30.

Figure 32:
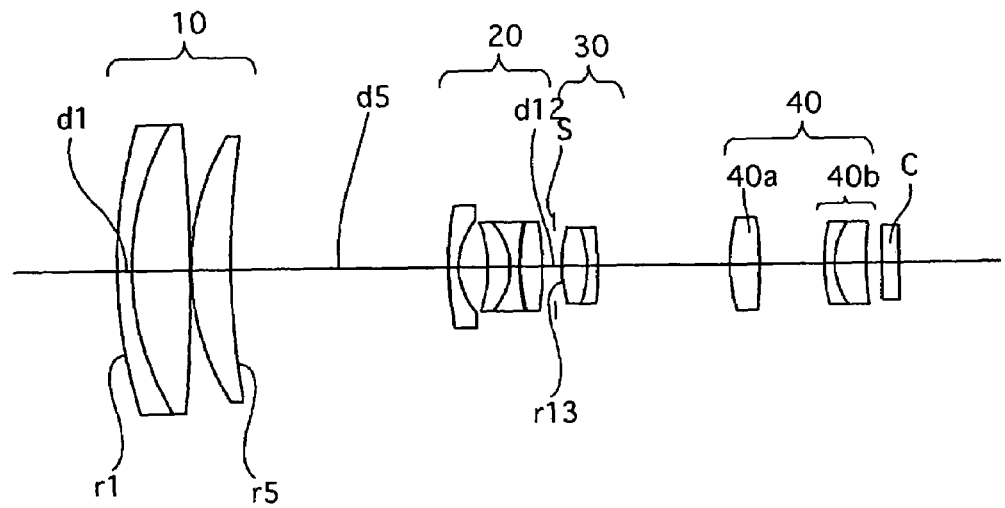
FIG. 32 is a lens arrangement of the zoom lens system, at the long focal length extremity, according to the fourth embodiment of the present invention, when an object at infinity is in an in-focus state.
Figures 33A, 33B, 33C, 33D, 33E:
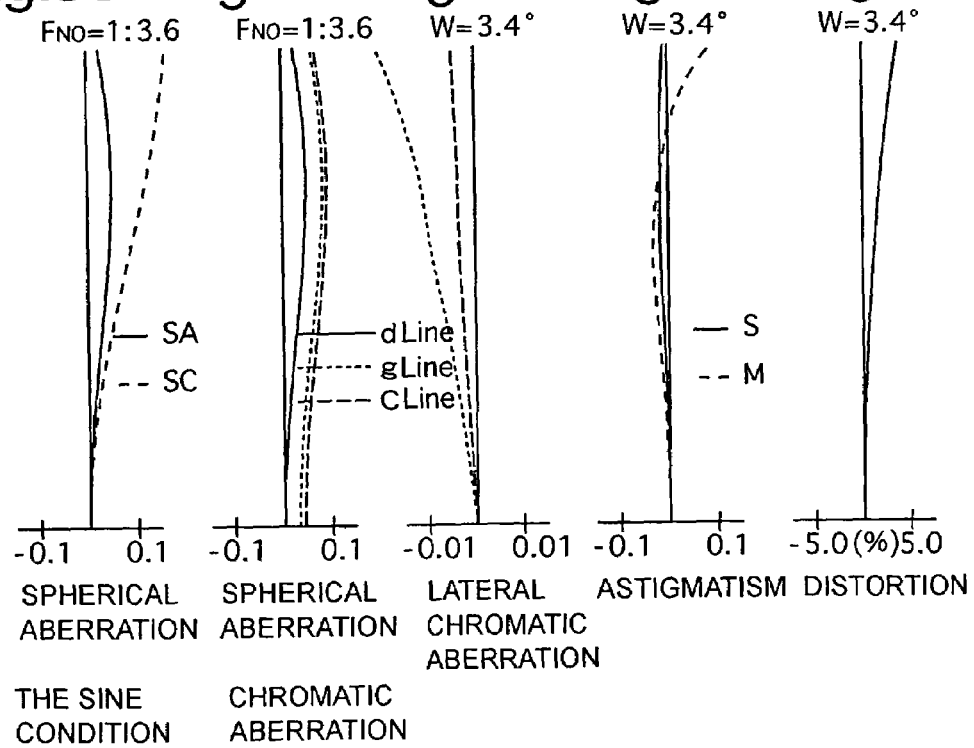
FIGS. 33A, 33B, 33C, 33D and 33E show aberrations occurred in the lens arrangement of FIG. 32.

FIG. 32 is the lens arrangement of the zoom lens system, at the long focal length extremity, according to the fourth embodiment of the present invention, when an object at infinity is in an in-focus state. FIGS. 33A through 33E show aberrations occurred in the lens arrangement of FIG. 32.

FIGS. 34A through 34E show aberrations occurred in the zoom lens system of the fourth embodiment at the short focal length extremity, when an object at a finite photographic distance is in an in-focus state.

FIGS. 35A through 35E show aberrations occurred in the zoom lens system of the fourth embodiment at an intermediate focal length, when an object at a finite photographic distance is in an in-focus state.

FIGS. 36A through 36E show aberrations occurred in the zoom lens system of the fourth embodiment at the long focal length extremity, when an object at a finite photographic distance is in an in-focus state.

Tables 4A and 4B show the numerical values of the fourth embodiment.

The basic lens arrangement of the fourth embodiment, and the way of focusing thereof are the same as the first embodiment.

The diaphragm S is provided 0.70 on the object side (in front of surface No. 13) of the positive third lens group 30.

TABLE 4A

FNO. = 1:2.8–3.2–3.6
f = 5.90–18.00–56.00
W = 31.2°–10.6°–3.4°
m = 0.000–0.000–0.000
fB = 4.78–4.78–4.78

| Surf. No. | r | d | Nd | ν |
|---|---|---|---|---|
| 1 | 47.995 | 1.40 | 1.84666 | 23.8 |
| 2 | 27.499 | 5.63 | 1.49700 | 81.6 |
| 3 | −161.690 | 0.10 | | |
| 4 | 24.837 | 3.78 | 1.73400 | 51.5 |
| 5 | 77.075 | 0.80–12.76–20.85 | | |
| 6* | 31.831 | 1.00 | 1.85020 | 40.8 |
| 7 | 6.775 | 2.89 | | |
| 8 | −11.859 | 2.20 | 1.80518 | 25.4 |
| 9 | −6.102 | 0.90 | 1.88300 | 40.8 |
| 10 | 20.915 | 0.10 | | |
| 11 | 16.679 | 2.21 | 1.76182 | 26.5 |
| 12 | −25.563 | 21.95–9.99–1.90 | | |
| 13* | 12.749 | 2.45 | 1.43426 | 95.0 |
| 14 | −10.865 | 1.00 | 1.61293 | 37.0 |
| 15 | −36.389 | 13.35–9.60–12.58 | | |
| 16* | 16.360 | 2.82 | 1.58913 | 61.2 |
| 17 | −37.266 | 6.13 | | |
| 18 | 16.567 | 1.00 | 1.84666 | 23.8 |
| 19 | 6.888 | 3.00 | 1.51742 | 52.4 |
| 20 | 30.611 | 0.80–4.55–1.57 | | |
| 21 | ∞ | 1.70 | 1.51633 | 64.1 |
| 22 | ∞ | — | | |

| No. | K | A4 | A6 | A8 | A10 |
|---|---|---|---|---|---|
| 6 | −0.10000 × $10^1$ | −0.21522 × $10^{-4}$ | 0.27370 × $10^{-5}$ | −0.10386 × $10^{-6}$ | 0.12934 × $10^{-8}$ |

| No. | K | A4 | A6 | A8 |
|---|---|---|---|---|
| 13 | −0.10000 × $10^1$ | 0.16698 × $10^{-4}$ | 0.18372 × $10^{-5}$ | −0.78848 × $10^{-7}$ |
| 16 | −0.10000 × $10^1$ | −0.67316 × $10^{-4}$ | 0.22243 × $10^{-6}$ | −0.88158 × $10^{-8}$ |

TABLE 4B

Fe = 1:2.8–3.3–4.4
Y = 3.50–3.50–3.50
m = −0.025—−0.062—−0.113
fB = 4.78–4.78–4.78

| Surf. No. | d |
|---|---|
| 5 | 0.73–12.30–17.19 |
| 12 | 22.02–10.45–5.56 |
| 15 | 13.22–8.69–5.25 |
| 20 | 0.93–5.46–8.90 |

Embodiment 5

Figure 37:
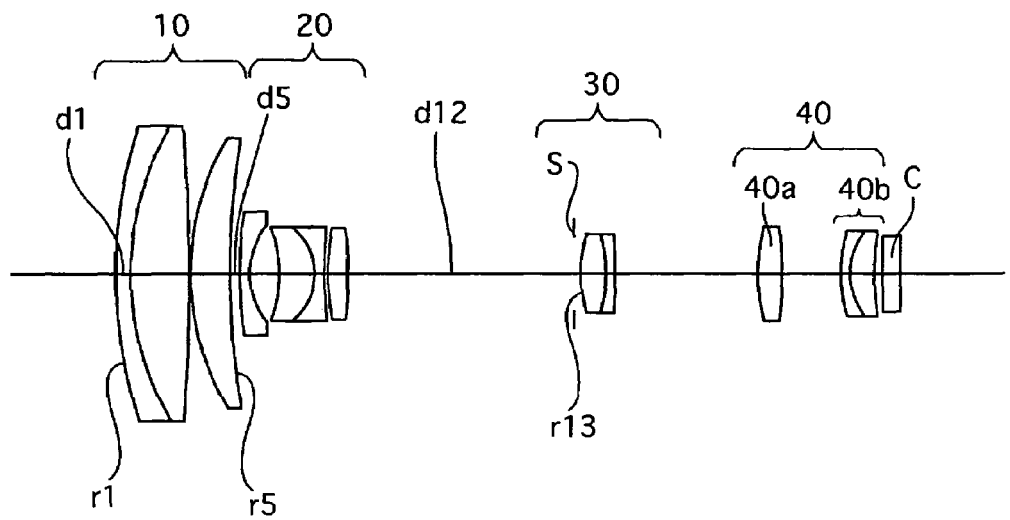
FIG. 37 is a lens arrangement of the zoom lens system, at the short focal length extremity, according to a fifth embodiment of the present invention, when an object at infinity is in an in-focus state.
Figures 38A, 38B, 38C, 38D, 38E:
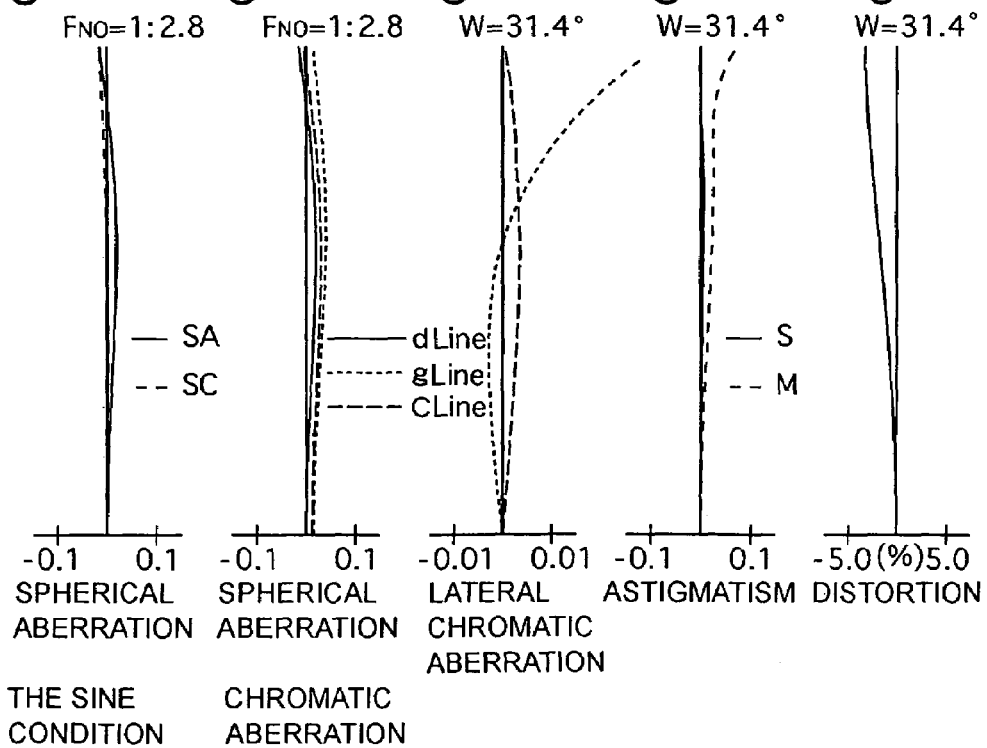
FIGS. 38A, 38B, 38C, 38D and 38E show aberrations occurred in the lens arrangement of FIG. 37.

FIG. 37 is the lens arrangement of the zoom lens system, at the short focal length extremity, according to the fifth embodiment of the present invention, when an object at infinity is in an in-focus state. FIGS. 38A through 38E show aberrations occurred in the lens arrangement of FIG. 37.

Figure 39:
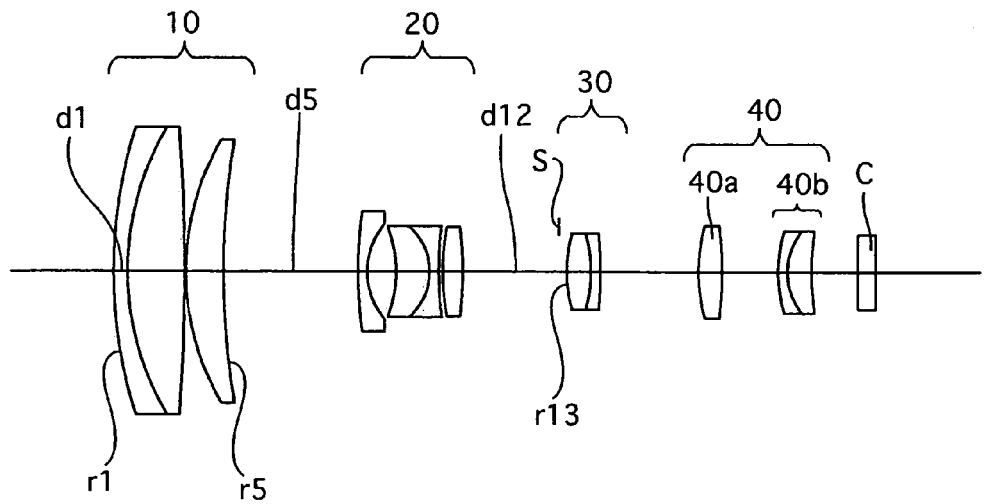
FIG. 39 is a lens arrangement of the zoom lens system, at an intermediate focal length, according to the fifth embodiment of the present invention, when an object at infinity is in an in-focus state.
Figures 40A, 40B, 40C, 40D, 40E:
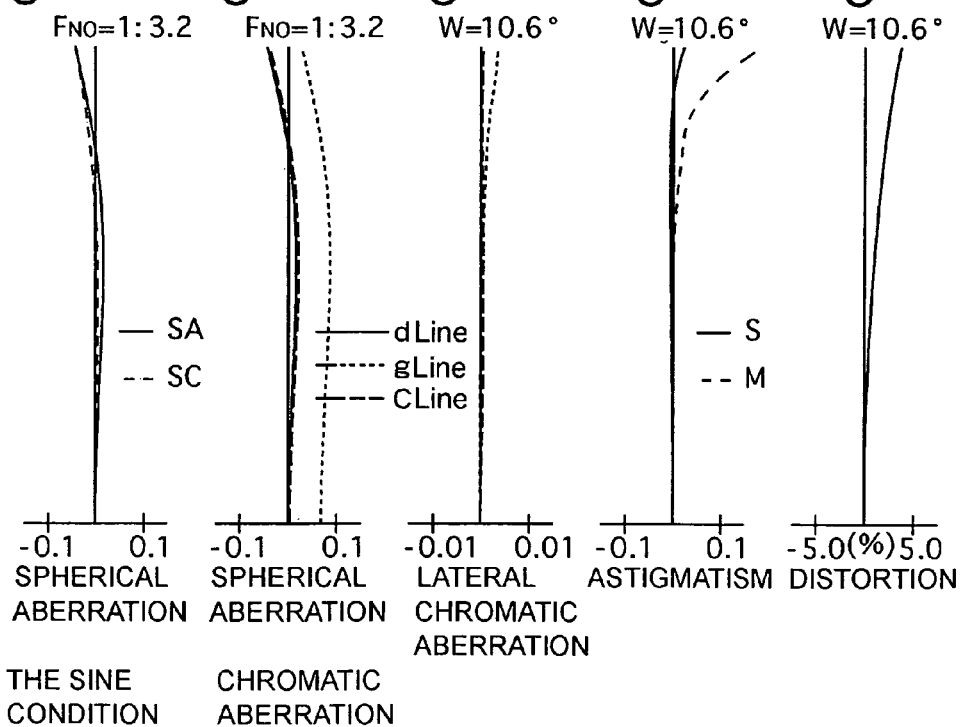
FIGS. 40A, 40B, 40C, 40D and 40E show aberrations occurred in the lens arrangement of FIG. 39.

FIG. 39 is the lens arrangement of the zoom lens system, at an intermediate focal length, according to the fifth embodiment of the present invention, when an object at infinity is in an in-focus state. FIGS. 40A through 40E show aberrations occurred in the lens arrangement of FIG. 39.

Figure 41:
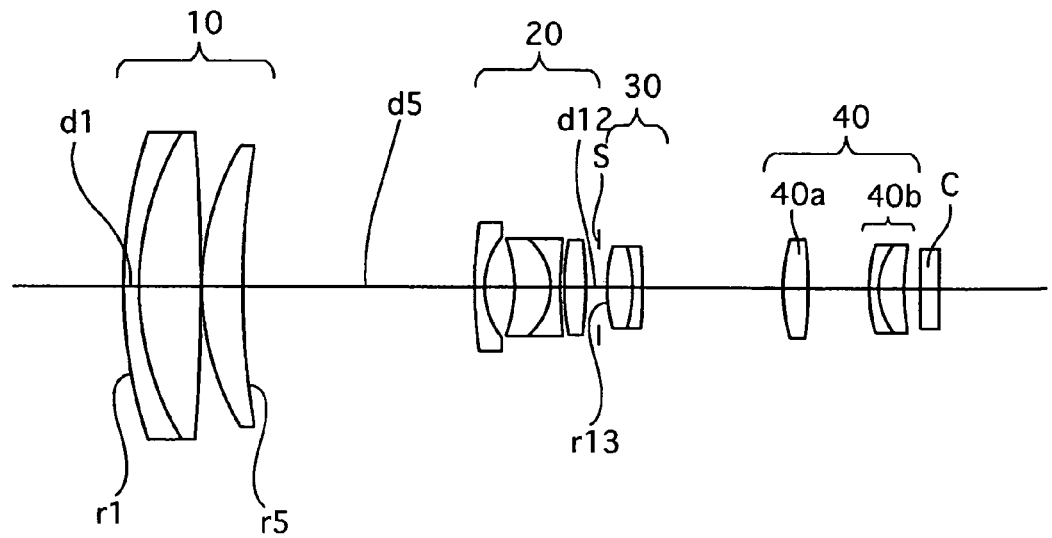
FIG. 41 is a lens arrangement of the zoom lens system, at the long focal length extremity, according to the fifth embodiment of the present invention, when an object at infinity is in an in-focus state.
Figures 42A, 42B, 42C, 42D, 42E:
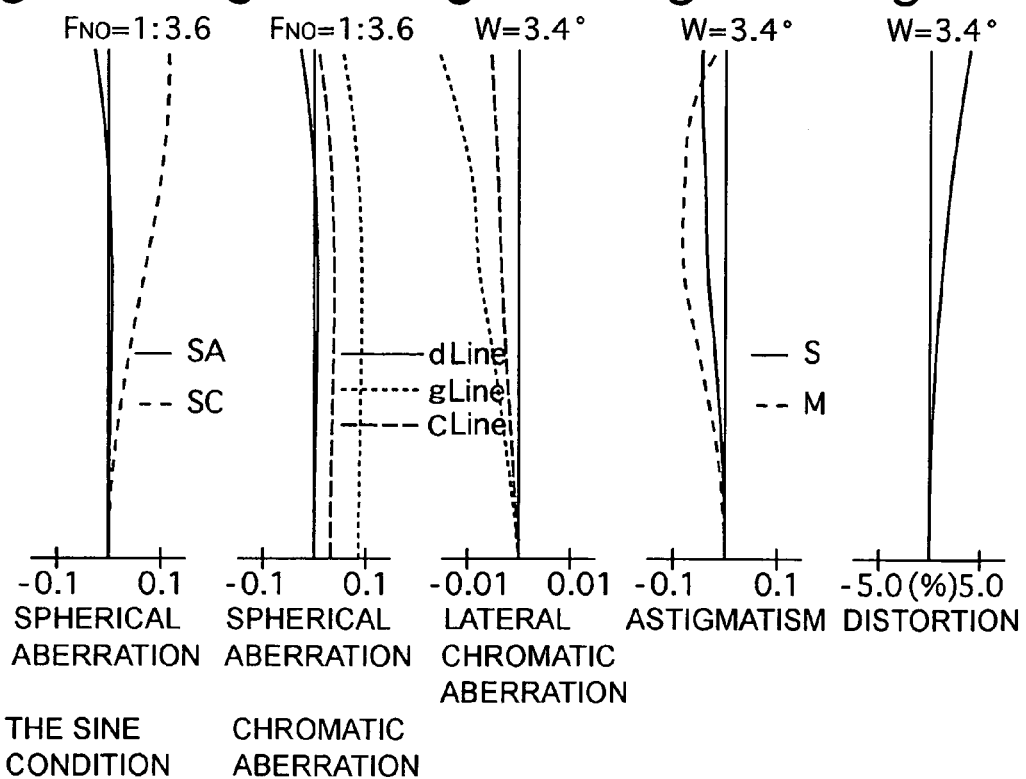
FIGS. 42A, 42B, 42C, 42D and 42E show aberrations occurred in the lens arrangement of FIG. 41.

FIG. 41 is the lens arrangement of the zoom lens system, at the long focal length extremity, according to the fifth embodiment of the present invention, when an object at infinity is in an in-focus state. FIGS. 42A through 42E show aberrations occurred in the lens arrangement of FIG. 41.

FIGS. 43A through 43E show aberrations occurred in the zoom lens system of the fifth embodiment at the short focal length extremity, when an object at a finite photographic distance is in an in-focus state.

FIGS. 44A through 44E show aberrations occurred in the zoom lens system of the fifth embodiment at an intermediate focal length, when an object at a finite photographic distance is in an in-focus state.

FIGS. 45A through 45E show aberrations occurred in the zoom lens system of the fifth embodiment at the long focal length extremity, when an object at a finite photographic distance is in an in-focus state.

Tables 5A and 5B show the numerical values of the fifth embodiment.

The basic lens arrangement of the fifth embodiment, and the way of focusing thereof are the same as the first embodiment.

The diaphragm S is provided 0.70 on the object side (in front of surface No. 13) of the positive third lens group 30.

TABLE 5A

FNO. = 1:2.8–3.2–3.6
f = 5.94–18.00–56.60
W = 31.4°–10.6°–3.4°
m = 0.000–0.000–0.000
fB = 6.41–6.41–6.41

| Surf. No. | r | d | Nd | ν |
|---|---|---|---|---|
| 1 | 45.832 | 1.40 | 1.84666 | 23.8 |
| 2 | 27.636 | 5.55 | 1.49700 | 81.6 |
| 3 | −178.876 | 0.10 | | |
| 4 | 25.457 | 3.68 | 1.72916 | 54.7 |
| 5 | 78.187 | 0.92–12.92–21.12 | | |
| 6 | 42.092 | 0.90 | 1.88300 | 40.8 |
| 7 | 7.464 | 2.73 | | |
| 8 | −12.922 | 3.29 | 1.84666 | 23.8 |

TABLE 5A-continued

| | | | | |
|---|---|---|---|---|
| 9 | −5.841 | 0.90 | 1.88300 | 40.8 |
| 10 | 42.578 | 0.35 | | |
| 11 | 23.354 | 1.93 | 1.64769 | 33.8 |
| 12 | −35.698 | 22.10–10.10–1.90 | | |
| 13* | 12.974 | 2.34 | 1.43426 | 95.0 |
| 14 | −13.742 | 0.90 | 1.61293 | 37.0 |
| 15 | −46.190 | 13.29–9.54–12.58 | | |
| 16* | 16.705 | 2.25 | 1.58913 | 61.2 |
| 17 | −37.252 | 5.54 | | |
| 18 | 14.260 | 0.90 | 1.84666 | 23.8 |
| 19 | 6.495 | 2.31 | 1.51742 | 52.4 |
| 20 | 22.563 | 0.80–4.55–1.52 | | |
| 21 | ∞ | 1.70 | 1.51633 | 64.1 |
| 22 | ∞ | — | | |

| NO | K | A4 | A6 | A8 |
|---|---|---|---|---|
| 13 | $-0.10000 \times 10^1$ | $-0.13404 \times 10^{-4}$ | $0.12644 \times 10^{-5}$ | $-0.28995 \times 10^{-7}$ |
| 16 | $-0.10000 \times 10^1$ | $-0.56029 \times 10^{-4}$ | $0.10702 \times 10^{-6}$ | $-0.51595 \times 10^{-8}$ |

TABLE 5B

Fe = 1:2.8–3.3–4.4
Y = 3.50–3.50–3.50
m = −0.025—−0.062—−0.113
fB = 6.41–6.41–6.41

| Surf. No. | d |
|---|---|
| 5 | 0.86–12.46–17.42 |
| 12 | 22.16–10.56–5.60 |
| 15 | 13.16–8.63–5.18 |
| 20 | 0.93–5.47–8.91 |

Embodiment 6

Figure 46:
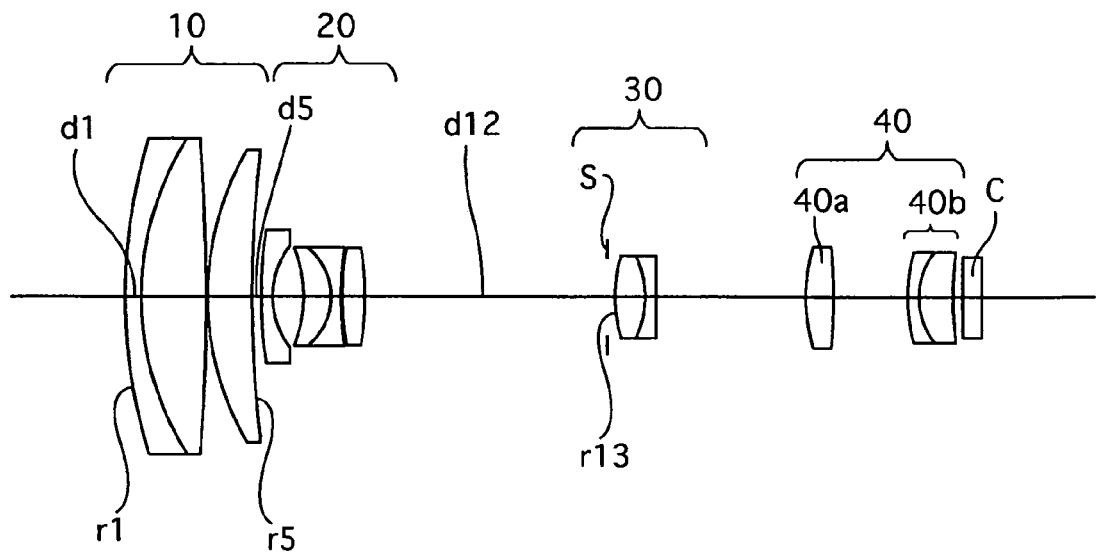
FIG. 46 is a lens arrangement of the zoom lens system, at the short focal length extremity, according to a sixth embodiment of the present invention, when an object at infinity is in an in-focus state.
Figures 47A, 47B, 47C, 47D, 47E:
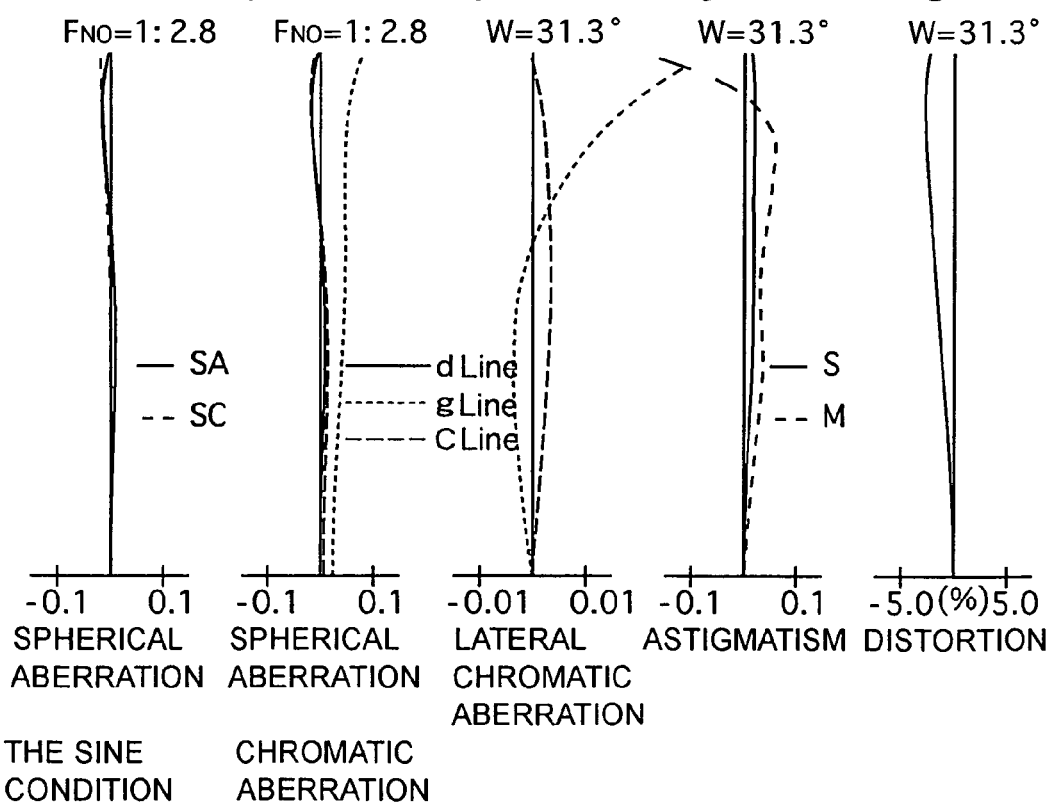
FIGS. 47A, 47B, 47C, 47D and 47E show aberrations occurred in the lens arrangement of FIG. 46.

FIG. 46 is the lens arrangement of the zoom lens system, at the short focal length extremity, according to the sixth embodiment of the present invention, when an object at infinity is in an in-focus state. FIGS. 47A through 47E show aberrations occurred in the lens arrangement of FIG. 46.

Figure 48:
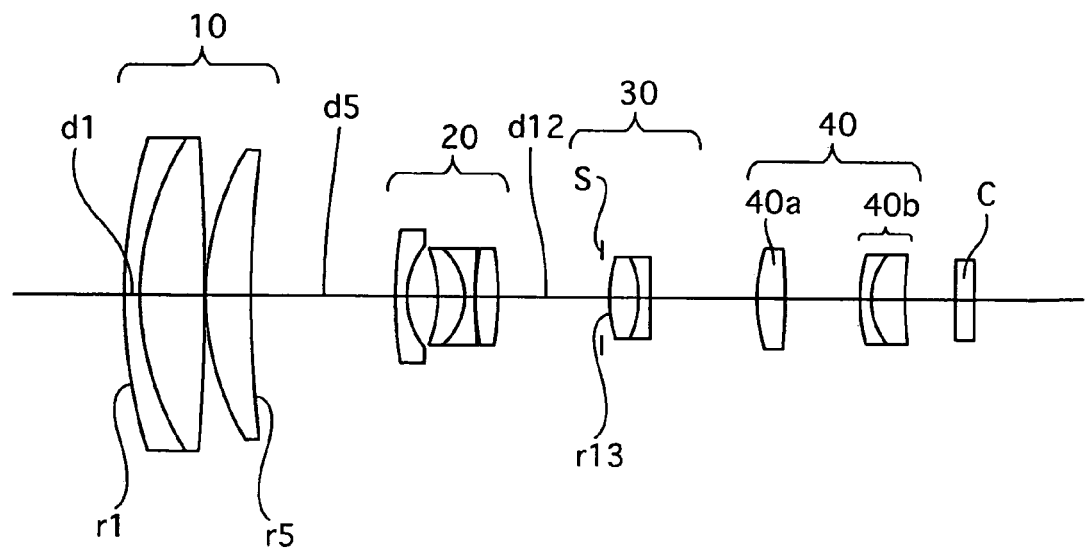
FIG. 48 is a lens arrangement of the zoom lens system, at an intermediate focal length, according to the sixth embodiment of the present invention, when object at infinity is in an in-focus state.
Figures 49A, 49B, 49C, 49D, 49E:
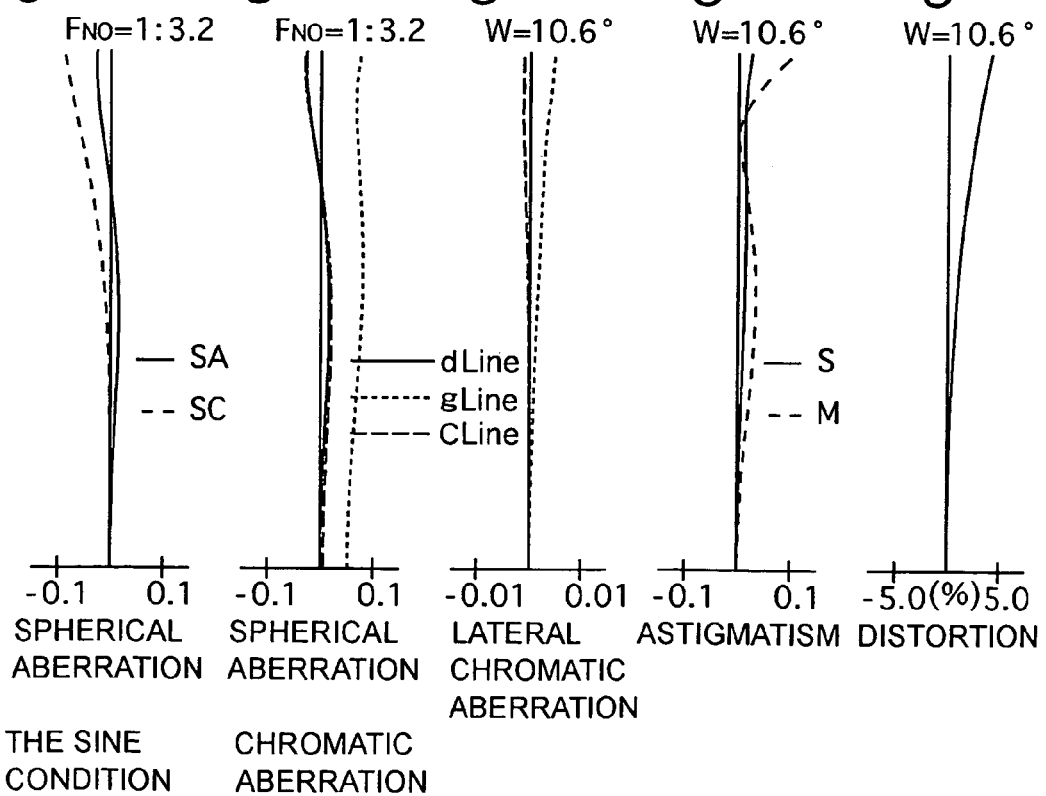
FIGS. 49A, 49B, 49C, 49D and 49E show aberrations occurred in the lens arrangement of FIG. 48.

FIG. 48 is the lens arrangement of the zoom lens system, at an intermediate focal length, according to the sixth embodiment of the present invention, when an object at infinity is in an in-focus state. FIGS. 49A through 49E show aberrations occurred in the lens arrangement of FIG. 48.

Figure 50:
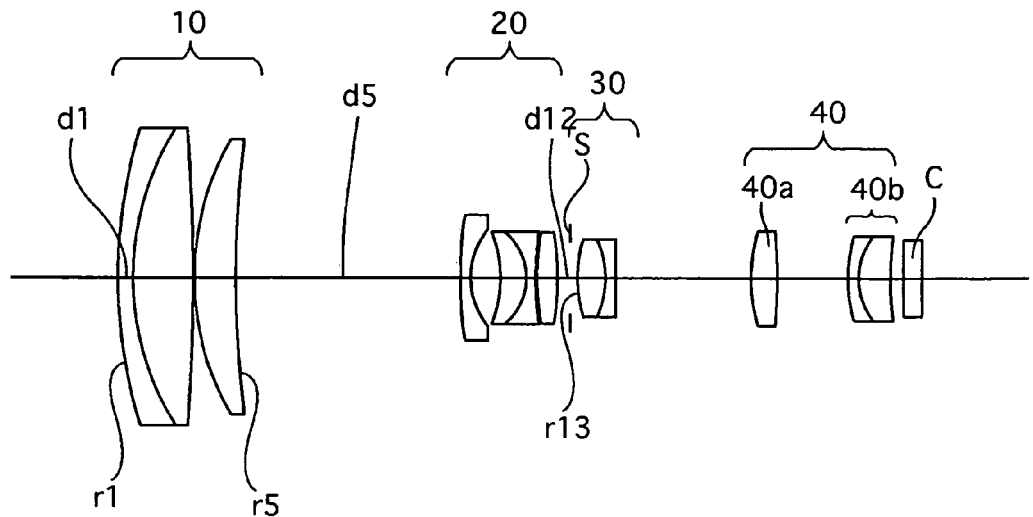
FIG. 50 is a lens arrangement of the zoom lens system, at the long focal length extremity, according to the sixth embodiment of the present invention, when an object at infinity is in an in-focus state.
Figures 51A, 51B, 51C, 51D, 51E:
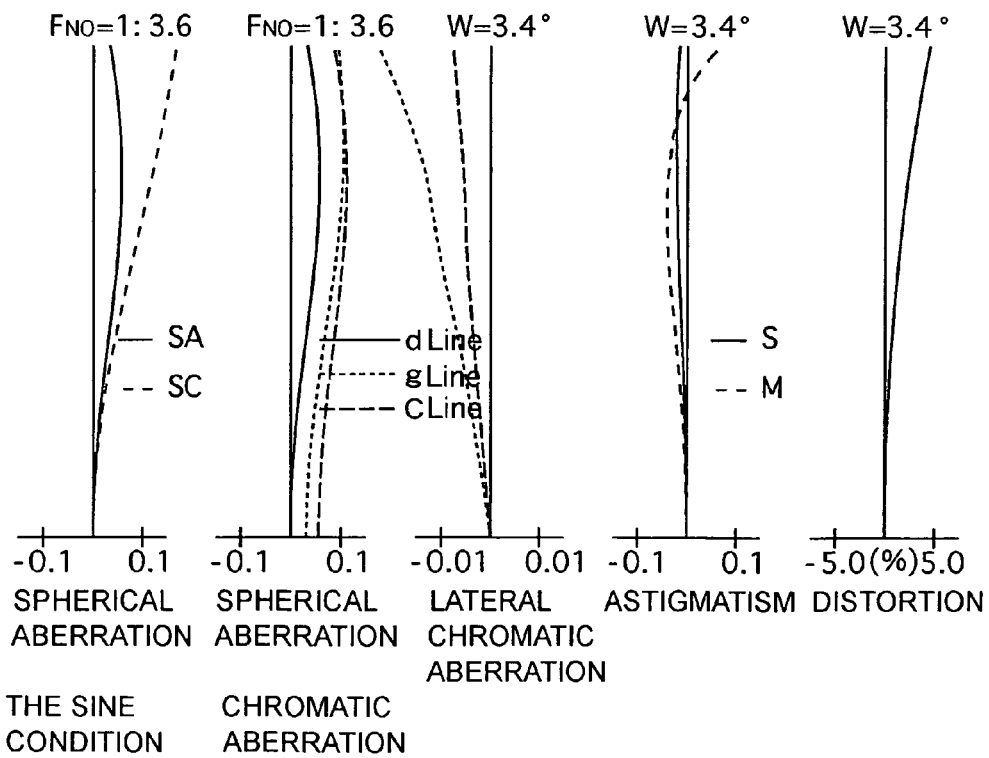
FIGS. 51A, 51B, 51C, 51D and 51E show aberrations occurred in the lens arrangement of FIG. 50.

FIG. 50 is the lens arrangement of the zoom lens system, at the long focal length extremity, according to the sixth embodiment of the present invention, when an object at infinity is in an in-focus state. FIGS. 51A through 51E show aberrations occurred in the lens arrangement of FIG. 50.

FIGS. 52A through 52E show aberrations occurred in the zoom lens system of the sixth embodiment at the short focal length extremity, when an object at a finite photographic distance is in an in-focus state.

FIGS. 53A through 53E show aberrations occurred in the zoom lens system of the sixth embodiment at an intermediate focal length, when an object at a finite photographic distance is in an in-focus state.

FIGS. 54A through 54E show aberrations occurred in the zoom lens system of the sixth embodiment at the long focal length extremity, when an object at a finite photographic distance is in an in-focus state.

Tables 6A and 6B show the numerical values of the sixth embodiment.

The basic lens arrangement of the sixth embodiment, and the way of focusing thereof are the same as the first embodiment.

The diaphragms is provided 0.70 on the object side (in front of surface No. 13) of the positive third lens group 30.

TABLE 6A

FNO. = 1:2.8–3.2–3.6
f = 5.90–18.00–56.00
W = 31.3°–10.6°–3.4°
m = 0.000–0.000–0.000
fB = 4.38–4.38–4.38

| Surf. No. | r | d | Nd | ν |
|---|---|---|---|---|
| 1 | 48.381 | 1.40 | 1.84666 | 23.8 |
| 2 | 26.352 | 5.74 | 1.48749 | 70.2 |
| 3 | −180.593 | 0.10 | | |
| 4 | 25.617 | 3.99 | 1.73400 | 51.5 |
| 5 | 107.123 | 0.81–12.75–20.86 | | |
| 6* | 42.541 | 1.00 | 1.85020 | 40.8 |
| 7 | 7.356 | 2.79 | | |
| 8 | −11.500 | 2.44 | 1.80518 | 25.4 |
| 9 | −5.610 | 0.90 | 1.88300 | 40.8 |
| 10 | 36.083 | 0.10 | | |
| 11 | 24.415 | 1.99 | 1.76182 | 26.5 |
| 12 | −26.626 | 21.95–10.01–1.90 | | |
| 13* | 12.371 | 2.65 | 1.49700 | 81.6 |
| 14 | −8.487 | 1.00 | 1.56732 | 42.8 |
| 15 | −364.165 | 13.15–9.49–12.72 | | |
| 16* | 14.782 | 2.45 | 1.58913 | 61.2 |
| 17 | −51.567 | 6.66 | | |
| 18 | 14.841 | 1.00 | 1.84666 | 23.8 |
| 19 | 6.433 | 3.00 | 1.51742 | 52.4 |
| 20 | 30.641 | 0.80–4.46–1.23 | | |
| 21 | ∞ | 1.70 | 1.51633 | 64.1 |
| 22 | ∞ | — | | |

| No. | K | A4 | A6 | A8 | A10 |
|---|---|---|---|---|---|
| 6 | $-0.10000 \times 10^1$ | $-0.15179 \times 10^{-4}$ | $0.38697 \times 10^{-5}$ | $-0.13785 \times 10^{-6}$ | $0.18930 \times 10^{-8}$ |

| No. | K | A4 | A6 | A8 |
|---|---|---|---|---|
| 13 | $-0.10000 \times 10^1$ | $0.28326 \times 10^{-4}$ | $0.18229 \times 10^{-5}$ | $-0.64490 \times 10^{-7}$ |
| 16 | $-0.10000 \times 10^1$ | $-0.64350 \times 10^{-4}$ | $0.34702 \times 10^{-6}$ | $-0.13361 \times 10^{-7}$ |

TABLE 6B

Fe = 1:2.8–3.3–4.5
Y = 3.50–3.50–3.50
m = −0.025—−0.062—−0.113
fB = 4.38–4.38–4.38

| Surf. No. | d |
|---|---|
| 5 | 0.74–12.29–17.13 |
| 12 | 22.02–10.47–5.64 |
| 15 | 13.02–8.57–5.25 |
| 20 | 0.93–5.38–8.70 |

Embodiment 7

Figure 55:
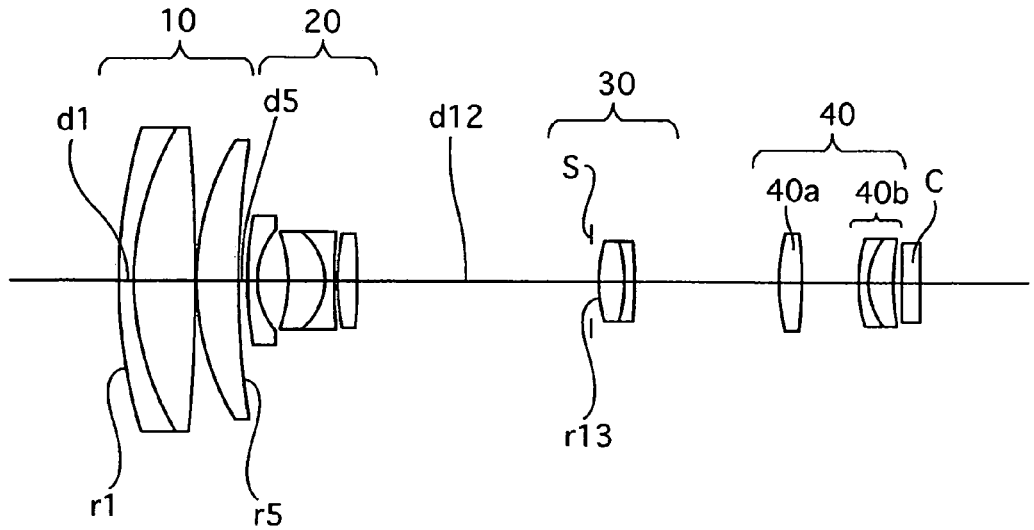
FIG. 55 is a lens arrangement of the zoom lens system, at the short focal length extremity, according to a seventh embodiment of the present invention, when an object at infinity is in an in-focus state.
Figures 56A, 56B, 56C, 56D, 56E:
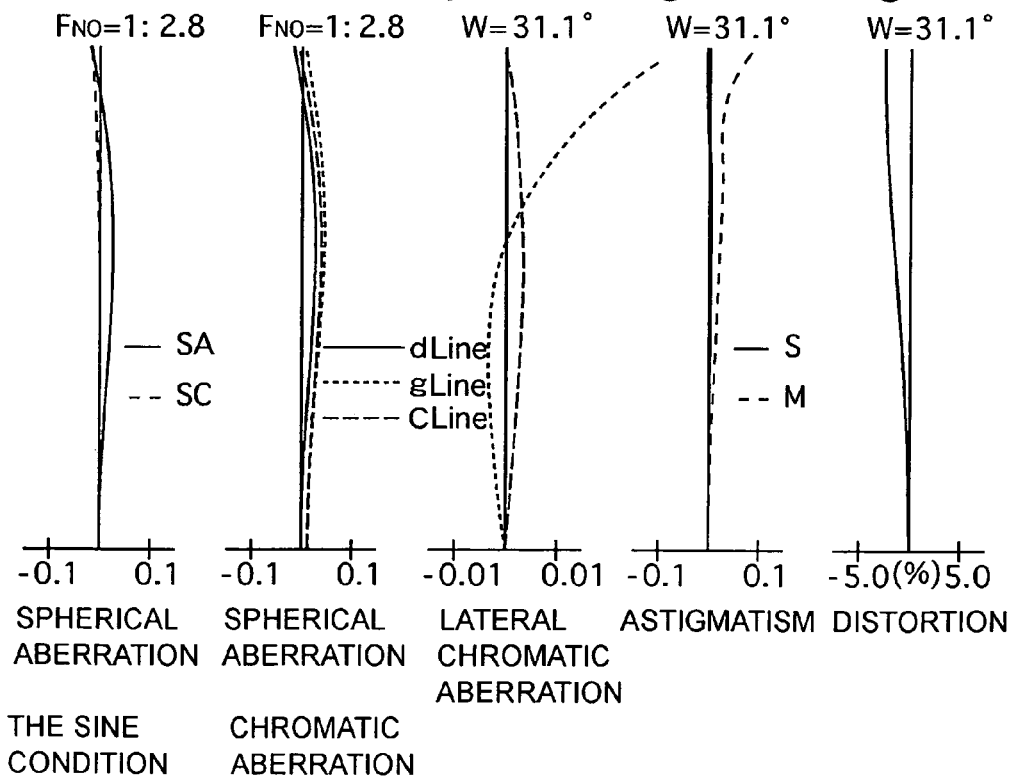
FIGS. 56A, 56B, 56C, 56D and 56E show aberrations occurred in the lens arrangement of FIG. 55.

FIG. 55 is the lens arrangement of the zoom lens system, at the short focal length extremity, according to the seventh embodiment of the present invention, when an object at infinity is in an in-focus state. FIGS. 56A through 56E show aberrations occurred in the lens arrangement of FIG. 55.

Figure 57:
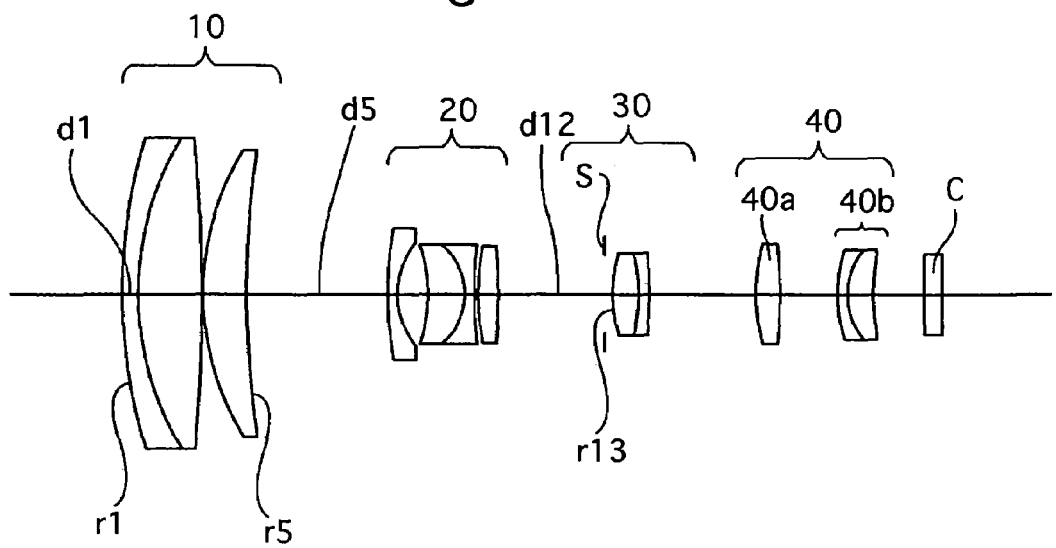
FIG. 57 is a lens arrangement of the zoom lens system, at an intermediate focal length, according to the seventh embodiment of the present invention, when an object at infinity is in an in-focus state.
Figures 58A, 58B, 58C, 58D, 58E:
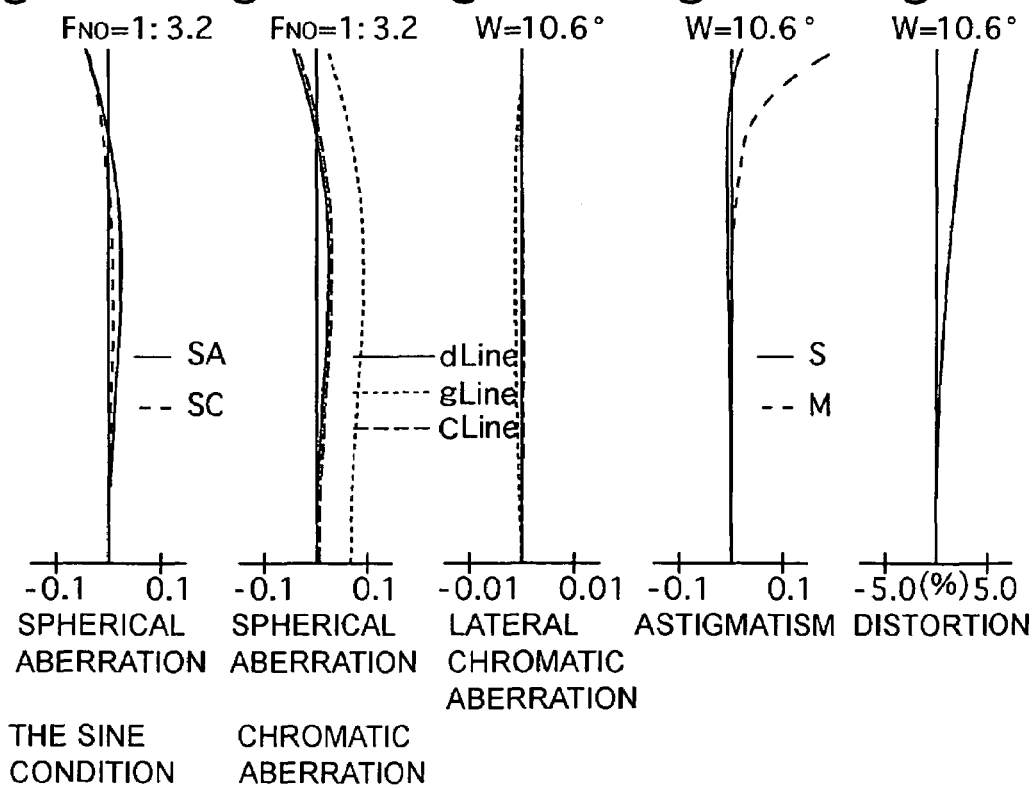
FIGS. 58A, 58B, 58C, 58D and 58E show aberrations occurred in the lens arrangement of FIG. 57.

FIG. 57 is the lens arrangement of the zoom lens system, at an intermediate focal length, according to the seventh embodiment of the present invention, when an object at infinity is in an in-focus state. FIGS. 58A through 58E show aberrations occurred in the lens arrangement of FIG. 57.

Figure 59:
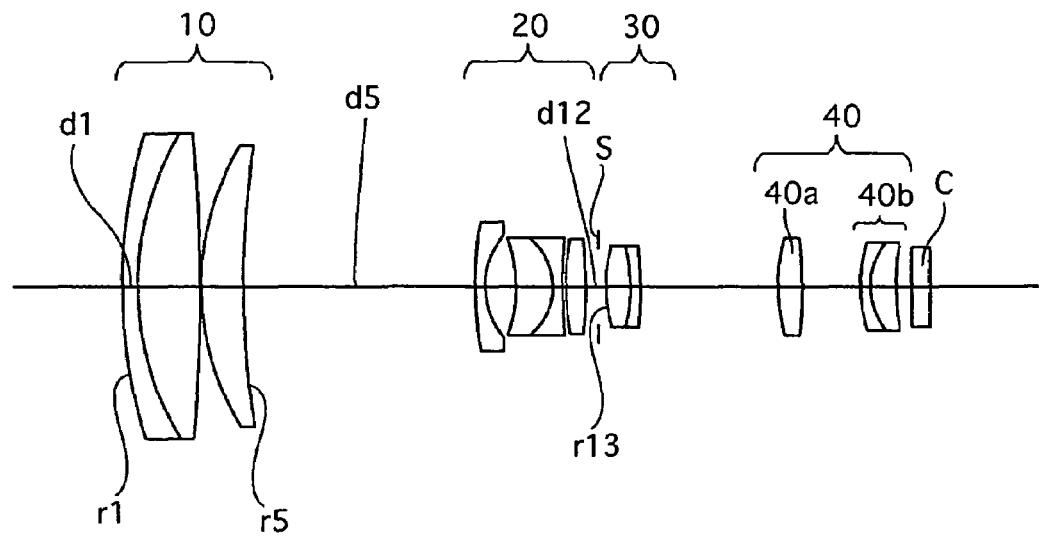
FIG. 59 is a lens arrangement of the zoom lens system, at the long focal length extremity, according to the seventh embodiment of the present invention, when an object at infinity is in an in-focus state.
Figures 60A, 60B, 60C, 60D, 60E:
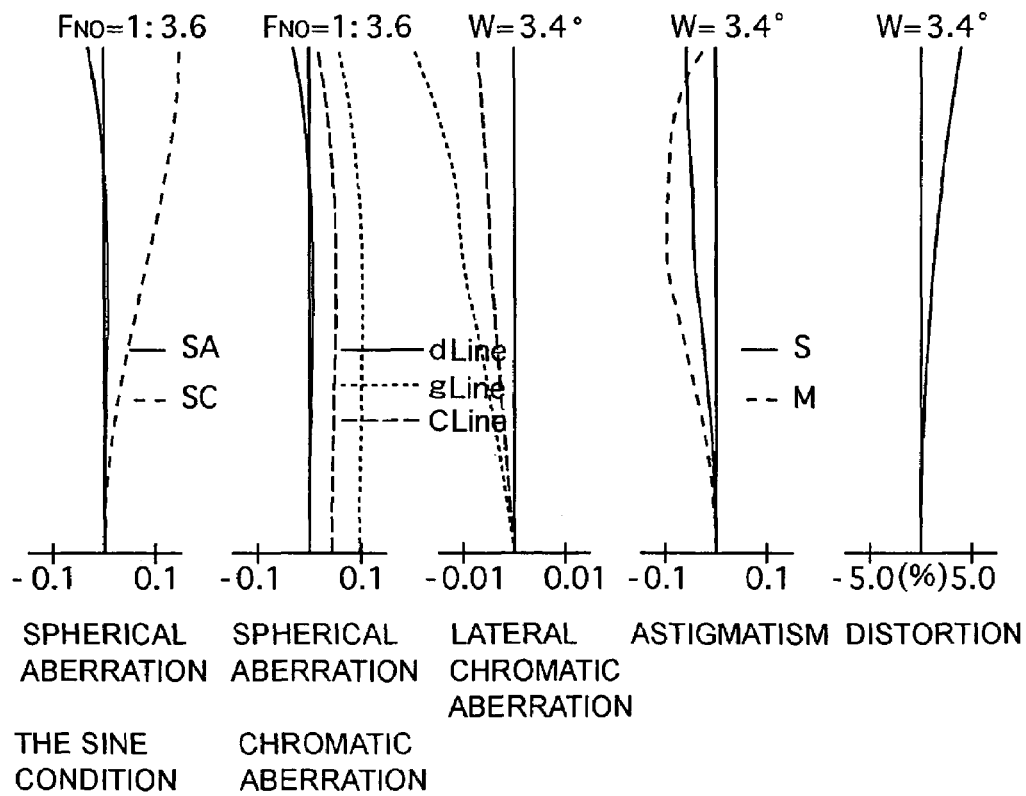
FIGS. 60A, 60B, 60C, 60D and 60E show aberrations occurred in the lens arrangement of FIG. 59.

FIG. 59 is the lens arrangement of the zoom lens system, at the long focal length extremity, according to the seventh embodiment of the present invention, when an object at infinity is in an in-focus state. FIGS. 60A through 60E show aberrations occurred in the lens arrangement of FIG. 59.

FIGS. 61A through 61E show aberrations occurred in the zoom lens system of the seventh embodiment at the short focal length extremity, when an object at a finite photographic distance is in an in-focus state.

FIGS. 62A through 62E show aberrations occurred in the zoom lens system of the seventh embodiment at an intermediate focal length, when an object at a finite photographic distance is in an in-focus-state.

FIGS. 63A through 63E show aberrations occurred in the zoom lens system of the seventh embodiment at the long focal length extremity, when an object at a finite photographic distance is in an in-focus state.

Tables 7A and 7B show the numerical values of the seventh embodiment.

The basic lens arrangement of the seventh embodiment, and the way of focusing thereof are the same as the first embodiment.

The diaphragm S is provided 0.70 on the object side (in front of surface No. 13) of the positive third lens group 30.

TABLE 7A

FNO. = 1:2.8–3.2–3.6
f = 5.94–18.00–56.60
W = 31.1°–10.6°–3.4°
m = 0.000–0.000–0.000
fB = 6.63–6.63–6.63

| Surf. No. | r | d | Nd | ν |
|---|---|---|---|---|
| 1 | 48.615 | 1.40 | 1.84666 | 23.8 |
| 2 | 27.260 | 5.68 | 1.48749 | 70.2 |
| 3 | −157.966 | 0.10 | | |
| 4 | 24.989 | 3.87 | 1.72916 | 54.7 |
| 5 | 85.363 | 0.80–12.78–21.00 | | |
| 6 | 34.274 | 0.90 | 1.88300 | 40.8 |
| 7 | 7.331 | 2.83 | | |
| 8 | −12.862 | 3.36 | 1.84666 | 23.8 |
| 9 | −5.753 | 0.90 | 1.88300 | 40.8 |
| 10 | 62.110 | 0.30 | | |
| 11 | 24.942 | 1.82 | 1.64769 | 33.8 |
| 12 | −48.037 | 22.10–10.12–1.90 | | |
| 13* | 12.987 | 2.32 | 1.43426 | 95.0 |
| 14 | −14.055 | 0.90 | 1.61293 | 37.0 |
| 15 | −46.035 | 13.25–9.51–12.63 | | |
| 16* | 16.899 | 2.17 | 1.58913 | 61.2 |
| 17 | −36.362 | 5.23 | | |
| 18 | 13.818 | 0.90 | 1.84666 | 23.8 |
| 19 | 6.479 | 2.33 | 1.51742 | 52.4 |
| 20 | 21.067 | 0.80–4.54–1.43 | | |
| 21 | ∞ | 1.70 | 1.51633 | 64.1 |
| 22 | ∞ | — | | |

| No. | K | A4 | A6 | A8 |
|---|---|---|---|---|
| 13 | −0.10000 × 10$^1$ | −0.21889 × 10$^{-4}$ | 0.15575 × 10$^{-5}$ | −0.32228 × 10$^{-7}$ |
| 16 | −0.10000 × 10$^1$ | −0.55786 × 10$^{-4}$ | 0.11336 × 10$^{-6}$ | −0.50252 × 10$^{-8}$ |

TABLE 7B

Fe = 1:2.8–3.3–4.4
Y = 3.50–3.50–3.50
m = −0.025—−0.062—−0.113
fB = 6.63–6.63–6.63

| Surf. No. | d |
|---|---|
| 5 | 0.73–12.32–17.27 |
| 12 | 22.16–10.57–5.63 |
| 15 | 13.12–8.60–5.17 |
| 20 | 0.93–5.46–8.89 |

Embodiment 8

Figure 64:
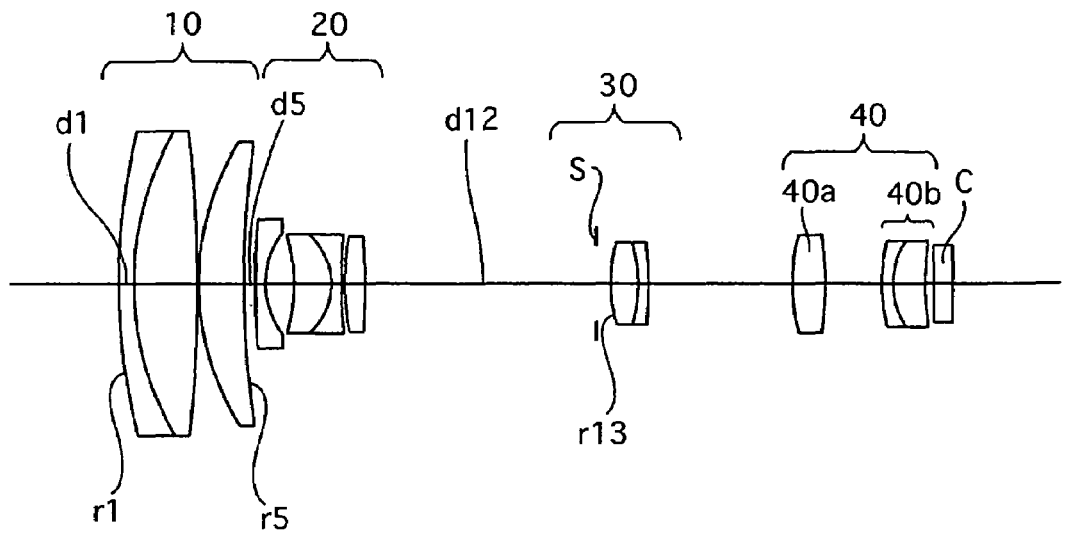
FIG. 64 is a lens arrangement of the zoom lens system, at the short focal length extremity, according to an eighth embodiment of the present invention, when an object at infinity is in an in-focus state.
Figures 65A, 65B, 65C, 65D, 65E:
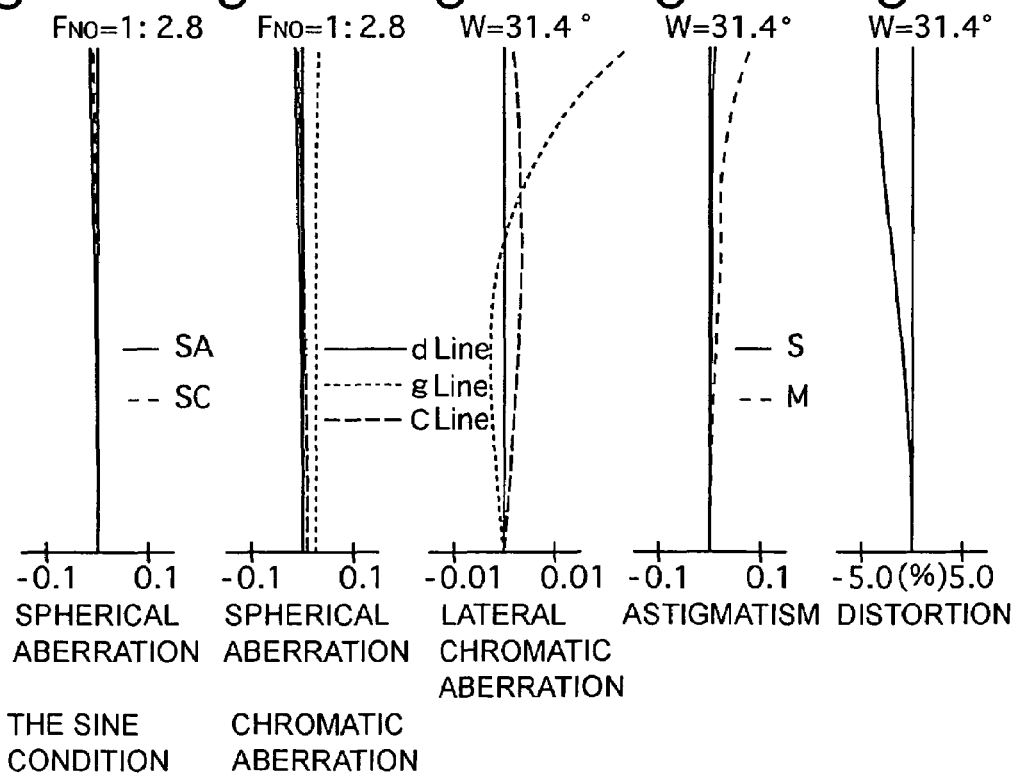
FIGS. 65A, 65B, 65C, 65D and 65E show aberrations occurred in the lens arrangement of FIG. 64.

FIG. 64 is the lens arrangement of the zoom lens system, at the short focal length extremity, according to the eighth embodiment of the present invention, when an object at infinity is in an in-focus state. FIGS. 65A through 65E show aberrations occurred in the lens arrangement of FIG. 64.

FIG. 66 is the lens arrangement of the zoom lens system, at an intermediate focal length, according to the eighth embodiment of the present invention, when an object at infinity is in an in-focus state. FIGS. 67A through 67E show aberrations occurred in the lens arrangement of FIG. 66.

FIG. 68 is the lens arrangement of the zoom lens system, at the long focal length extremity, according to the eighth embodiment of the present invention, when an object at infinity is in an in-focus state. FIGS. 69A through 69E show aberrations occurred in the lens arrangement of FIG. 68.

FIGS. 70A through 70E show aberrations occurred in the zoom lens system of the eighth embodiment at the short focal length extremity, when an object at a finite photographic distance is in an in-focus state.

FIGS. 71A through 71E show aberrations occurred in the zoom lens system of the eighth embodiment at an intermediate focal length, when an object at a finite photographic distance is in an in-focus state.

FIGS. 72A through 72E show aberrations occurred in the zoom lens system of the eighth embodiment at the long focal length extremity, when an object at a finite photographic distance is in an in-focus state.

Tables 8A and 8B show the numerical values of the eighth embodiment.

The basic lens arrangement of the eighth embodiment is the same as the first embodiment.

On the other hand, in regard to focusing, at the short focal length extremity and f=18, only the positive fourth lens group 40 is moved; at f=32, the negative second lens group 20 and the positive fourth lens group 40 are moved at the ratio of dX2/dX4=1.0, wherein dX2 designates the traveling distance of the negative second lens group 20, and dX4 designates the traveling distance of the positive fourth lens group 40; and at the long focal length extremity, the negative second lens group 20 and the positive fourth lens group 40 are moved at the ratio of dX2/dX4=⅓.

The diaphragm S is provided 1.25 on the object side (in front of surface No. 13) of the positive third lens group 30.

TABLE 8A

FNO. = 1:2.8–3.2–3.6
f = 5.94–18.00–56.60
W = 31.4°–10.7°–3.4°
m = 0.000–0.000–0.000
fB = 5.49–5.49–5.49

| Surf. No. | r | d | Nd | ν |
|---|---|---|---|---|
| 1 | 56.804 | 1.40 | 1.84666 | 23.8 |
| 2 | 28.040 | 5.83 | 1.48749 | 70.2 |
| 3 | −125.705 | 0.10 | | |
| 4 | 25.307 | 4.04 | 1.77250 | 49.6 |
| 5 | 90.627 | 1.04–12.97–21.24 | | |
| 6 | 72.399 | 0.90 | 1.88300 | 40.8 |
| 7 | 7.728 | 2.61 | | |
| 8 | −16.628 | 3.45 | 1.84666 | 23.8 |
| 9 | −6.057 | 0.90 | 1.88300 | 40.8 |
| 10 | 49.892 | 0.29 | | |
| 11 | 22.629 | 1.85 | 1.65446 | 33.6 |
| 12 | −74.164 | 22.65–10.72–2.45 | | |
| 13* | 12.902 | 2.46 | 1.43426 | 95.0 |
| 14 | −13.820 | 0.90 | 1.62588 | 35.7 |
| 15 | −43.931 | 13.07–9.35–12.65 | | |
| 16* | 15.880 | 3.00 | 1.58913 | 61.2 |
| 17 | −36.236 | 5.23 | | |
| 18 | 16.498 | 1.00 | 1.84666 | 23.8 |
| 19 | 6.824 | 3.00 | 1.51742 | 52.4 |
| 20 | 22.141 | 0.80–4.52–1.22 | | |
| 21 | ∞ | 1.70 | 1.51633 | 64.1 |
| 22 | ∞ | — | | |

| NO | K | A4 | A6 |
|---|---|---|---|
| 13 | $-0.10000 \times 10^1$ | $0.11048 \times 10^{-4}$ | $0.18229 \times 10^{-5}$ |
| 16 | $-0.10000 \times 10^1$ | $-0.63958 \times 10^{-4}$ | $-0.10148 \times 10^{-6}$ |

TABLE 8B

Fe = 1:2.8–3.3–4.6
Y = 3.50–3.50–3.50
m = −0.025—0.066—0.131
fB = 5.49–5.49–5.49

| Surf. No. | d |
|---|---|
| 5 | 1.04–12.97–18.42 |
| 12 | 22.65–10.72–5.27 |
| 15 | 12.92–8.16–4.18 |
| 20 | 0.95–5.71–9.69 |

Embodiment 9

FIG. 73 is the lens arrangement of the zoom lens system, at the short focal length extremity, according to the ninth embodiment of the present invention, when an object at infinity is in an in-focus state. FIGS. 74A through 74E show aberrations occurred in the lens arrangement of FIG. 73.

FIG. 75 is the lens arrangement of the zoom lens system, at an intermediate focal length, according to the ninth embodiment of the present invention, when an object at infinity is in an in-focus state. FIGS. 76A through 76E show aberrations occurred in the lens arrangement of FIG. 75.

Figure 77:
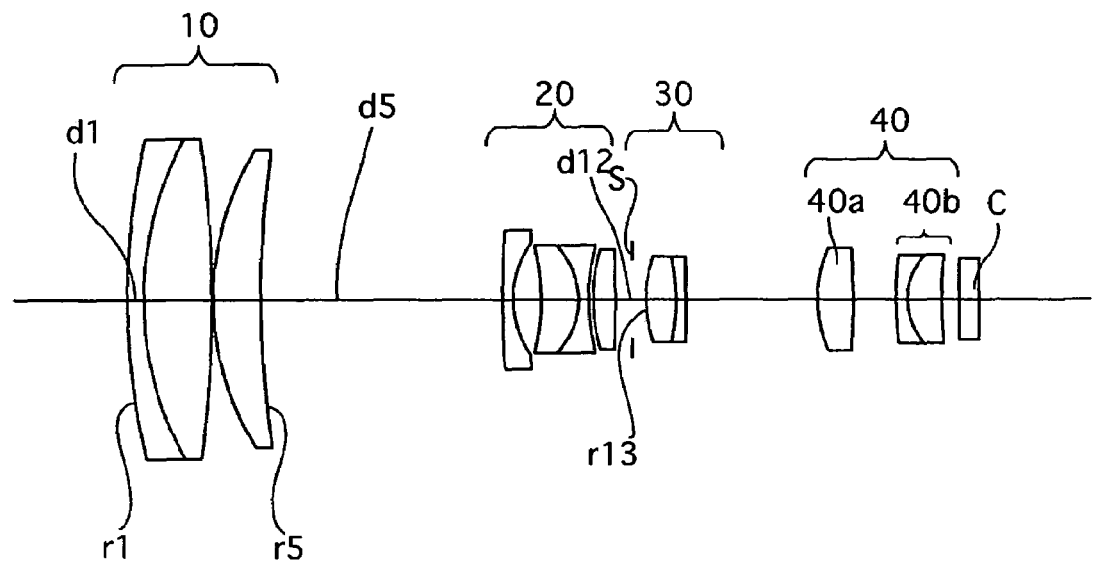
FIG. 77 is a lens arrangement of the zoom lens system, at the long focal length extremity, according to the ninth-embodiment of the present invention, when an object at infinity is in an in-focus state.
Figures 78A, 78B, 78C, 78D, 78E:
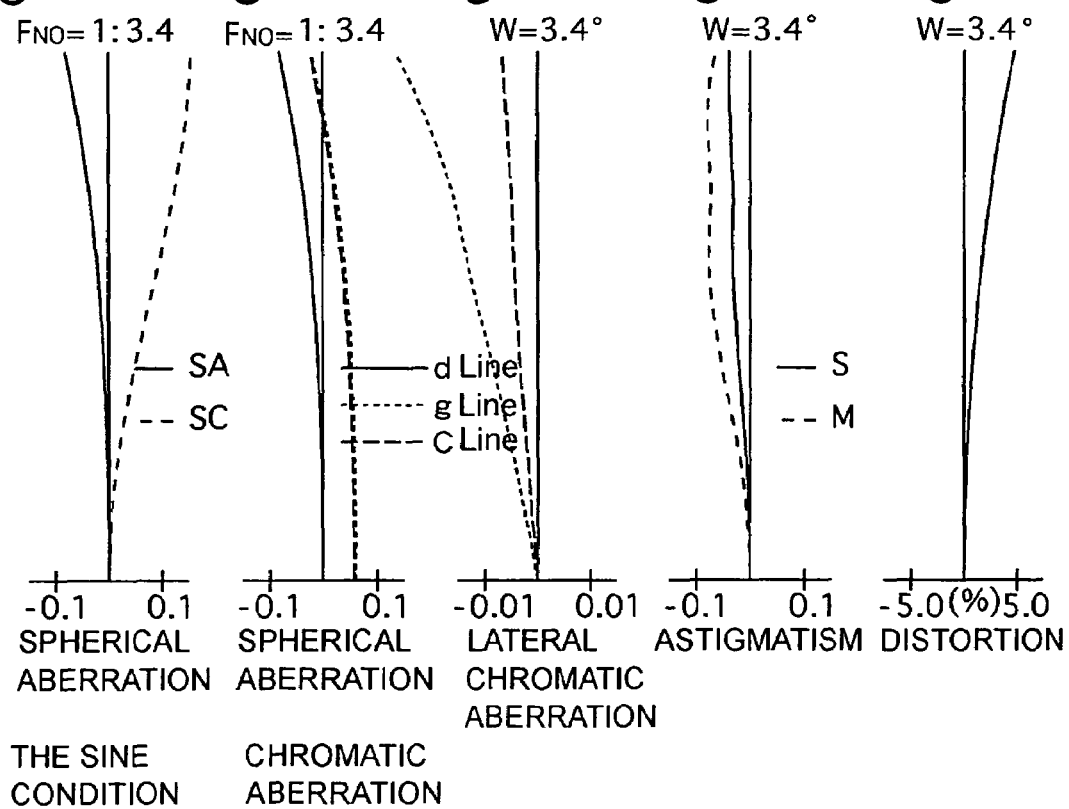
FIGS. 78A, 78B, 78C, 78D and 78E show aberrations occurred in the lens arrangement of FIG. 77.

FIG. 77 is the lens arrangement of the zoom lens system, at the long focal length extremity, according to the ninth embodiment of the present invention, when an object at infinity is in an in-focus state. FIGS. 78A through 78E show aberrations occurred in the lens arrangement of FIG. 77.

FIGS. 79A through 79E show aberrations occurred in the zoom lens system of the ninth embodiment at the short focal length extremity, when an object at a finite photographic distance is in an in-focus state.

FIGS. 80A through 80E show aberrations occurred in the zoom lens system of the ninth embodiment at an intermediate focal length, when an object at a finite photographic distance is in an in-focus state.

FIGS. 81A through 81E show aberrations occurred in the zoom lens system of the ninth embodiment at the long focal length extremity, when an object at a finite photographic distance is in an in-focus state.

Tables 9A and 9B show the numerical values of the ninth embodiment.

The basic lens arrangement of the ninth embodiment, and the way of focusing thereof are the same as the eighth embodiment.

The diaphragm S is provided 1.25 on the object side (in front of surface No. 13) of the positive third lens group 30.

TABLE 9A

FNO. = 1:2.9 - 3.4 - 3.4
f = 5.91 - 18.00 - 56.60
W = 31.3° - 10.6° - 3.4°
m = 0.000 - 0.000 - 0.000
fB = 6.28 - 6.28 - 6.28

| Surf. No. | r | d | Nd | ν |
|---|---|---|---|---|
| 1 | 62.132 | 1.40 | 1.84666 | 23.8 |
| 2 | 28.852 | 6.03 | 1.48749 | 70.2 |
| 3 | −100.000 | 0.10 | | |
| 4 | 25.250 | 4.09 | 1.77250 | 49.6 |
| 5 | 91.368 | 1.12–12.75–20.92 | | |
| 6 | 104.871 | 0.90 | 1.88300 | 40.8 |
| 7 | 8.619 | 2.46 | | |
| 8 | −19.286 | 3.27 | 1.84666 | 23.8 |
| 9 | −6.776 | 0.90 | 1.88300 | 40.8 |
| 10 | 17.947 | 0.39 | | |
| 11 | 15.516 | 1.96 | 1.72825 | 28.5 |
| 12 | −104.266 | 22.56–10.93–2.76 | | |
| 13* | 11.248 | 2.62 | 1.43312 | 95.2 |
| 14 | −18.768 | 0.90 | 1.62588 | 35.7 |
| 15 | −106.721 | 12.10–8.26–11.38 | | |
| 16* | 11.746 | 3.00 | 1.58913 | 61.2 |
| 17* | −58.024 | 3.77 | | |
| 18 | 28.438 | 1.00 | 1.71736 | 29.5 |
| 19 | 5.672 | 3.00 | 1.51742 | 52.4 |
| 20 | 33.625 | 0.80–4.63–1.52 | | |
| 21 | ∞ | 1.70 | 1.51633 | 64.1 |
| 22 | ∞ | — | | |

| NO | K | A4 | A6 |
|---|---|---|---|
| 13 | $-0.10000 \times 10^1$ | $0.33790 \times 10^{-5}$ | |
| 16 | $-0.10000 \times 10^1$ | $0.66354 \times 10^{-4}$ | $0.29304 \times 10^{-5}$ |
| 17 | $-0.10000 \times 10^1$ | $0.15598 \times 10^{-3}$ | $0.28865 \times 10^{-5}$ |

TABLE 9B

Fe = 1:2.9–3.4–3.9
Y = 3.50—3.50—3.50
m = −0.006—0.017—0.042
fB = 6.28—6.28—6.28

| Surf. No. | d |
|---|---|
| 5 | 1.12–12.75–19.45 |
| 12 | 22.56–10.93–4.22 |
| 15 | 12.06–7.96–6.97 |
| 20 | 0.84–4.94–5.92 |

Embodiment 10

FIG. 82 is the lens arrangement of the zoom lens system, at the short focal length extremity, according to the tenth embodiment of the present invention, when an object at infinity is in an in-focus state. FIGS. 83A through 83E show aberrations occurred in the lens arrangement of FIG. 82.

Figure 84:
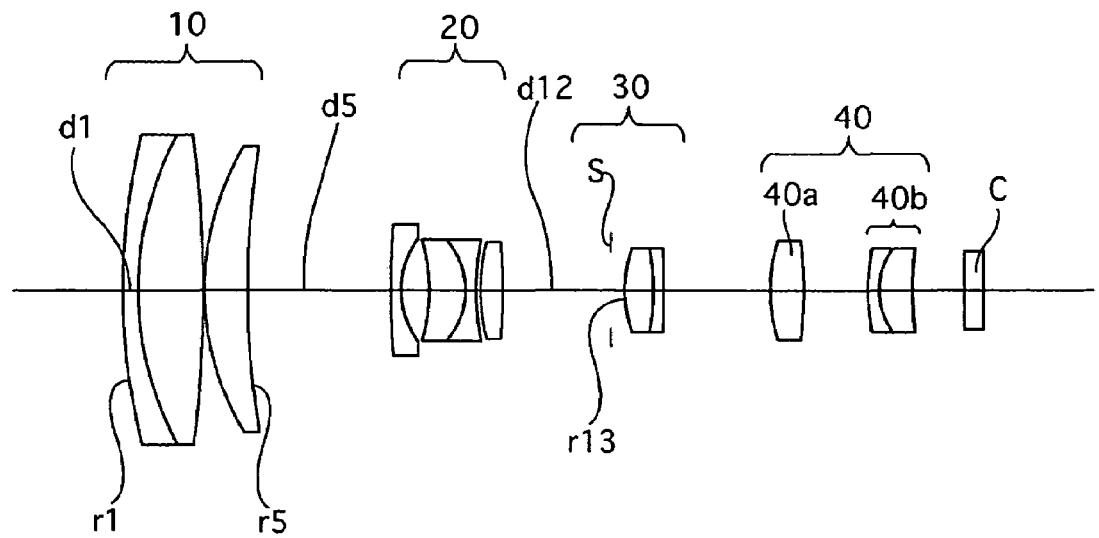
FIG. 84 is a lens arrangement of the zoom lens system, at an intermediate focal length, according to the tenth embodiment of the present invention, when an object at infinity is in an in-focus state.
Figures 85A, 85B, 85C, 85D, 85E:
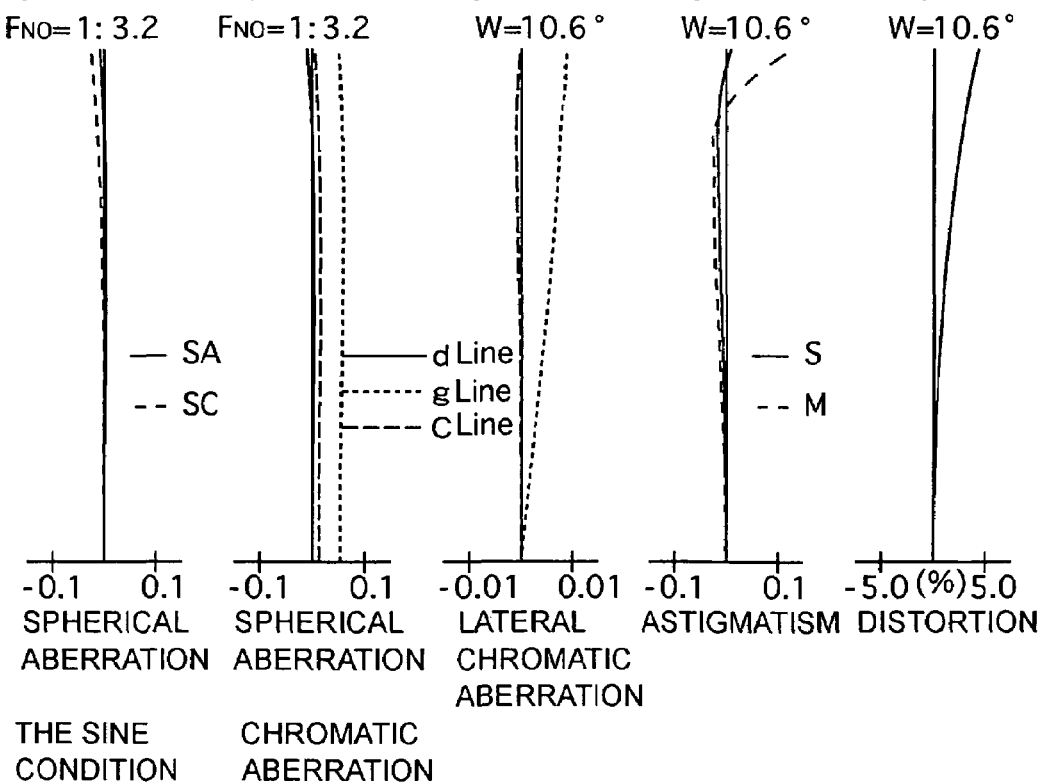
FIGS. 85A, 85B, 85C, 85D and 85E show aberrations occurred in the lens arrangement of FIG. 84.

FIG. 84 is the lens arrangement of the zoom lens system, at an intermediate focal length, according to the tenth embodiment of the present invention, when an object at infinity is in an in-focus state. FIGS. 85A through 85E show aberrations occurred in the lens arrangement of FIG. 84.

Figure 86:
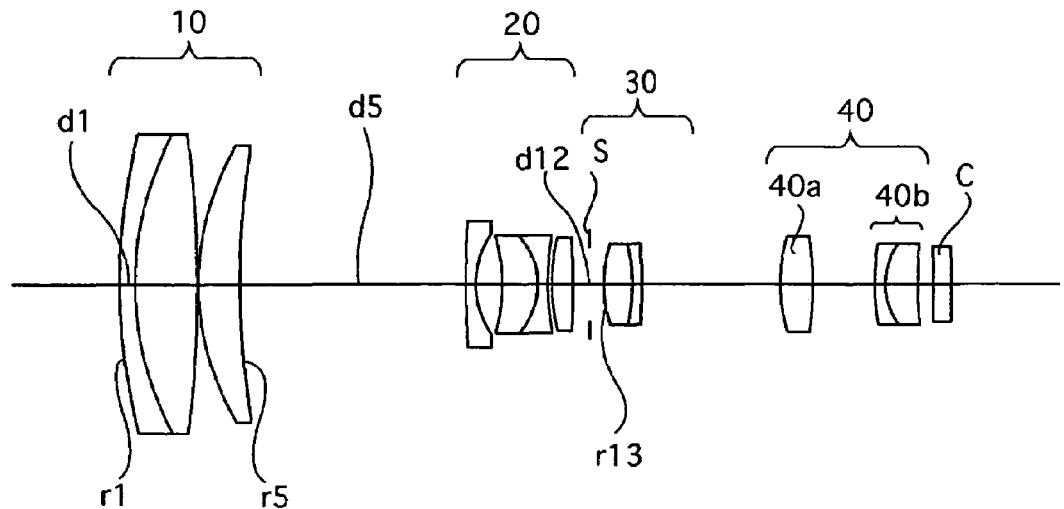
FIG. 86 is a lens arrangement of the zoom lens system, at the long focal length extremity, according to the tenth embodiment of the present invention, when an object at infinity is in an in-focus state.
Figures 87A, 87B, 87C, 87D, 87E:
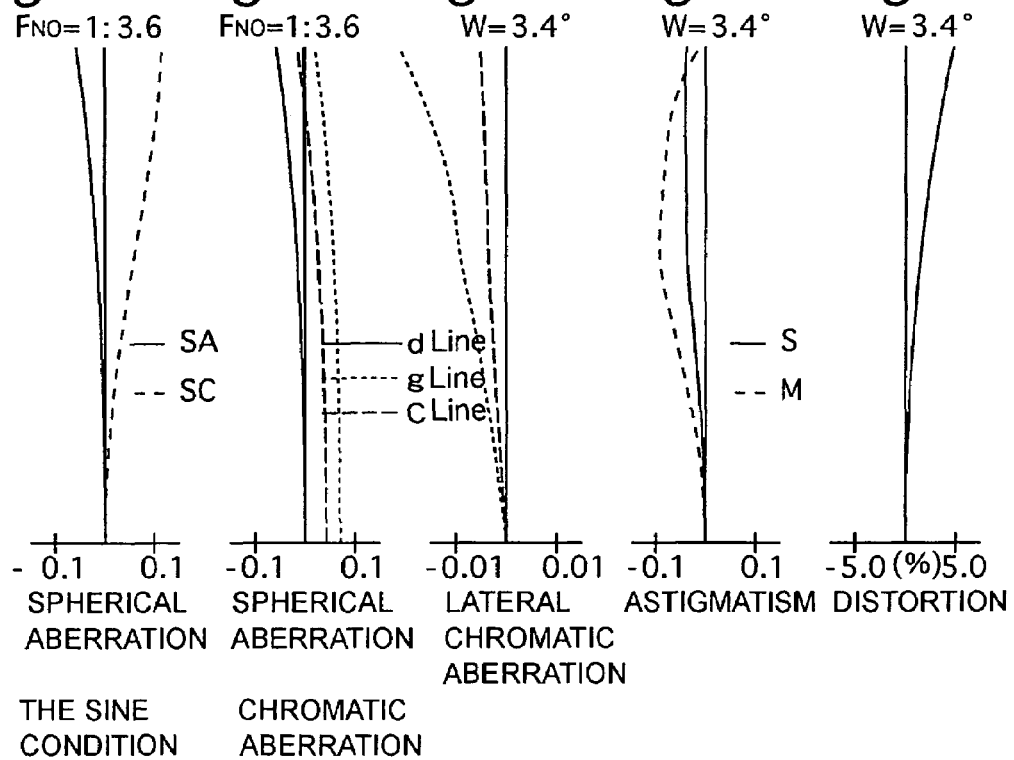
FIGS. 87A, 87B, 87C, 87D and 87E show aberrations occurred in the lens arrangement of FIG. 86.
Figures 88A, 88B, 88C, 88D, 88E:
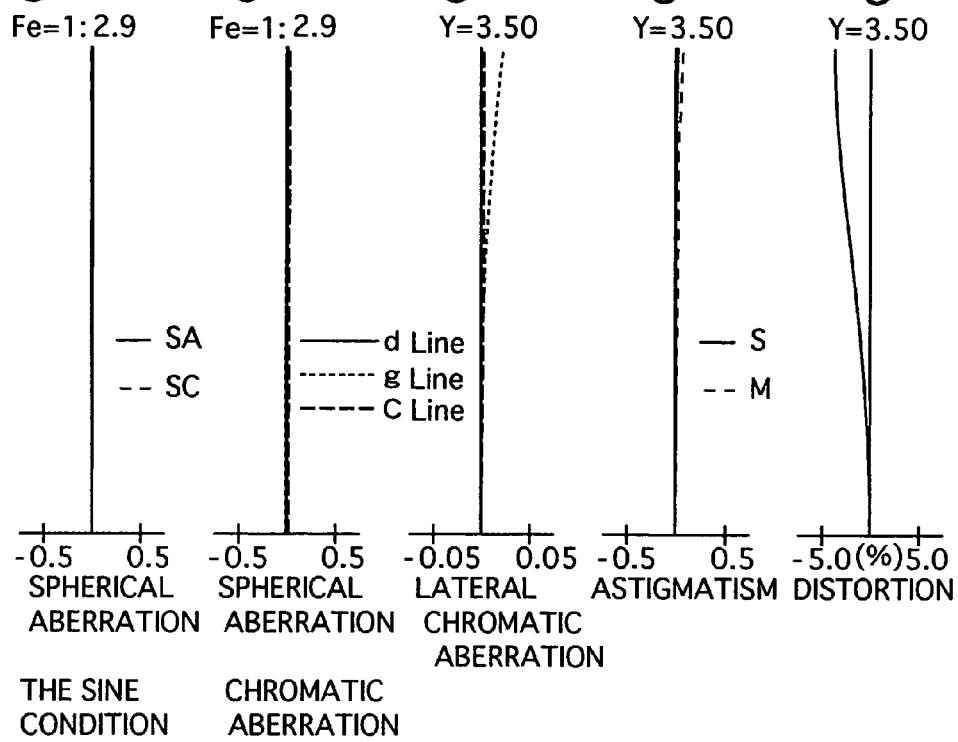
FIGS. 88A, 88B, 88C, 88D and 88E show aberrations occurred in the zoom lens system of the tenth embodiment at the short focal length extremity, when an object at a finite photographic distance is in an in-focus state.
Figures 89A, 89B, 89C, 89D, 89E:
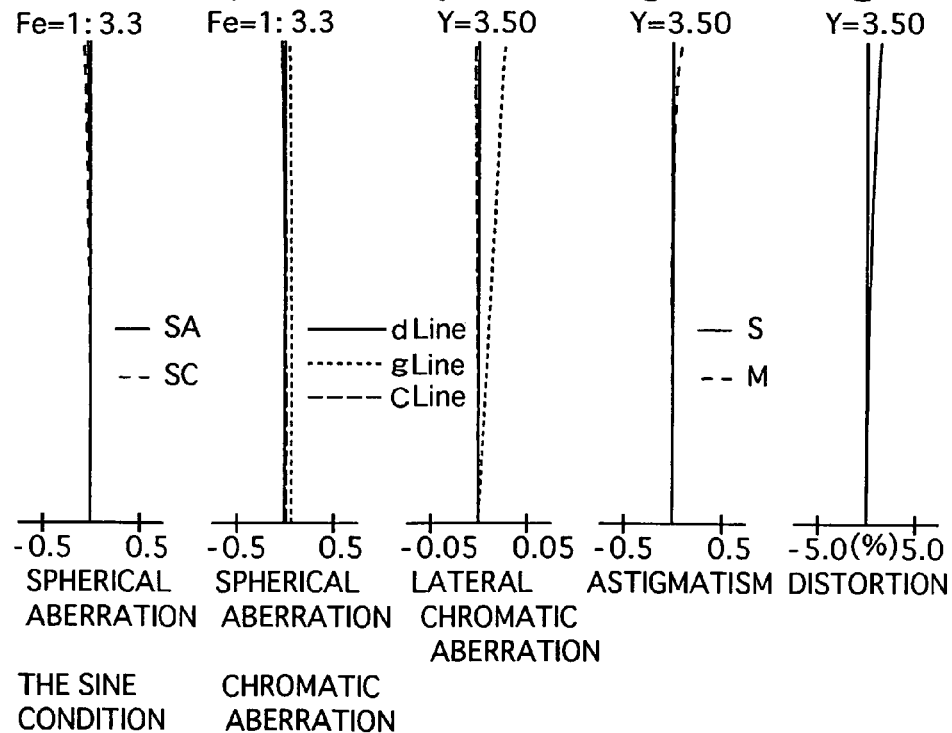
FIGS. 89A, 89B, 89C, 89D and 89E show aberrations occurred in the zoom lens system of the tenth embodiment at an intermediate focal length, when an object at a finite photographic distance is in an in-focus state.

FIG. 86 is the lens arrangement of the zoom lens system, at the long focal length extremity, according to the tenth embodiment of the present invention, when an object at infinity is in an in-focus state. FIGS. 87A through 87E show aberrations occurred in the lens arrangement of FIG. 86.

FIGS. 88A through 88E show aberrations occurred in the zoom lens system of the tenth embodiment at the short focal length extremity, when an object at a finite photographic distance is in an in-focus state.

FIGS. 89A through 89E show aberrations occurred in the zoom lens system of the tenth embodiment at an intermediate focal length, when an object at a finite photographic distance is in an in-focus state.

FIGS. 90A through 90E show aberrations occurred in the zoom lens system of the tenth embodiment at the long focal length extremity, when an object at a finite photographic distance is in an in-focus state.

Tables 10A and 10B show the numerical values of the tenth embodiment.

The basic lens arrangement of the tenth embodiment, and the way of focusing thereof are the same as the eighth embodiment.

The diaphragm S is provided 1.25 on the object side (in front of surface No. 13) of the positive third lens group 30.

TABLE 10A

FNO. = 1:2.9 - 3.2 - 3.6
f = 5.94 - 18.00 - 56.60
W = 31.3° - 10.6° - 3.4°
m = 0.000 - 0.000 - 0.000
fB = 4.37 - 4.37 - 4.37

| Surf. No. | r | d | Nd | ν |
|---|---|---|---|---|
| 1 | 58.509 | 1.40 | 1.84666 | 23.8 |
| 2 | 29.618 | 5.88 | 1.49700 | 81.6 |
| 3 | −106.238 | 0.10 | | |
| 4 | 25.365 | 3.88 | 1.77250 | 49.6 |
| 5 | 80.491 | 1.15-12.86-21.01 | | |
| 6 | 108.017 | 0.90 | 1.88300 | 40.8 |
| 7 | 8.222 | 2.46 | | |
| 8 | −17.114 | 3.27 | 1.84666 | 23.8 |
| 9 | −6.917 | 0.90 | 1.88300 | 40.8 |
| 10 | 23.494 | 0.39 | | |
| 11 | 18.155 | 1.96 | 1.72825 | 28.5 |
| 12 | −69.555 | 22.65-10.94-2.79 | | |
| 13* | 11.255 | 2.62 | 1.43312 | 95.2 |
| 14 | −18.768 | 0.90 | 1.62588 | 35.7 |
| 15 | −106.721 | 13.55-9.77-12.97 | | |
| 16* | 14.130 | 3.00 | 1.58636 | 60.9 |
| 17 | −37.189 | 5.83 | | |
| 18 | 20.676 | 1.00 | 1.84666 | 23.8 |
| 19 | 6.477 | 3.00 | 1.51742 | 52.4 |
| 20 | 32.702 | 0.80-4.58-1.39 | | |
| 21 | ∞ | 1.70 | 1.51633 | 64.1 |
| 22 | ∞ | — | | |

| NO | K | A4 | A6 |
|---|---|---|---|
| 13 | −0.10000 × 10¹ | 0.66091 × 10⁻⁵ | |
| 16 | −0.10000 × 10¹ | −0.73349 × 10⁻⁴ | −0.92249 × 10⁻⁷ |

TABLE 10B

Fe = 1:2.9 - 3.3 - 4.7
Y = 3.50 - 3.50 - 3.50
m = −0.025 - −0.066 - −0.132
fB = 4.37 - 4.37 - 4.37

| Surf. No. | d |
|---|---|
| 5 | 1.15-12.86-18.18 |
| 12 | 22.65-10.94-5.62 |
| 15 | 13.40-8.58-4.49 |
| 20 | 0.95-5.77-9.86 |

Embodiment 11

Figure 91:
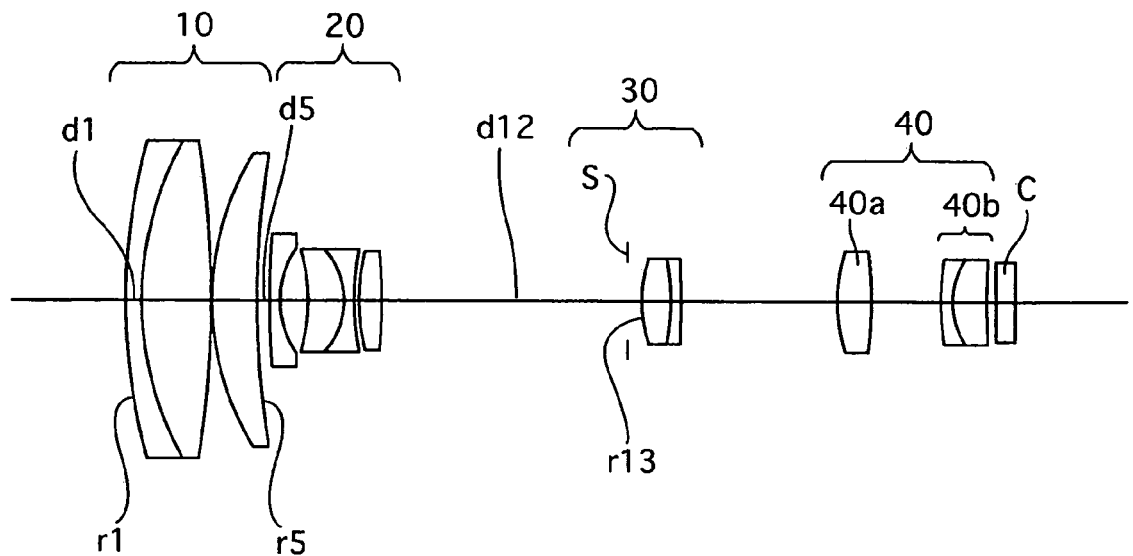
FIG. 91 is a lens arrangement of the zoom lens system, at the short focal length extremity, according to an eleventh embodiment of the present invention, when an object at infinity is in an in-focus state.
Figures 92A, 92B, 92C, 92D, 92E:
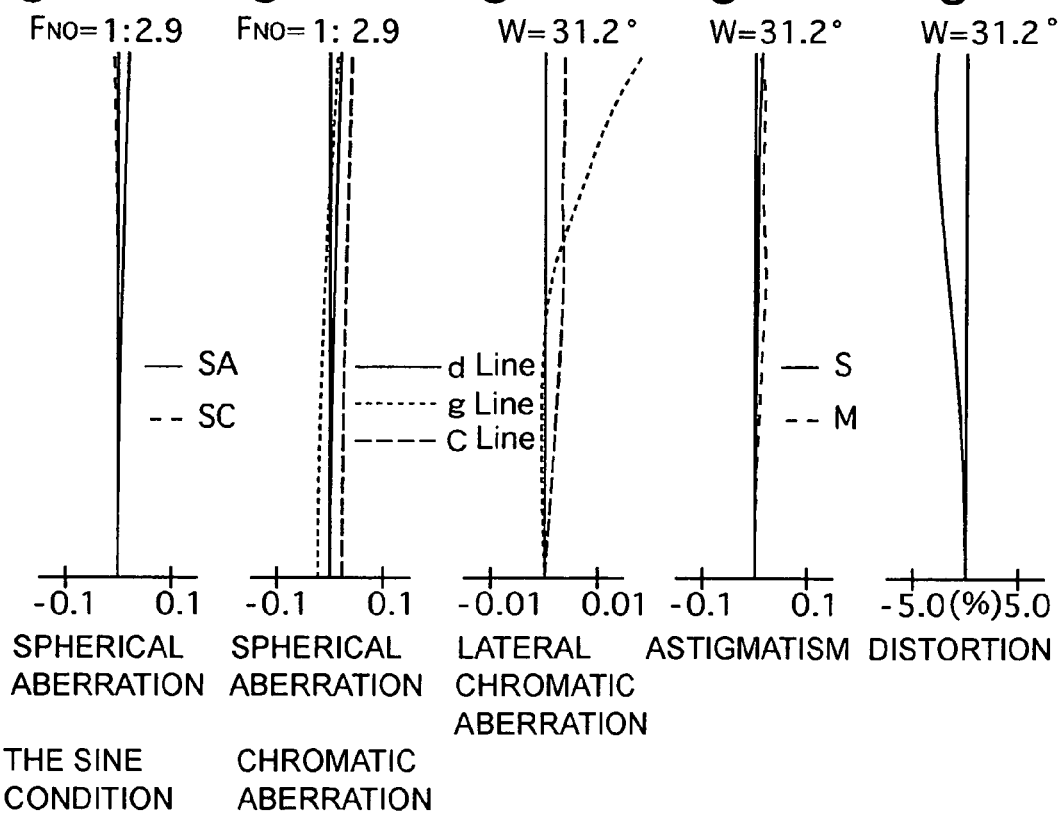
FIGS. 92A, 92B, 92C, 92D and 92E show aberrations occurred in the lens arrangement of FIG. 91.

FIG. 91 is the lens arrangement of the zoom lens system, at the short focal length extremity, according to the eleventh embodiment of the present invention, when an object at infinity is in an in-focus state. FIGS. 92A through 92E show aberrations occurred in the lens arrangement of FIG. 91.

Figure 93:
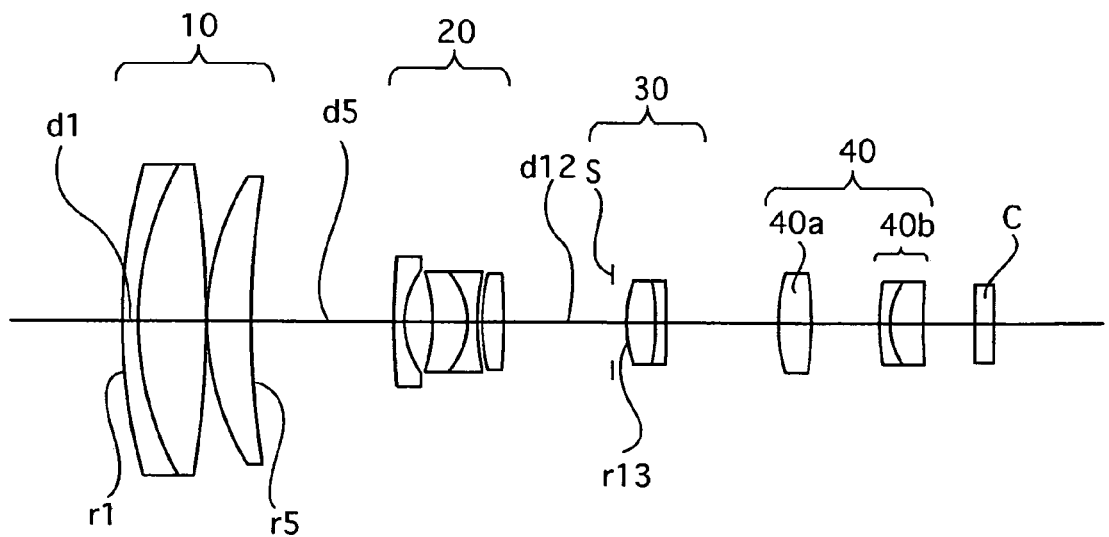
FIG. 93 is a lens arrangement of the zoom lens system, at an intermediate focal length, according to the eleventh embodiment of the present invention, when an object at infinity is in an in-focus state.
Figures 94A, 94B, 94C, 94D, 94E:
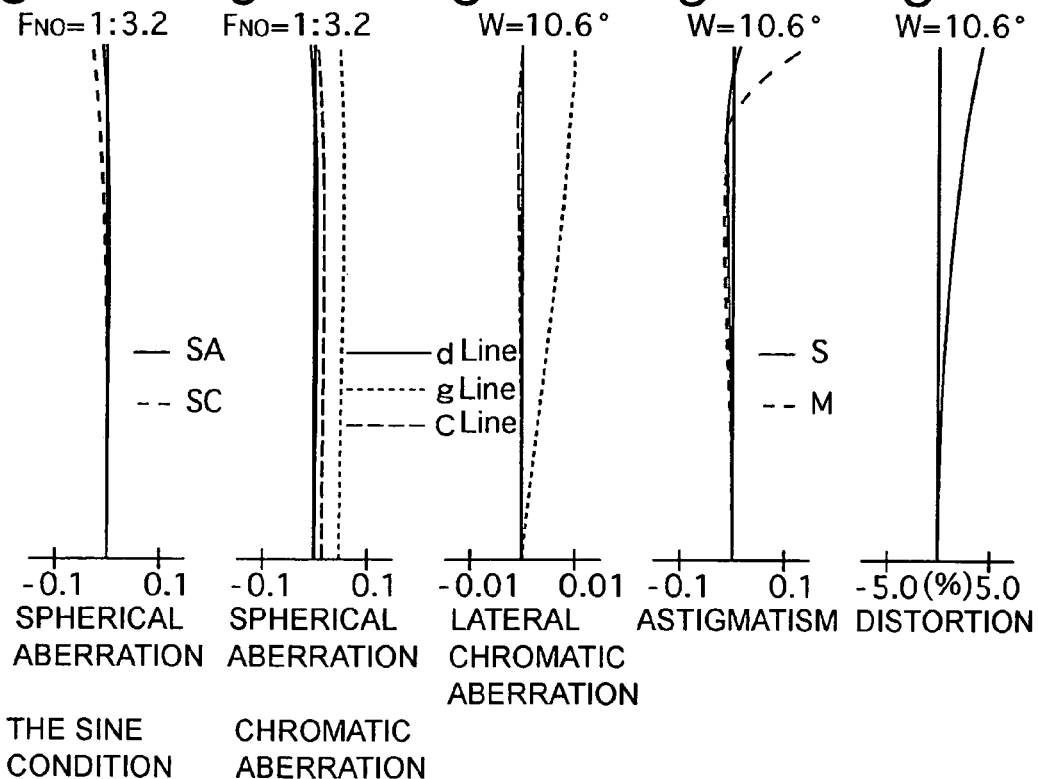
FIGS. 94A, 94B, 94C, 94D and 94E show aberrations occurred in the lens arrangement of FIG. 93.

FIG. 93 is the lens arrangement of the zoom lens system, at an intermediate focal length, according to the eleventh embodiment of the present invention, when an object at infinity is in an in-focus state. FIGS. 94A through 94E show aberrations occurred in the lens arrangement of FIG. 93.

Figure 95:
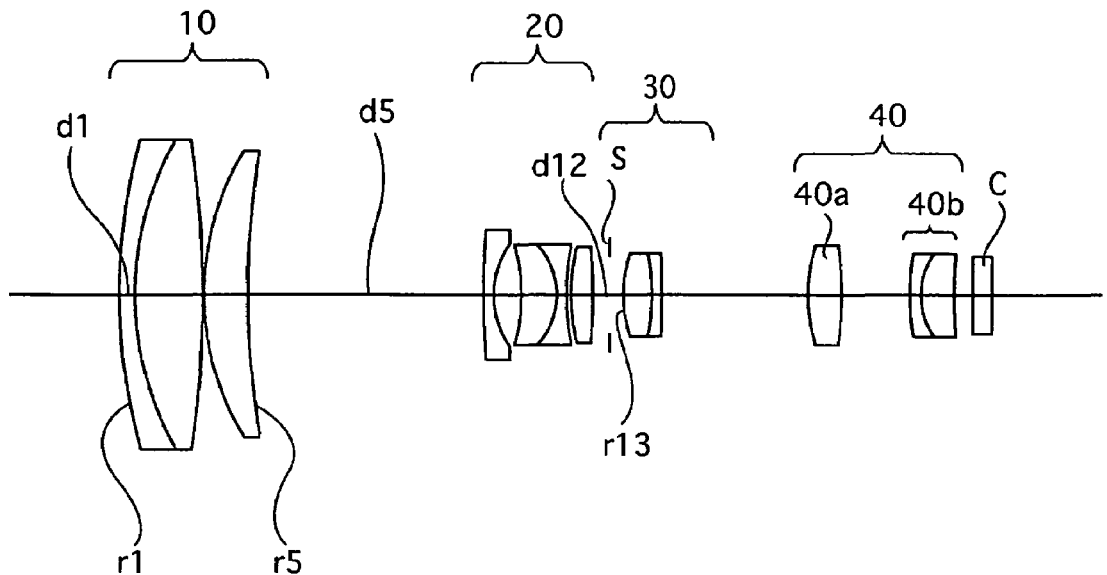
FIG. 95 is a lens arrangement of the zoom lens system, at the long focal length extremity, according to the eleventh embodiment of the present invention, when an object at infinity is in an in-focus state.
Figures 96A, 96B, 96C, 96D, 96E:
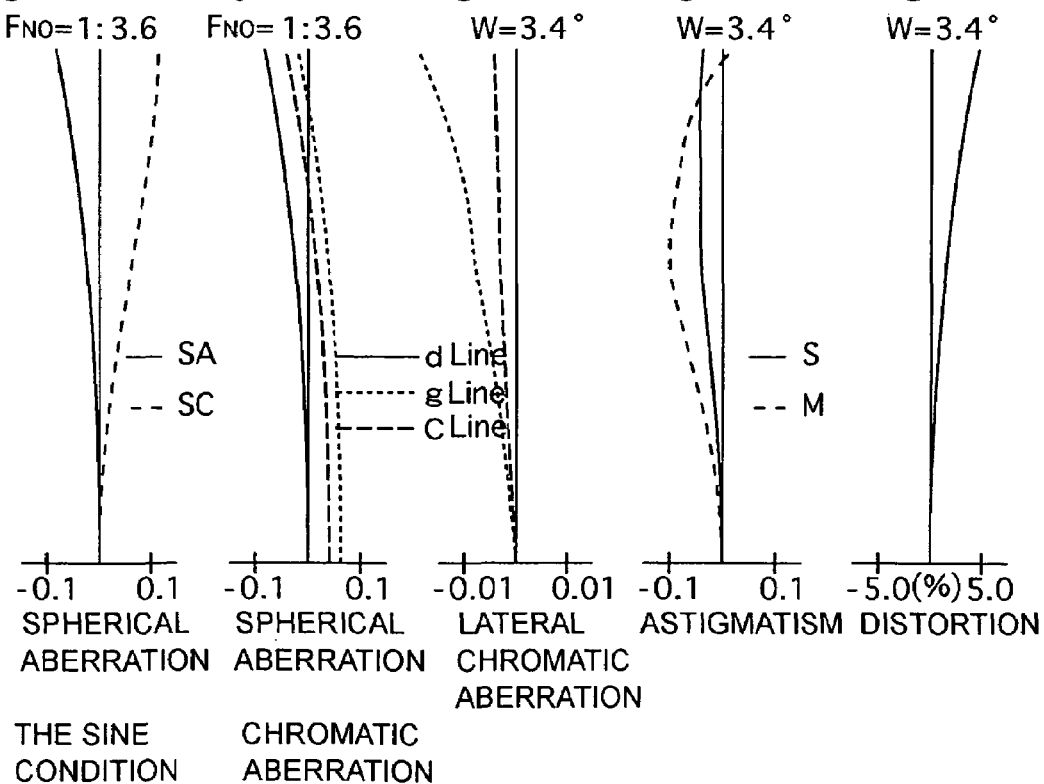
FIGS. 96A, 96B, 96C, 96D and 96E show aberrations occurred in the lens arrangement of FIG. 95.

FIG. 95 is the lens arrangement of the zoom lens system, at the long focal length extremity, according to the eleventh embodiment of the present invention, when an object at infinity is in an in-focus state. FIGS. 96A through 96E show aberrations occurred in the lens arrangement of FIG. 95.

FIGS. 97A through 97E show aberrations occurred in the zoom lens system of the eleventh embodiment at the short focal length extremity, when an object at a finite photographic distance is in an in-focus state.

FIGS. 98A through 98E show aberrations occurred in the zoom lens system of the eleventh embodiment at an intermediate focal length, when an object at a finite photographic distance is in an in-focus state.

FIGS. 99A through 99E show aberrations occurred in the zoom lens system of the eleventh embodiment at the long focal length extremity, when an object at a finite photographic distance is in an in-focus state.

Tables 11A and 11B show the numerical values of the eleventh embodiment.

The basic lens arrangement of the eleventh embodiment, and the way of focusing thereof are the same as the eighth embodiment.

The diaphragms is provided 1.25 on the object side (in front of surface No. 13) of the positive third lens group 30.

TABLE 11A

FNO. = 1:2.9–3.2–3.6
W = 31.2°–10.6°–3.4°
f = 5.94–18.00–56.60
fB = 4.19—4.19—4.19

| Surf. No. | r | d | Nd | ν |
|---|---|---|---|---|
| 1 | 53.185 | 1.40 | 1.84666 | 23.8 |
| 2 | 28.947 | 6.09 | 1.43875 | 95.0 |
| 3 | −91.990 | 0.10 | | |
| 4 | 24.938 | 3.98 | 1.77250 | 49.6 |
| 5 | 82.093 | 1.10–12.83–20.95 | | |
| 6 | 82.176 | 0.90 | 1.88300 | 40.8 |
| 7 | 8.086 | 2.51 | | |
| 8 | −15.428 | 3.16 | 1.84666 | 23.8 |
| 9 | −6.761 | 0.90 | 1.88300 | 40.8 |
| 10 | 23.456 | 0.41 | | |
| 11 | 18.509 | 1.96 | 1.72825 | 28.5 |

TABLE 11A-continued

FNO. = 1:2.9–3.2–3.6
W = 31.2°–10.6°–3.4°
f = 5.94–18.00–56.60
fB = 4.19—4.19—4.19

| | | | | |
|---|---|---|---|---|
| 12 | −53.039 | 22.65–10.91–2.79 | | |
| 13* | 11.255 | 2.62 | 1.43312 | 95.2 |
| 14 | −18.768 | 0.90 | 1.62588 | 35.7 |
| 15 | −106.749 | 13.81–9.93–12.96 | | |
| 16* | 14.130 | 3.00 | 1.58636 | 60.9 |
| 17 | −37.189 | 6.14 | | |
| 18 | 25.209 | 1.00 | 1.84666 | 23.8 |
| 19 | 6.692 | 3.00 | 1.51742 | 52.4 |
| 20 | 54.789 | 0.80–4.69–1.65 | | |
| 21 | ∞ | 1.70 | 1.51633 | 64.1 |
| 22 | ∞ | — | | |

| NO | K | A4 | A6 |
|---|---|---|---|
| 13 | −0.10000 × $10^1$ | 0.66091 × $10^{-5}$ | |
| 16 | −0.10000 × $10^1$ | −0.73349 × $10^{-4}$ | −0.92249 × $10^{-7}$ |

TABLE 11B

Fe = 1:2.9–3.2–3.6
Y = 3.50—3.50—3.50
m = −0.025—−0.064—−0.150
fB = 4.19—4.19—4.19

| Surf. No. | d |
|---|---|
| 5 | 1.10–12.83–18.15 |
| 12 | 22.65–10.91–5.59 |
| 15 | 13.66–8.73–4.56 |
| 20 | 0.95–5.88–10.06 |

The numerical values of each embodiment for each condition are shown in Table 12.

TABLE 12

| | Embod. 1 | Embod. 2 | Embod. 3 | Embod. 4 | Embod. 5 | Embod. 6 |
|---|---|---|---|---|---|---|
| Cond. (1) | −0.26 | −0.39 | −0.31 | −0.23 | −0.23 | −0.17 |
| Cond. (2) | 0.27 | 0.29 | 0.30 | 0.29 | 0.25 | 0.33 |
| Cond. (3) | 1.35 | 1.19 | 1.39 | 1.37 | 1.37 | 1.44 |
| Cond. (4) | −0.83 | −0.84 | −0.82 | −0.83 | −0.83 | −0.82 |
| Cond. (5) | 81.6 | 81.6 | 95.0 | 81.6 | 81.6 | 70.2 |
| Cond. (6) | 2.42 | 2.43 | 2.66 | 2.40 | 2.41 | 2.22 |
| Cond. (7) | 81.6 | 81.6 | 94.9 | 94.9 | 94.9 | 81.6 |
| Cond. (8) | 4.33 | 5.02 | 5.29 | 5.36 | 4.86 | 4.92 |
| Cond. (9) | 5.00 | 2.00 | 2.00 | 2.00 | 2.00 | 2.00 |

| | Embod. 7 | Embod. 8 | Embod. 9 | Embod. 10 | Embod. 11 |
|---|---|---|---|---|---|
| Cond. (1) | −0.23 | −0.35 | −0.42 | −0.44 | −0.43 |
| Cond. (2) | 0.24 | 0.23 | 0.23 | 0.26 | 0.28 |
| Cond. (3) | 1.37 | 1.32 | 1.34 | 1.32 | 1.31 |
| Cond. (4) | −0.82 | −0.82 | −0.84 | −0.84 | −0.84 |
| Cond. (5) | 70.2 | 70.2 | 70.2 | 81.6 | 95.0 |
| Cond. (6) | 2.24 | 2.19 | 2.21 | 2.40 | 2.64 |
| Cond. (7) | 94.9 | 94.9 | 95.2 | 95.2 | 95.2 |
| Cond. (8) | 4.83 | 4.91 | 4.73 | 4.73 | 4.73 |
| Cond. (9) | 2.00 | — | — | — | — |

| | | Embod. 8 | Embod. 9 | Embod. 10 | Embod. 11 |
|---|---|---|---|---|---|
| Cond. (10) | Wide | 0.00 | 0.00 | 0.00 | 0.00 |
| | f = 18 | 0.0 | 0.0 | 0.0 | 0.0 |
| | f = 32 | 1.0 | 1.0 | 1.0 | 1.0 |
| | Tele | 1/3 | 1/3 | 1/3 | 1/3 |

As can be understood from Table 12, the first through seventh embodiments satisfy conditions (1) through (9), and the eighth through eleventh embodiments satisfy conditions (1) through (8) and condition (10). Furthermore, as can be seen from the drawings, the various aberrations are adequately corrected.

According to the above description, a miniaturized zoom lens system, which is constituted by the four-lens-group arrangement, i.e., a positive lens group, a negative lens group, another positive lens group, and the other positive lens group, in this order from the object, and which has a zoom ratio of 10:1, can be attained.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a positive first lens group, a negative second lens group, a positive third lens group, and a positive fourth lens group, in this order from an object, wherein upon zooming from the short focal length extremity to the long focal length extremity, said negative second lens group is arranged to move from the object side to the image side, and said positive fourth lens group is arranged to move in order to compensate the move of the image plane that occurs upon zooming;

wherein said positive fourth lens group comprises a first sub-lens group comprising a positive lens element, and a second sub-lens group comprising cemented lens elements comprising a negative lens element and a positive lens element, in this order from the object;

wherein said first sub-lens group comprises an aspherical surface on at least the object-side surface thereof, and said aspherical surface is formed so that the higher a height from the optical axis in a radial direction becomes the weaker the refractive power is, compared with a paraxial spherical surface; and wherein said first sub-lens group satisfies the following conditions:

$$0.55 < f4a/f4b < -0.07$$

$$0.15 < d4ab/f4 < -0.50$$

wherein f4a designates the focal length of said first sub-lens group of said positive fourth lens group;

f4b designates the focal length of said second sub-lens group of said positive fourth lens group;

d4ab designates the distance between said first sub-lens group and said second sub-lens group of said positive fourth lens group; and f4 designates the focal length of said positive fourth lens group.

2. The zoom lens system according to claim 1, wherein said positive first lens group comprises cemented lens elements comprising a negative lens element and a positive lens element, and a positive meniscus lens element having the convex positive surface facing toward the object, in this order from the object;

wherein said negative second lens group comprises a negative lens element having a deep concave surface on the image-side thereof, cemented lens elements comprising a positive lens element having a concave surface on the object-side thereof and a negative lens element having a concave surface on the object-side thereof, and a positive lens element, in this order from the object;

wherein said positive third lens group comprises cemented lens elements comprising a positive lens element and a negative lens element; and wherein said zoom lens system satisfies the following condition:

$$0.07 < f3/f4 < 2.50$$

wherein f3 designates the focal length of said positive third lens group; and f4 designates the focal length of said positive fourth lens group.

3. The zoom lens system according to claim 1, further satisfying the following condition:

$$-0.85 < fw/f2 < -0.7$$

wherein fw designates the focal length of the entire zoom lens system at the short focal length extremity; and f2 designates the focal length of said negative second lens group.

4. The zoom lens system according to claim 2, further satisfying the following conditions:

$$v_{12} > 70$$

$$1.9 < v_{11}/f_{11} + (v_{12}+v_{13})/2/f_{12\text{-}13} < 2.9$$

wherein $v_{12}$ designates the Abbe number of a second lens element from the most object-side lens element of said positive first lens group;

$v_{11}$ designates the Abbe number of the most object-side lens element of said positive first lens group;

$f_{11}$ designates the focal length of the most object-side lens element of said positive first lens group;

$v_{13}$ designates the Abbe number of a third lens element from the most object-side lens element of said positive first lens group; and $f_{12\text{-}13}$ designates the combined focal length of said second and third lens elements from the most object-side lens element of said positive first lens group.

5. The zoom lens system according to claim 2, wherein a non-cemented surface of said positive lens element of said positive third lens group comprises an aspherical surface that is formed so that the higher a height from the optical axis in a radial direction becomes the weaker the refractive power is, compared with a paraxial spherical surface; and wherein said positive third lens group satisfies the following conditions:

$$v3p > 80$$

$$3.8 < v_{3p}/f_{3p} + v_{3n}/f_{3n} < 6.0$$

wherein $v_{3p}$ designates the Abbe number of said positive lens element of said positive third lens group;

$f_{3p}$ designates the focal length of said positive lens element of said positive third lens group;

$v_{3n}$ designates the Abbe number of said negative lens element of said positive third lens group; and $f_{3n}$ designates the focal length of said negative lens element of said positive third lens group.

6. A zoom lens system comprising a positive first lens group, a negative second lens group, a positive third lens group, and a positive fourth lens group, in this order from an object, wherein upon zooming from the short focal length extremity to the long focal length extremity, said negative second lens group is arranged to move from the object side to the image side, and said positive fourth lens group is arranged to move in order to compensate the move of the image plane that occurs upon zooming;

wherein the lateral magnification of said negative second lens group becomes 1.0 upon zooming;

wherein said positive fourth lens group is used as a focusing lens group throughout all the zooming ranges of said zoom lens system; and wherein said negative second lens group is used as another focusing lens group with respect to at least a portion of said zooming ranges.

7. The zoom lens system according to claim 6, wherein the ratio of the traveling distance of said positive fourth lens group to that of said negative second lens group is made constant over the all zooming ranges; and wherein said negative second lens group and said positive fourth lens group satisfy the following condition:

$$0 < dX4/dX2 < 6$$

wherein dX4 designates the traveling distance of said positive fourth lens group when focusing is being performed; and dX2 designates the traveling distance of said negative second lens group when focusing is being performed.

8. The zoom lens system according to claim 7, wherein the value of dX4/dX2 set to be an integer.

9. The zoom lens system according to claim 6, wherein the ratio of the traveling distance of said negative second lens group to that of said positive fourth lens group is made variable in accordance with the change in the focal length upon zooming from the short focal length extremity to the long focal length extremity.

10. The zoom lens system according to claim 9, wherein said ratio satisfies the following condition:

$$0 \leq dX2/dX4 < 1$$

wherein dX4 designates the traveling distance of said positive fourth lens group when focusing is being performed; and dX2 designates the traveling distance of said negative second lens group when focusing is being performed.

11. The zoom lens system according to claim 10, wherein from the short focal length extremity to the long focal length extremity, the value of dX2/dX4 is determined to vary from 0 to 1, and thereafter to vary in a stepwise manner to become less than 1.

* * * * *